US012054973B2

(12) United States Patent
Holbein et al.

(10) Patent No.: US 12,054,973 B2
(45) Date of Patent: Aug. 6, 2024

(54) DOUBLE PULL CLOSURE LATCH ASSEMBLY FOR HOOD AND FRUNK MOTOR VEHICLE APPLICATIONS

(71) Applicant: Magna BOCO GmbH, Wuppertal (DE)

(72) Inventors: Jan Holbein, Wuppertal (DE); Bernardo Erices, Wuppertal (DE); John Distefano, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 206 days.

(21) Appl. No.: 17/476,457

(22) Filed: Sep. 15, 2021

(65) Prior Publication Data

US 2022/0106817 A1 Apr. 7, 2022

Related U.S. Application Data

(60) Provisional application No. 63/142,848, filed on Jan. 28, 2021, provisional application No. 63/129,485, filed on Dec. 22, 2020, provisional application No. 63/109,902, filed on Nov. 5, 2020, provisional application No. 63/086,786, filed on Oct. 2, 2020.

(51) Int. Cl.

| | |
|---|---|
| ***E05B 83/24*** | (2014.01) |
| ***E05B 81/16*** | (2014.01) |
| ***E05B 85/04*** | (2014.01) |
| ***E05B 85/26*** | (2014.01) |

(52) U.S. Cl.

CPC ............ *E05B 83/243* (2013.01); *E05B 81/16* (2013.01); *E05B 85/04* (2013.01); *E05B 85/26* (2013.01)

(58) Field of Classification Search

CPC ........ E05B 83/16; E05B 83/24; E05B 83/243; E05B 85/20; E05B 85/24; E05B 85/243; E05B 85/26; Y10T 292/1047; Y10T 292/1082; Y10S 292/23; Y10S 292/29; Y10S 292/42; Y10S 292/43

See application file for complete search history.

(56) References Cited

U.S. PATENT DOCUMENTS

| | | | |
|---|---|---|---|
| 4,875,724 | A | 10/1989 | Gruber |
| 5,738,393 | A | 4/1998 | Chao |

(Continued)

FOREIGN PATENT DOCUMENTS

| | | | |
|---|---|---|---|
| CA | 2324720 | A1 | 4/2002 |
| CN | 105421909 | A | 3/2016 |

(Continued)

*Primary Examiner* — Kristina R Fulton
*Assistant Examiner* — Noah Horowitz
(74) *Attorney, Agent, or Firm* — Dickinson Wright PLLC

(57) ABSTRACT

A latch assembly includes a ratchet assembly having a primary striker capture position for retaining a striker in a fully closed state, a secondary striker capture position for retaining the striker in a partially closed state, a release position for releasing the striker, and an open position upon removing the striker from the ratchet assembly. A pawl assembly releasably locks the ratchet assembly in the primary striker capture position and in the secondary striker capture position and releases the ratchet assembly to the release position. A hold-open device prevents the pawl assembly from moving from the unlatched position back to latched position while the ratchet assembly is in the release position.

16 Claims, 40 Drawing Sheets

(56) References Cited

U.S. PATENT DOCUMENTS

| | | | | |
|---|---|---|---|---|
| 6,149,210 | A | 11/2000 | Hunt et al. | |
| 6,543,822 | B1 | 4/2003 | King et al. | |
| 7,467,815 | B2 | 12/2008 | Larsen et al. | |
| 7,810,853 | B2 | 10/2010 | Margheritti | |
| 9,027,971 | B2 | 5/2015 | Barczynski et al. | |
| 9,145,716 | B2 | 9/2015 | Jayasuriya et al. | |
| 10,273,726 | B2 | 4/2019 | Park | |
| 10,669,751 | B2 | 6/2020 | Kim et al. | |
| 10,890,018 | B2 | 1/2021 | Distefano et al. | |
| 10,941,592 | B2 * | 3/2021 | Taurasi | E05B 77/08 |
| 11,220,848 | B2 * | 1/2022 | Chevalier | E05B 85/26 |
| 2006/0125246 | A1 | 6/2006 | Lau et al. | |
| 2006/0170224 | A1 | 8/2006 | Mitchell et al. | |
| 2012/0161456 | A1 * | 6/2012 | Riedmayr | E05B 83/24 292/226 |
| 2016/0076279 | A1 | 3/2016 | Ilea et al. | |
| 2018/0030763 | A1 | 2/2018 | Distefano et al. | |
| 2019/0226247 | A1 | 7/2019 | Johann et al. | |
| 2019/0338568 | A1 | 11/2019 | Klein et al. | |
| 2020/0232263 | A1 * | 7/2020 | Strole | E05B 81/20 |
| 2020/0318400 | A1 | 10/2020 | Johann et al. | |
| 2021/0002929 | A1 * | 1/2021 | Nelsen | E05B 81/66 |
| 2021/0172206 | A1 * | 6/2021 | Lim | E05B 83/243 |

FOREIGN PATENT DOCUMENTS

| | | | |
|---|---|---|---|
| CN | 206128914 | U | 4/2017 |
| CN | 107654134 | A | 2/2018 |
| CN | 109328253 | A | 2/2019 |
| CN | 109424278 | A | 3/2019 |
| CN | 111350423 | A | 6/2020 |
| DE | 102005060750 | A1 | 6/2007 |
| DE | 102007008700 | A1 | 8/2008 |
| DE | 102009034904 | A1 | 2/2011 |
| DE | 102009037037 | A1 | 2/2011 |
| DE | 102011114148 | A1 | 3/2013 |
| DE | 102013114106 | A1 | 4/2015 |
| DE | 102017001559 | A1 | 8/2017 |
| GB | 907930 | A | 10/1962 |
| JP | 2000054706 | A | 2/2000 |
| WO | 2013127002 | A1 | 9/2013 |

* cited by examiner

DOUBLE PULL CLOSURE LATCH ASSEMBLY FOR HOOD AND FRUNK MOTOR VEHICLE APPLICATIONS

CROSS-REFERENCE TO RELATED APPLICATIONS

This application claims the benefit of U.S. Provisional Application Ser. No. 63/142,848, filed Jan. 28, 2021, of U.S. Provisional Application Ser. No. 63/129,485, filed Dec. 22, 2020, of U.S. Provisional Application Ser. No. 63/109,902, filed Nov. 5, 2020, and of U.S. Provisional Application Ser. No. 63/086,786, filed Oct. 2, 2020, all of which are incorporated herein by reference in their entirety.

FIELD

The present disclosure relates to latch assemblies for motor vehicles, and more particularly, to double pull latch assemblies for motor vehicle front hoods.

BACKGROUND

Latches for vehicle front hoods, whether for front engine hoods or front trunk hoods, are typically actuated in two stages. During a first stage a first release device, such as a handle, is actuated from inside the passenger compartment of the vehicle which moves the latch from a primary closed position to secondary closed position, wherein the latch is partially released, but still retains a striker of the hood to keep the hood from being fully opened. To release the latch completely the vehicle occupant typically must exit the vehicle and actuate a second release device, such as a lever, that is under the hood. This may be inconvenient in some situations.

Double-pull release latches for vehicle hoods are also known, which allows a user to pull twice on the hood release handle located inside the passenger compartment of the vehicle, or actuate an electric actuator system, such as via a key fob or an actuator button located inside the passenger compartment of the vehicle, operably connected to an actuator, to cause the latch to both transition from the primary closed position to the secondary closed position upon the first pull, and then to fully release the latch from the secondary closed position to a fully open position upon the second pull. One drawback of such a double-pull release latch for a vehicle hood is that the user may unintentionally release the hood, which can be particularly problematic if the hood is a front hood that is caused to open while the vehicle is moving. Another drawback of such an electric actuator system of a double-pull release latch for a vehicle hood is that the electric actuator may become stuck between the first and second actuations, such as due to excessive friction and/or a power failure, thereby preventing a full release of the latch in a second actuation of the double-pull release latch, thus preventing the latch from being released to the fully open position.

Desired is a latch which can be unlatched in a multiple stage release actuations from inside of the passenger compartment of the vehicle when intended, and wherein the latch is inhibited from being fully released to an open position when not desired. Further, it is desired to be able to open the hood when desired upon performing a double pull actuation, and to then be able to readily return the hood to a selected partially closed position and fully closed position. Further desired is a double pull latch which can be unlatched via a power actuator in a multiple stage release actuations when powered and via an alternate actuator that can override the power actuator if the latch becomes stuck or otherwise inoperable between the first and second actuations

SUMMARY

This section provides a general summary of the present disclosure and is not a comprehensive disclosure of its full scope or all of its features, aspects and objectives.

In accordance an aspect of the disclosure, a double pull latch assembly for a front hood, trunk and/or frunk, collectively referred to hereafter as hood, of a motor vehicle is provided.

In accordance with another aspect of the disclosure, the latch assembly can be actuated to partially open the hood, but prevent the hood from moving to a fully open position until desired.

In accordance with another aspect of the disclosure, the latch assembly can be released by performing a first pull on a pawl assembly of the latch assembly, which acts to move a ratchet assembly of the latch assembly to a secondary striker position, whereat a striker fixed to the hood is prevented from being released from the latch assembly, and whereupon a second pull acts to move the ratchet assembly to a release position, whereat the striker can be lifted out from the ratchet assembly to move the ratchet assembly to an open position.

In accordance with another aspect of the disclosure, the ratchet assembly is prevented from moving from the release position toward the primary striker capture position prior to being moved to the open position.

In accordance with another aspect of the disclosure, a hold-open device can be configured to engage a portion of the ratchet assembly and a portion of the pawl assembly while the ratchet assembly is in the release position to prevent the portion of the ratchet assembly being engaged by the hold-open device from moving toward the primary striker capture position.

In accordance with another aspect of the disclosure, a latch assembly for a hood of a vehicle is provided. The latch assembly includes a housing. A ratchet is mounted in the housing for movement between a striker capture position, for retaining a striker fixed to the hood, and an open position, for releasing the striker, wherein the ratchet is biased toward the open position. A primary pawl is configured for operable communication with a release member and is mounted in the housing for movement between a rest position and an actuated position in response to actuation of the release member, wherein the primary pawl is biased toward the rest position. A safety hook is mounted in the housing for movement between a closed position, a secondary striker capture position whereat the striker is releasably prevented from being removed from the latch assembly by the safety hook, a release position in overlying relation with the striker, and an open position whereat the striker is removed from the latch assembly. A safety hook pawl is mounted in the housing for movement between a home position, a secondary locking position whereat the safety hook is releasably maintained in the secondary closed position, a secondary unlocking position whereat the safety hook is in the release position, and an open position whereat the safety hook pawl releasably maintains the safety hook in its open position, the safety hook pawl being biased from the home position toward the secondary locking position. While the ratchet is in the striker capture position, and while performing a first actuation of the release member, the primary pawl moves from the rest position to the actuated position and the ratchet moves from the striker capture position to the striker release position, and the safety hook pawl moves from the home position to the secondary locking position to releasably maintain the safety hook in the secondary striker capture position. Then, while the safety hook is in the secondary striker capture position, and while performing a second actuation of the release member, the primary pawl moves from the rest position to the actuated position and causes the safety hook pawl to move against a bias of the secondary hook biasing member to the secondary unlocking position.

In accordance with another aspect of the disclosure, the latch assembly further includes a hold-open device, also referred to as safety lever, having a first projection configured for engagement with the safety hook pawl to releasably hold the safety hook pawl in the secondary unlocking position and a second projection configured for engagement with the safety hook to facilitate movement of the safety hook to its open position and the safety hook pawl to its open position.

In accordance with another aspect of the disclosure, the latch assembly further includes a coupling lever having a leg arranged in abutment with the ratchet while the ratchet is in its striker capture position whereat the ratchet holds the coupling lever against a rotational bias.

In accordance with another aspect of the disclosure, the coupling lever has a lug arranged in abutment with the safety hook pawl while the safety hook pawl is in the secondary locking position, whereat the primary pawl is arranged in abutment with the coupling lever.

In accordance with another aspect of the disclosure, while performing the second actuation of the release member, the primary pawl imparts a bias on the coupling lever to move the safety hook pawl to the secondary unlocking position.

In accordance with another aspect of the disclosure, upon performing the second actuation of the release member, the first projection of the safety lever engages a first leg of the safety hook pawl to hold the safety hook pawl in the secondary unlocking position.

In accordance with another aspect of the disclosure, while the safety hook is in the release position, and while removing the striker from the latch assembly, the striker engages a first hook of the safety hook and moves the safety hook, whereupon the safety hook has a safety hook first projection that imparts a bias on the second projection of the safety lever, thereby causing the first projection of the safety lever to move out of engagement from the first leg of the safety hook pawl to allow the safety hook pawl to move to its open position and the safety hook to move to its open position, whereat a second leg of the safety hook pawl engages the safety hook first projection.

In accordance with another aspect of the disclosure, the safety hook has a safety hook second projection that imparts a bias on the second leg of the safety hook pawl upon engaging a second hook of the safety hook with the striker upon returning the striker into said latch assembly.

In accordance with another aspect of the disclosure, the ratchet engages the coupling lever to move the lug of the coupling lever into engagement with a tab of the safety hook pawl and move the safety hook pawl to its home position.

In accordance with another aspect of the disclosure, a latch assembly is provided, including a ratchet assembly having a primary striker capture position for retaining a striker in a fully closed state, a secondary striker capture position for retaining the striker in a partially closed state, a release position for releasing the striker, and an open position upon removing the striker from the ratchet assembly; a pawl assembly for releasably locking the ratchet assembly in the primary striker capture position and in the secondary striker capture position and for releasing the ratchet assembly to the release position; and a hold-open device for preventing the pawl assembly from moving from the unlatched position back to latched position while the ratchet assembly is in the release position.

In accordance with another aspect of the disclosure, the ratchet assembly includes a primary ratchet for retaining the striker in the fully closed state and a secondary ratchet for retaining the striker in a partially closed state.

In accordance with another aspect of the disclosure, the pawl assembly includes a primary pawl for releasably locking the primary ratchet in the primary striker capture position and a secondary pawl for releasably locking the secondary ratchet in the secondary striker capture position.

In accordance with another aspect of the disclosure, the hold-open device is configured for locking engagement with the secondary pawl and the secondary ratchet while the secondary ratchet is in the release position, whereat the secondary ratchet is prevented from moving toward the secondary striker capture position without first moving to the open position.

In accordance with another aspect of the disclosure, movement of the secondary ratchet to the open position causes movement of the hold-open device out from locking engagement with the secondary ratchet.

In accordance with another aspect of the disclosure, the secondary ratchet, while moving to the open position, forcibly engages the hold-open device to pivot the hold-open device out from locking engagement with the secondary ratchet.

In accordance with another aspect of the disclosure, a method of operating a double pull latch assembly is provided. The method includes actuating a pawl assembly in a first actuation to move from a latched position to an unlatched position to release a ratchet assembly from a primary striker capture position, whereat a striker is in a fully closed state, to a secondary striker capture position, whereat the striker is in a partially closed stated. Then, actuating the pawl assembly in a second actuation to move from the latched position to the unlatched position to release the ratchet assembly from the secondary striker capture position to a striker release position, and engaging a hold-open device to prevent the pawl assembly from moving from the unlatched position back to the latched position while the ratchet assembly is in the striker release position.

In accordance with another aspect of the disclosure, the method can further include providing the ratchet assembly including a primary ratchet for retaining the striker in the fully closed state and a secondary ratchet for retaining the striker in a partially closed state, and engaging the hold-open device with the secondary ratchet while the ratchet assembly is in the striker release position.

In accordance with another aspect of the disclosure, the method can further include engaging the hold-open device with the secondary ratchet to release the pawl assembly from the unlatched position back to the latched position while moving the ratchet assembly striker from the release position to the open position.

In accordance with another aspect of the disclosure, the method can further include engaging the hold-open device with the secondary ratchet to release the pawl assembly from the unlatched position back to the latched position while moving the ratchet assembly from the striker release position toward the primary striker capture position.

In accordance with another aspect of the disclosure, the method can further include providing the pawl assembly including a primary pawl for releasably locking the primary ratchet in the primary striker capture position and a secondary pawl for releasably locking the secondary ratchet in the secondary striker capture position, and engaging the hold-open device in locking engagement with the secondary pawl while the ratchet assembly is in the striker release position to prevent the secondary pawl from moving from the unlatched position back to the latched position.

In accordance with another aspect of the disclosure, the method can further include releasing the hold-open device from locking engagement with the secondary pawl upon moving the ratchet assembly from the striker release position to the open position.

In accordance with another aspect of the disclosure, the method can further include releasing the hold-open device from locking engagement with the secondary pawl upon moving the ratchet assembly from the striker release position toward the primary striker capture position.

In accordance with another aspect of the disclosure, the method can further include forcibly engaging the hold-open device with the secondary ratchet and causing the hold-open device to pivot out from locking engagement with the secondary pawl upon forcibly engaging the secondary ratchet with the striker while removing the striker from the ratchet assembly.

In accordance with another aspect of the disclosure, a double pull latch assembly for a front trunk hood, or frunk, is provided, wherein the latch assembly can be opened independent from a power actuator in the event the power actuator becomes inoperable.

In accordance with another aspect of the disclosure, the double pull latch assembly can be opened from within a passenger compartment of the motor vehicle via an actuation member (button, switch or otherwise), a key fob, or via another device configured in electrical communication with a powered actuator, whereupon a first actuation causes a first pull to move the latch to a secondary, partially open position, and whereupon a second actuation causes a second pull to move the latch to a fully open position, wherein a disengagement mechanism is configured to override the power actuator if the actuator becomes stuck or otherwise inoperable to move the latch to the fully open position in the event the power actuator becomes inoperable.

In accordance with another aspect of the disclosure, a latch release system is provided including: a latch having a ratchet and a primary pawl. The disengagement mechanism has a primary release lever configured for moving the primary pawl from a locking position to an unlocking position relative to the ratchet, and a secondary release lever configured for overriding a position of the primary release lever to allow the primary pawl to return to its locking position independent of the position of the primary release lever.

In accordance with another aspect of the disclosure, the primary release lever is configured for moving the primary pawl from a primary locking position to a primary unlocking position relative to the ratchet when the primary release lever is moved from a rest position to an actuated position, and the secondary release lever is moveable for transitioning a pawl release lever from an actuated position to an unactuated, rest position to allow the primary pawl to return to the latched position.

In accordance with another aspect of the disclosure, the primary release lever is moveable by a motorized actuator and the secondary release lever is manually moveable.

In accordance with another aspect of the disclosure, the primary release lever is connected to an actuator having an electric motor and the secondary release lever is connected to a mechanically actuatable member (e.g., handle, lever, button) moveable by a user.

In accordance with another aspect of the disclosure, the actuator is configured to move the primary release lever a first time to move the primary pawl from a primary locking state to a secondary locking state to allow the ratchet to move to a secondary closed position, and to move the primary release lever a second time to move a secondary pawl from a secondary locking state to an unlocking state to allow the ratchet to move to a fully opened position.

In accordance with another aspect of the disclosure, the secondary release lever has a home position and an actuated position, where actuation of the mechanically actuatable member moves the secondary release lever to the actuated position and release of the mechanically actuatable member allows the secondary release lever to return to the home position regardless of the position of the primary release lever.

In accordance with another aspect of the disclosure, the secondary release lever is biased from the actuated position toward the home position.

In accordance with another aspect of the disclosure, the latch is a frunk latch.

In accordance with another aspect of the disclosure, the primary release lever and secondary release lever are not mounted to the latch.

In accordance with another aspect of the disclosure, the primary release lever and secondary release lever are remote from the latch.

In accordance with another aspect of the disclosure, the primary release lever and secondary release lever are mounted to a separate frame plate, where the frame plate is mounted to the vehicle at a different location than the latch mounting to the vehicle.

In accordance with another aspect of the disclosure, a latch release system includes: a latch having a ratchet moveable between at least one striker capture position, whereat the ratchet prevents a striker from being released from the ratchet, and a striker release position, whereat the ratchet allows the striker to be released from the ratchet; a pawl moveable between a latched position, whereat the pawl maintains the ratchet in the at least one striker capture position, and a released position, wherein the pawl allows the ratchet to move to its striker release position; a primary release lever moveable from a rest position to an actuated position for moving the pawl from the latched position to the released position; and a secondary release lever for overriding a position of the primary release lever to allow the pawl to move independent from the primary release lever.

In accordance with another aspect of the disclosure, a latch release system includes a ratchet and at least one pawl; a primary release lever; an energizable actuator configured in operable communication with the primary release lever for moving the primary release lever to an actuated position in a first actuation to move the at least one pawl from a latched position to a released position relative to the ratchet to allow the ratchet to move to from a striker capture position to a partially open position and for moving the primary release lever to an actuated position in a second actuation to move the at least one pawl from a latched position to a released position relative to the ratchet to allow the ratchet to move to from the partially open position to a fully open position; a pawl release lever in operable communication with the at least one pawl to move the at least one pawl between the latched position and the released position, the pawl release lever being coupled to the primary release lever in a fixed state for conjoint, fixed movement with the primary release lever during the first and second actuations of the energizable actuator, the pawl release lever being coupled to the primary release lever for movement from the fixed state to a lost motion state for movement relative to the primary release lever while the primary release lever is in the actuated position; and a secondary release lever configured for manual action while the primary release lever is in the actuated state to move the pawl release lever from the fixed state to the lost motion state, wherein the pawl release lever is able to move relative to the primary release lever to allow the at least one pawl to move from the released positon to the latched position while the primary release lever remains in the actuated state.

In accordance with another aspect of the disclosure, the latch release system can further including a floating pin operably coupling the primary release lever to the pawl release lever.

In accordance with another aspect of the disclosure, the secondary release lever can be configured to engage the floating pin to move the floating pin in a slot of the pawl release lever and within a lost motion channel of the primary release lever to move the pawl release lever from the fixed state to the lost motion state.

In accordance with another aspect of the disclosure, the latch release system can further include a preload lever biased into engagement with the floating pin, wherein manual actuation of the secondary release lever causes the floating pin to move against the bias imparted by the preload lever, such that the preload lever acts to maintain the floating pin in a desired position during use.

In accordance with another aspect of the disclosure, a latch actuation device for connecting a power actuator to a latch for actuating the latch under power operation and for connecting a manual actuator to the latch for actuating the latch under manual operation is provided. The latch actuation device includes a primary release lever assembly for operably coupling the power actuator to a pawl) of the latch; and a secondary release lever operable by the manual actuator for acting on the primary release lever assembly to decouple of the power actuator from the pawl.

In accordance with another aspect of the disclosure, a method of actuating a latch having a ratchet assembly and a pawl assembly is provided, the method comprising the steps of: moving a primary release lever operably coupled to the pawl assembly to an actuated position to move the pawl assembly from a locking position to an unlocking position; and moving a secondary release lever to override the position of the primary release lever while in the actuated position to allow the pawl assembly to return to the locking position.

In accordance with another aspect of the disclosure, the step of moving the primary release lever includes using an actuator having an electric motor to move the primary release lever operably coupled to the pawl assembly; and wherein the step of moving the secondary release lever includes using a manually actuatable member to move the secondary release lever.

In accordance with another aspect of the disclosure, a latch actuation device for operably connecting a power actuator and a manual actuator to a latch assembly for actuating the latch assembly is provided, the latch actuation device includes a primary release lever for operably coupling the power actuator to a double pull release mechanism of the latch assembly; and a secondary release lever operable by the manual actuator for acting on the primary release lever to decouple of the power actuator from the double pull release mechanism.

In accordance with another aspect of the disclosure, the latch actuation device, upon decoupling the power actuator from the double pull release mechanism, allows the pawl assembly to return to its unactuated, home position, thereby allowing further actuation of the latch assembly via the manual actuator.

In accordance with another aspect of the disclosure, the secondary release lever acts on the primary release lever to decouple of the power actuator when the power actuator is in a first actuated state and the double pull release mechanism of the latch is in a first double pull state to allow the double pull mechanism to transition from the first double pull state to a second double pull state.

In accordance with another aspect of the disclosure, the power actuator is automatically recoupled with the latch assembly upon restoring power to the power actuator, thereby allowing continued selective power actuation of the latch assembly.

In accordance with another aspect of the disclosure, a latch assembly for a closure panel of a vehicle includes a housing, a ratchet mounted in the housing for movement between a striker capture position for retaining a striker fixed to the closure panel in a striker capture position and an open position for releasing the striker, wherein the ratchet is biased toward the open position, a primary pawl configured for operable communication with a release member and being mounted in the housing for movement between a rest position whereat the pawl is positioned to prevent the ratchet from moving from the striker capture position and an actuated position whereat the pawl is positioned to allow the ratchet to move from the striker capture position to the open position to allow the striker to move from a primary striker captured position to a pop-up position whereat the safety hook is positioned to prevent the striker from being removed from the latch assembly, the primary pawl being biased toward the rest position, a safety hook mounted in the housing for movement between a striker capture position whereat the safety hook is positioned to prevent the striker from being removed from the latch assembly and a striker releasing position whereat the safety hook is positioned to allow the striker to be removed from the latch assembly, and a safety hook pawl configured for operable communication with the release member and being mounted in the housing for movement between a rest position and an actuated position in response to actuation of the release member, wherein performing a first actuation of the release member while the ratchet is in the striker capture position causes the primary pawl to move from the rest position to the actuated position to allow the ratchet to move from the striker capture position to the striker release position and the striker to move to a pop-up position whereat the striker is releasably prevented from being removed from the latch assembly by the safety hook, wherein performing a second actuation of the release member while the ratchet is in the striker release position causes the safety hook to move from the rest position to the actuated position to allow the striker to be removed from the latch assembly.

In accordance with another aspect of the disclosure, the safety hook and the ratchet are mounted about different pivot axes.

In accordance with another aspect of the disclosure, the safety hook pawl and the pawl are mounted about different pivot axes.

In accordance with another aspect of the disclosure, performing the second actuation of the release member activates a hold-open device to maintain the safety hook pawl in the actuated position following the second actuation of the release member.

In accordance with another aspect of the disclosure, removal of the striker from the latch assembly deactivates the hold-open device to allow the safety hook pawl to return from the actuated position to the rest position. In a related aspect, removal of the striker causes the safety hook to move to cause the deactivation of the hold-open device.

BRIEF DESCRIPTION OF THE DRAWINGS

Other objects, features, and advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

Figure 1:
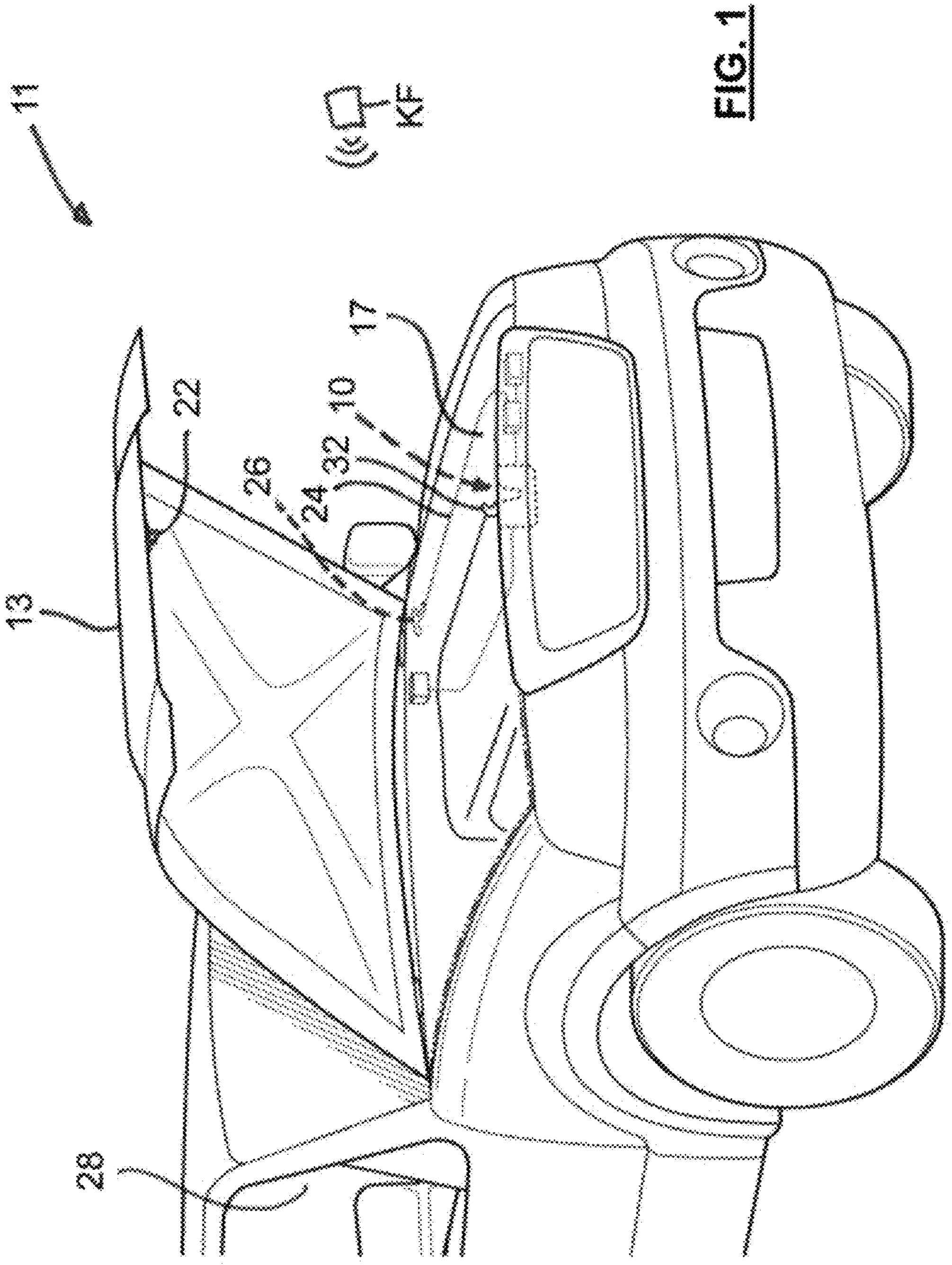
FIG. 1 is a perspective view of a motor vehicle having a double pull latch assembly in accordance with one aspect of the disclosure.
Figure 1A:
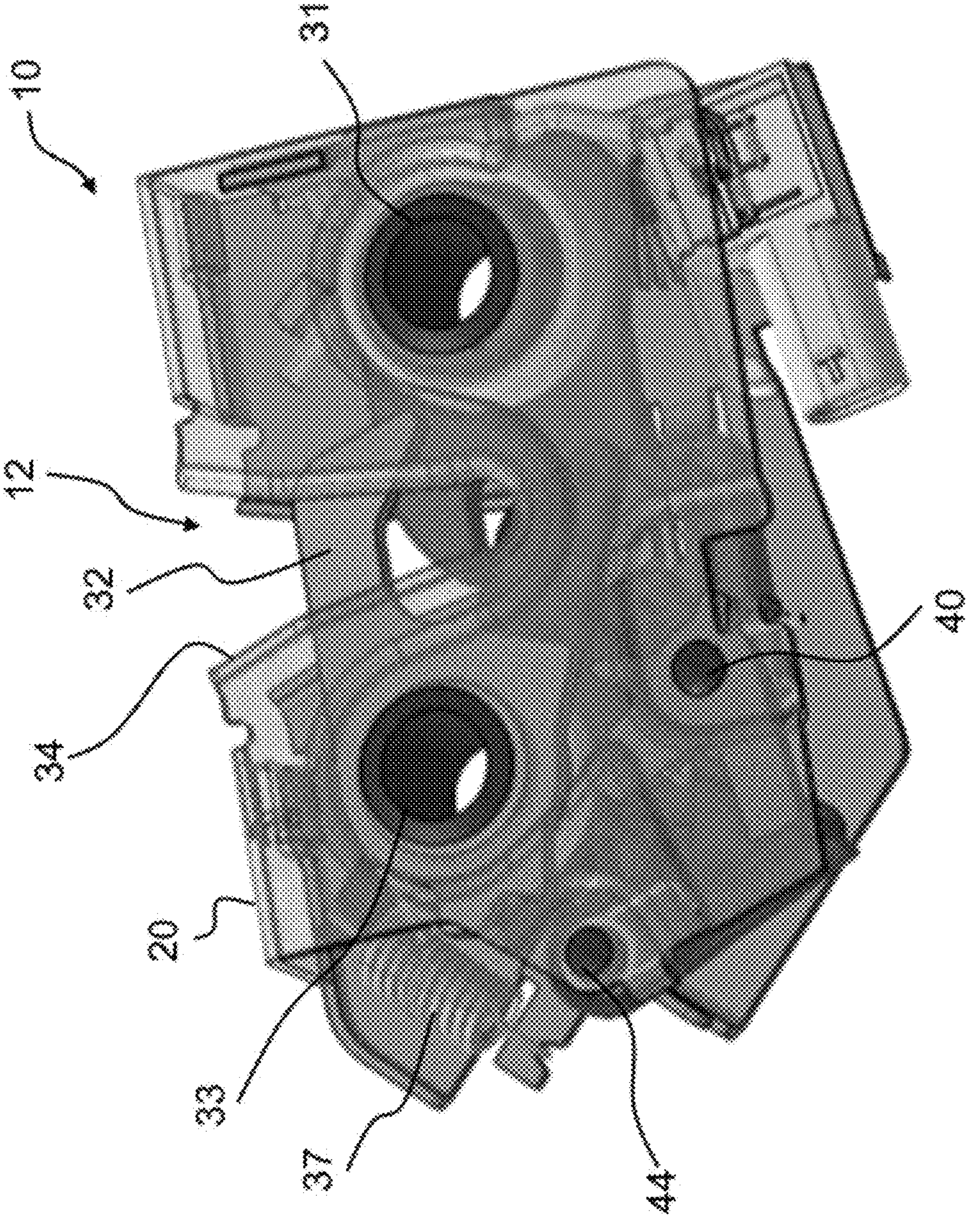
FIG. 1A is a perspective side view of a double pull latch assembly in accordance with one aspect of the disclosure with a housing of the latch assembly shown in transparency for clarity purposes only.

In general, example embodiments of double pull latch assemblies constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a motor vehicle 11 that has a front hood 13, to which a striker 22 fixedly attached. Front hood 13 may enclose an engine, in known fashion, or a front trunk 17, also referred to as frunk 17, for storage in a compartment provided in the front of the vehicle 11 where an engine typically would occupy but has been provided at another location in the vehicle. The striker 22 is capturable by a double pull closure panel latch assembly, also referred to as a double pull hood latch assembly if used in a vehicle hood application, and is generally referred to hereafter simply as double pull latch assembly or latch assembly 10, which is mounted on a body 15 of the motor vehicle 11.

The front hood 13, as permitted by latch assembly 10, can be moved from a fully closed position to various open positions, including a partially open position, whereat the front hood 13 is prevented from being fully opened absent further actuation of latch assembly 10, a released position, whereat the striker 22 of front hood 13 remains within latch assembly 10 but is readily removable therefrom without further actuation of latch assembly 10, and a fully open position, whereat front hood 13 is lifted and striker 22 is removed from latch assembly 10 (FIG. 1) to provide access to the stowage space, or frunk 17.

Referring to FIGS. 1A-18, the latch assembly 10 includes a ratchet assembly 12, a pawl assembly 14, a hold-open device or member, also referred to as hold-open lever or safety lever 16, and a coupling link, also referred to as coupling lever 18, and a housing 20. A communication link, also referred to as release member, such as cable assembly and/or electrical member 24 (FIG. 1), operably interconnects pawl assembly 14 to an actuation device 26, such as can be located within a passenger compartment 28 of motor vehicle 11, or elsewhere. The actuation device 26 can further be provided as an electronic key fob KF configured to actuate an electric actuator having a motor (not shown).

Figure 2:
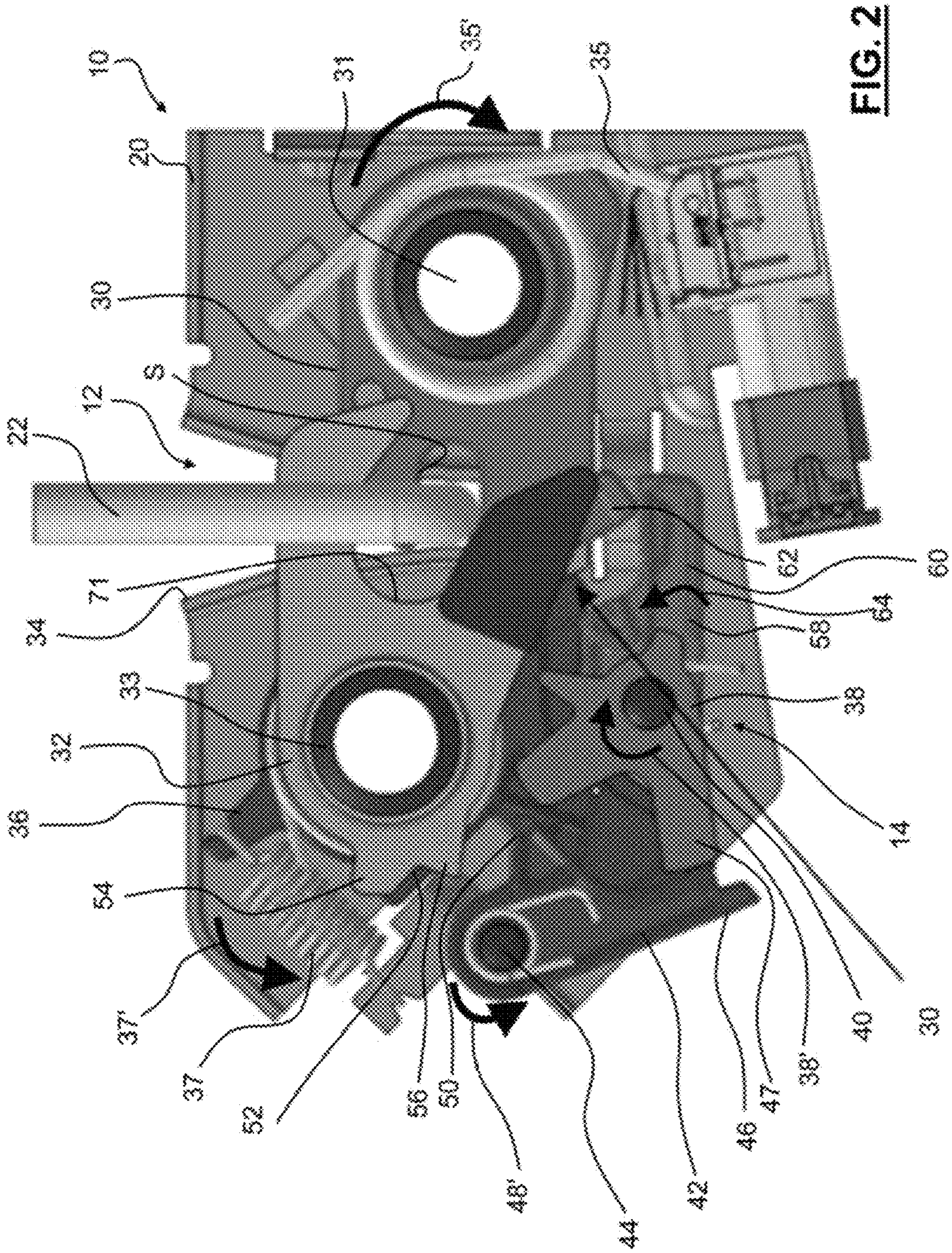
FIG. 2 is a side view of the latch assembly shown in FIG. 1A shown in a fully latched position.
Figure 3:
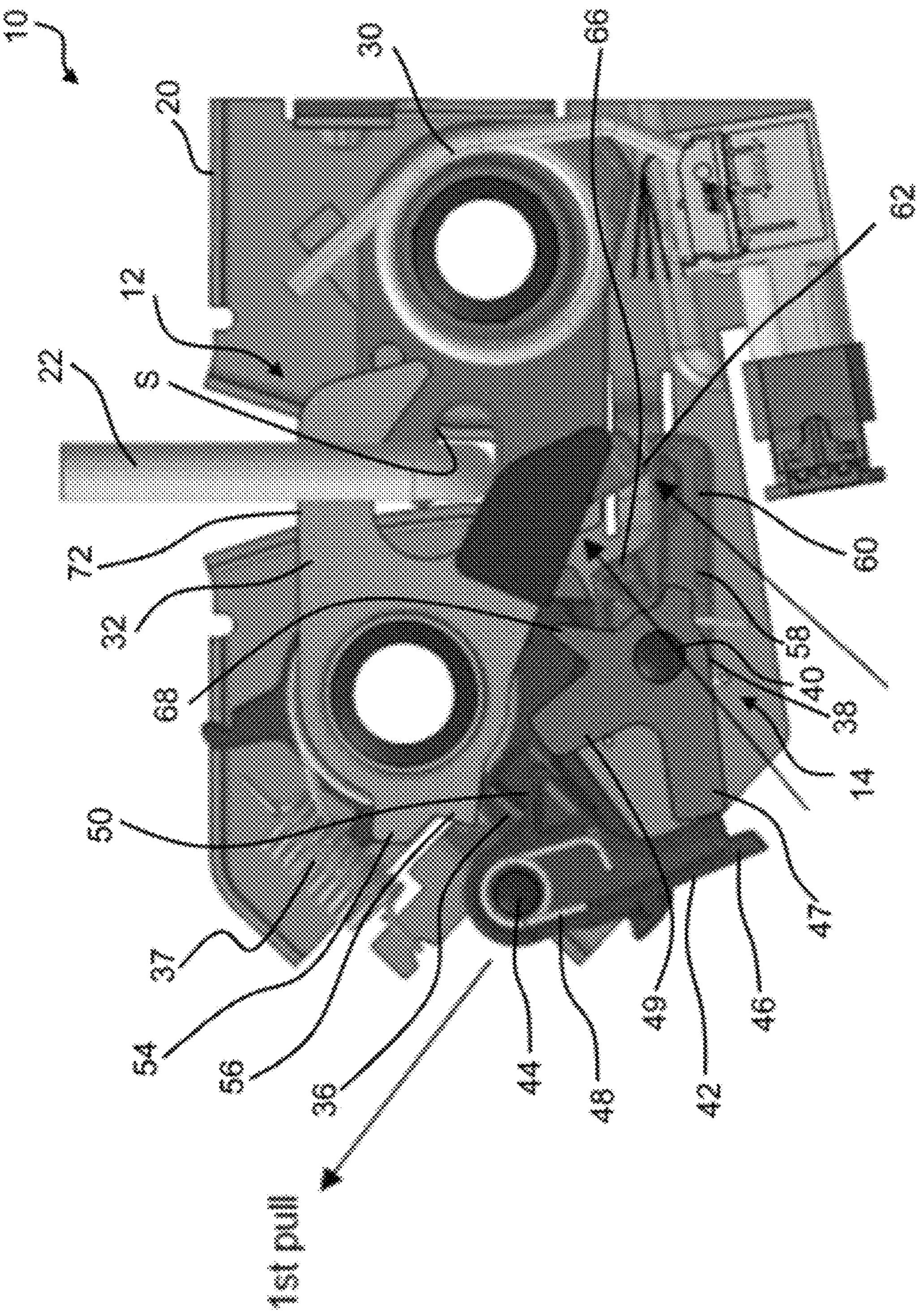
FIG. 3 is a view similar to FIG. 2 showing the double pull latch assembly during a first actuation of a primary pawl.
Figure 4:
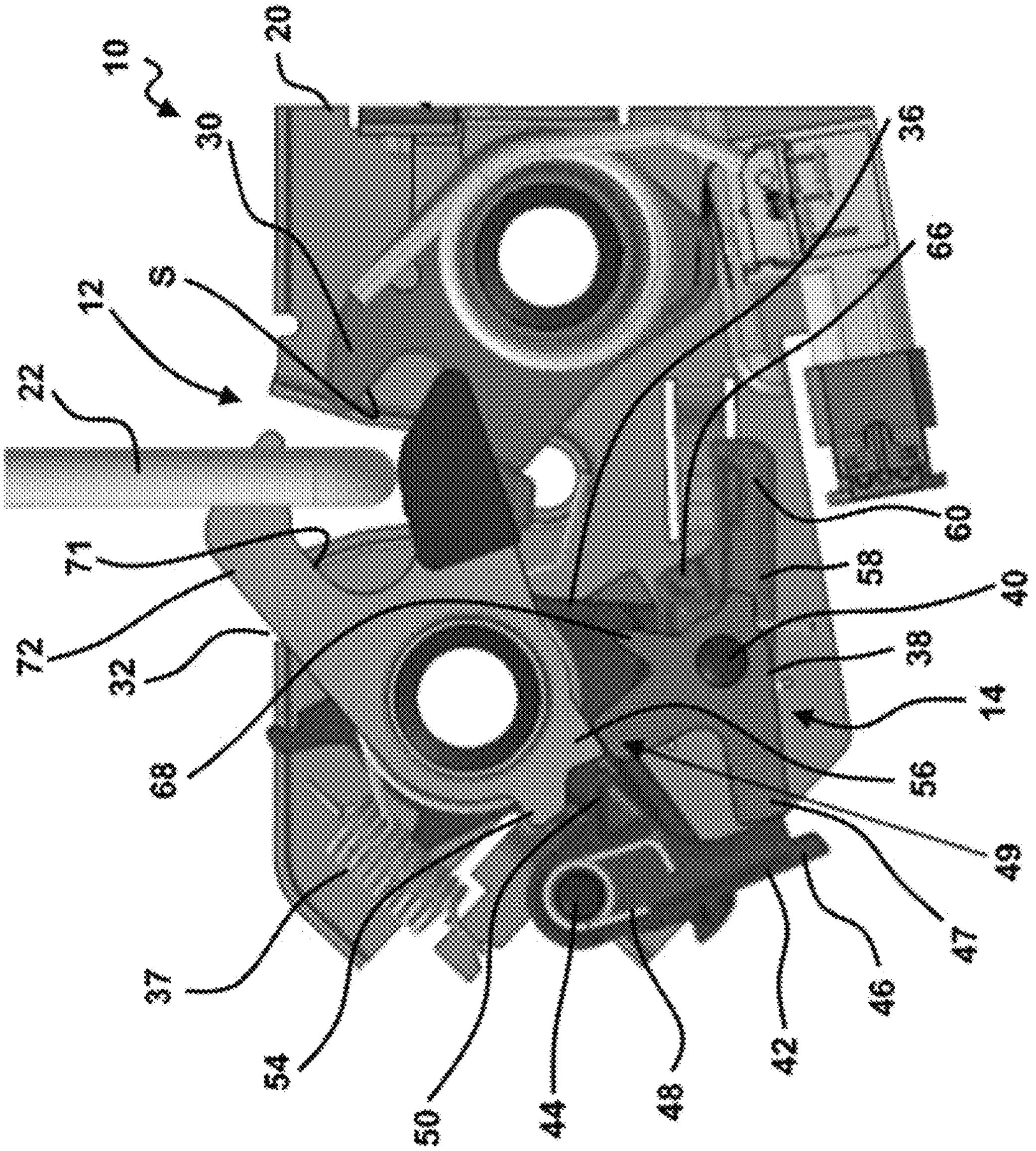
FIG. 4 is a view similar to FIG. 3 showing a ratchet in a striker release position and a safety hook in a secondary striker capture position after the first actuation.
Figure 5:
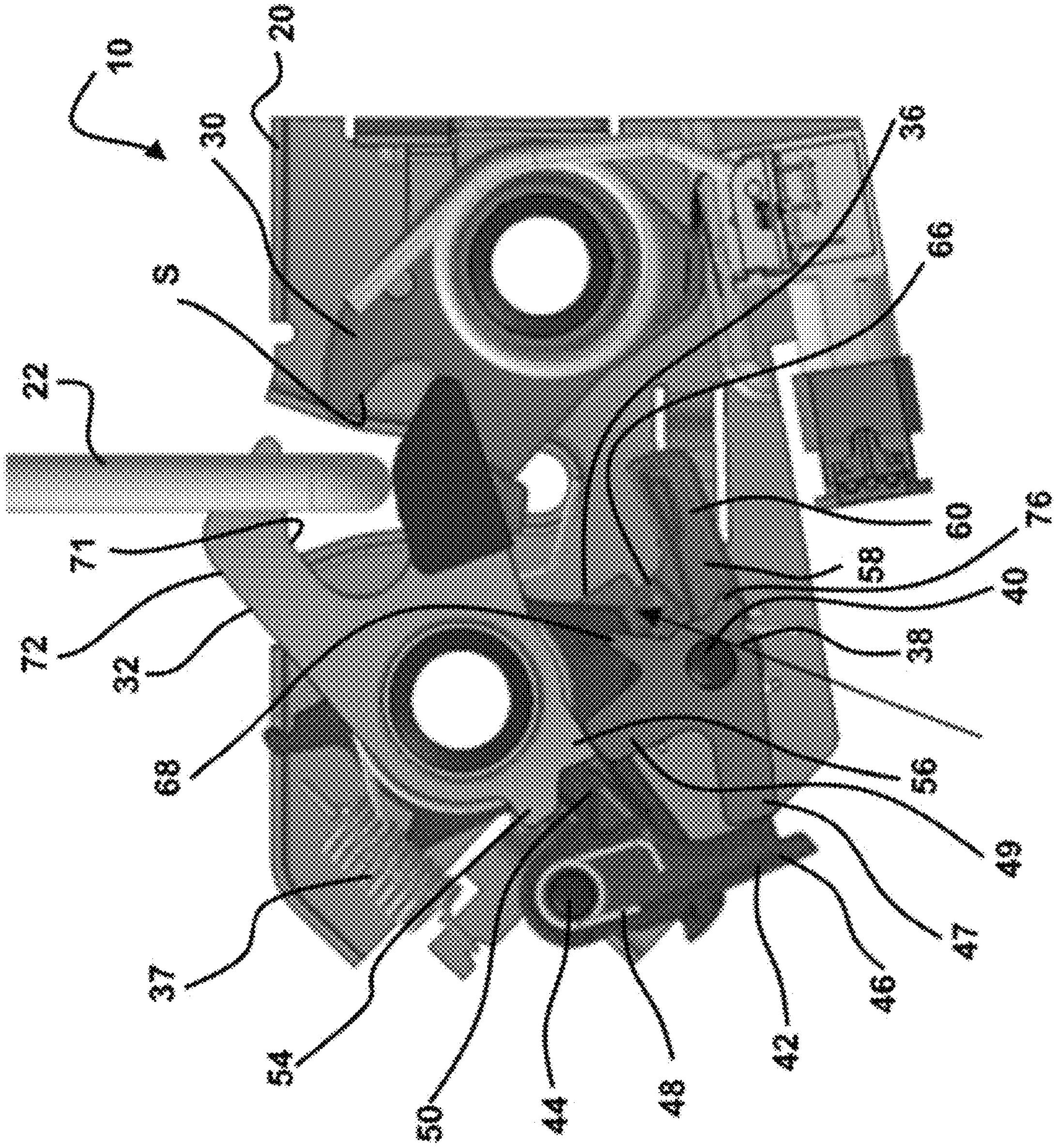
FIG. 5 is a view similar to FIG. 4 showing a coupling lever moved into engagement with a safety hook pawl.
Figure 6:
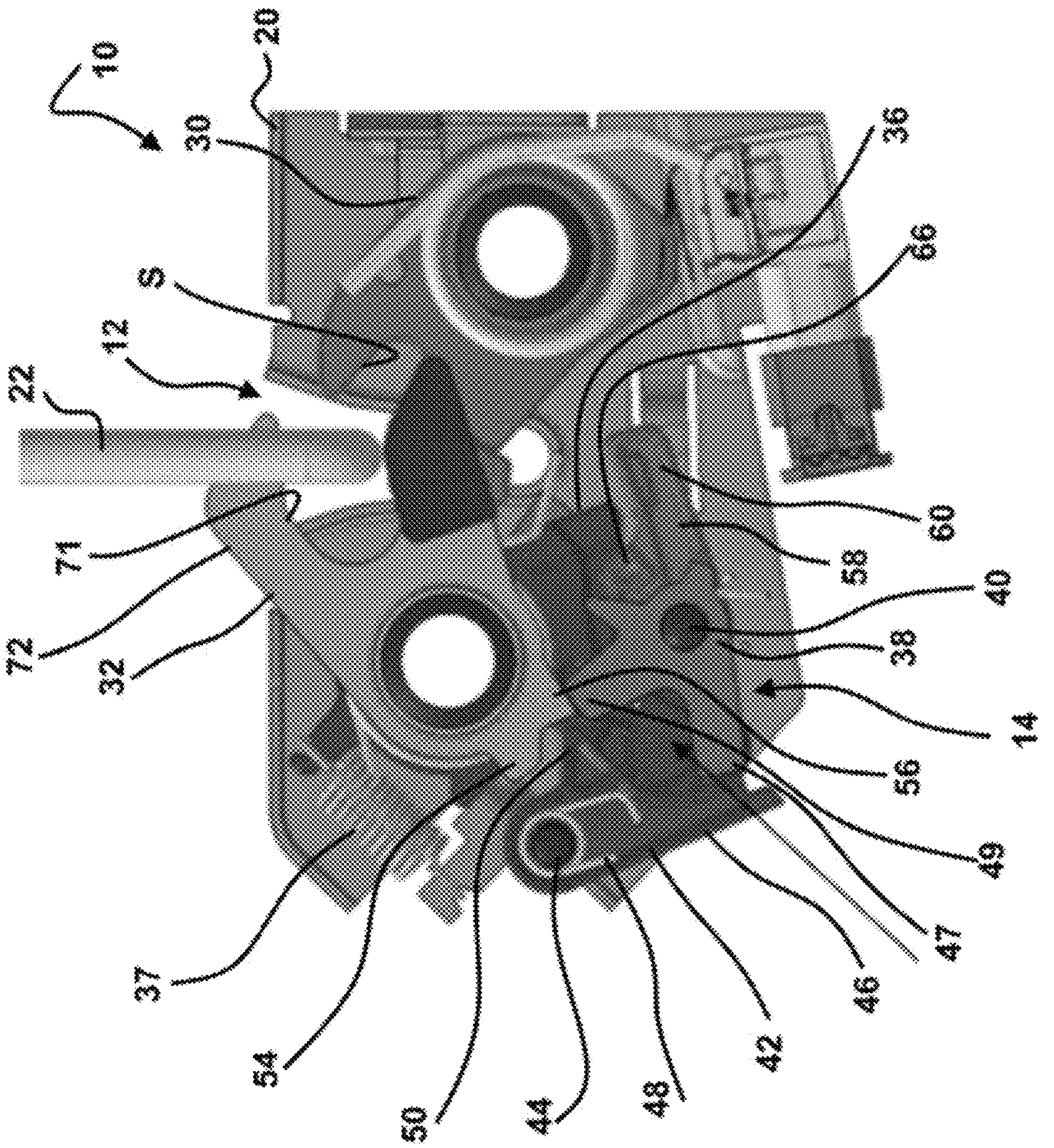
FIG. 6 is a view similar to FIG. 5 showing the primary pawl returned to a rest position.

The ratchet assembly 12 is shown, by way of example and without limitation, as having a primary ratchet, also referred to as ratchet 30, pivotably connected to the housing 20. Ratchet 30 is movable between a primary striker capture position, also referred to as primary closed position or closed position (FIGS. 2 and 18), and a primary striker release position, also referred to as striker release position or open position (FIGS. 4-12). Striker 22 is illustratively shown as being retained by ratchet 30 in FIG. 3 in a primary striker captured position and as such prevented from being removed from the latch assembly by the ratchet 30. Striker 22 is illustratively shown in FIG. 4 as being released from the ratchet 30 but prevented from being removed from the latch assembly by the safety hook 32. In FIG. 4, the ratchet 30 is shown as having rotated to allow the striker 22 to move upwardly and away from a bottom end of the fishmouth 34 to a pop-up position. Striker 22 as shown in a pop-up position as is illustrated in FIG. 4 is further away from bottom end of the fishmouth 34 as would be when retained by the ratchet 30 in a striker capture position with the striker 22. When the striker 22 is in the pop-up position, the ratchet 30 may no longer be able to restrict release of the striker 22 from the latch assembly 10 through acting of the pawl assembly 14 thereon via either acting of the pawl 14 with a primary engagement surface formed on the ratchet 30, such as a primary retention notch, or via either a primary engagement surface as a primary retention notch and a secondary engagement surface as a secondary retention notch formed on the ratchet 30. Illustratively as shown in FIG. 4, when the striker 22 is shown in the pop-up position released from the ratchet 30, the safety hook 32 can prevent release of the striker 22 from the latch assembly 10 even though the striker 22 has been released from the ratchet 30. Ratchet 30 is biased by a primary ratchet biasing member 35 toward the open position, shown as being in a clockwise direction indicated by arrow 35' (FIG. 2). Ratchet 30 has a slot S, as is known, for locking receipt of striker 22 therein while in the closed position.

Figure 10:
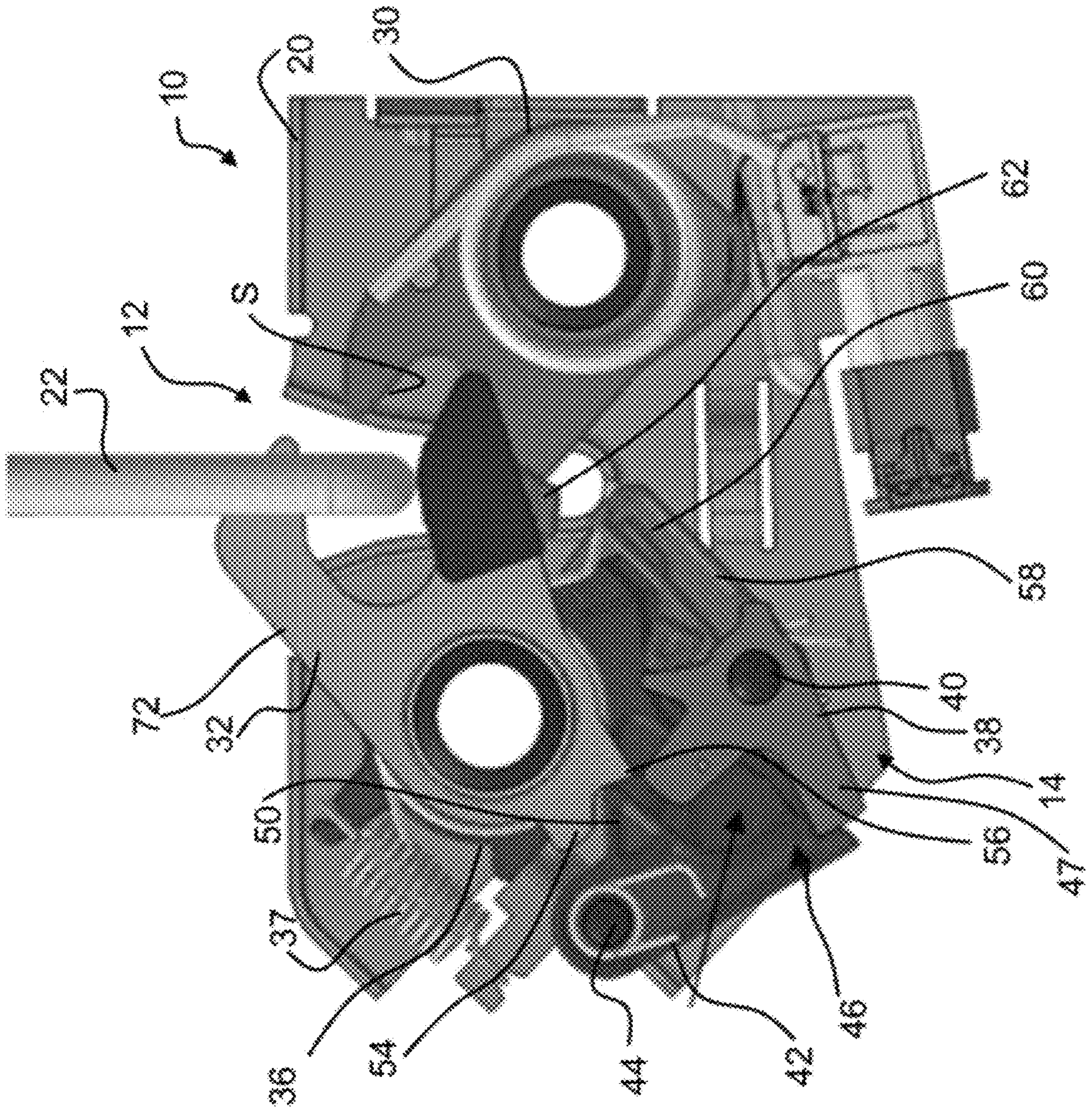
FIG. 10 is a view similar to FIG. 9 showing the safety hook pawl being captured by a safety lever after completion of the second actuation with the latch assembly in release position.
Figure 11:
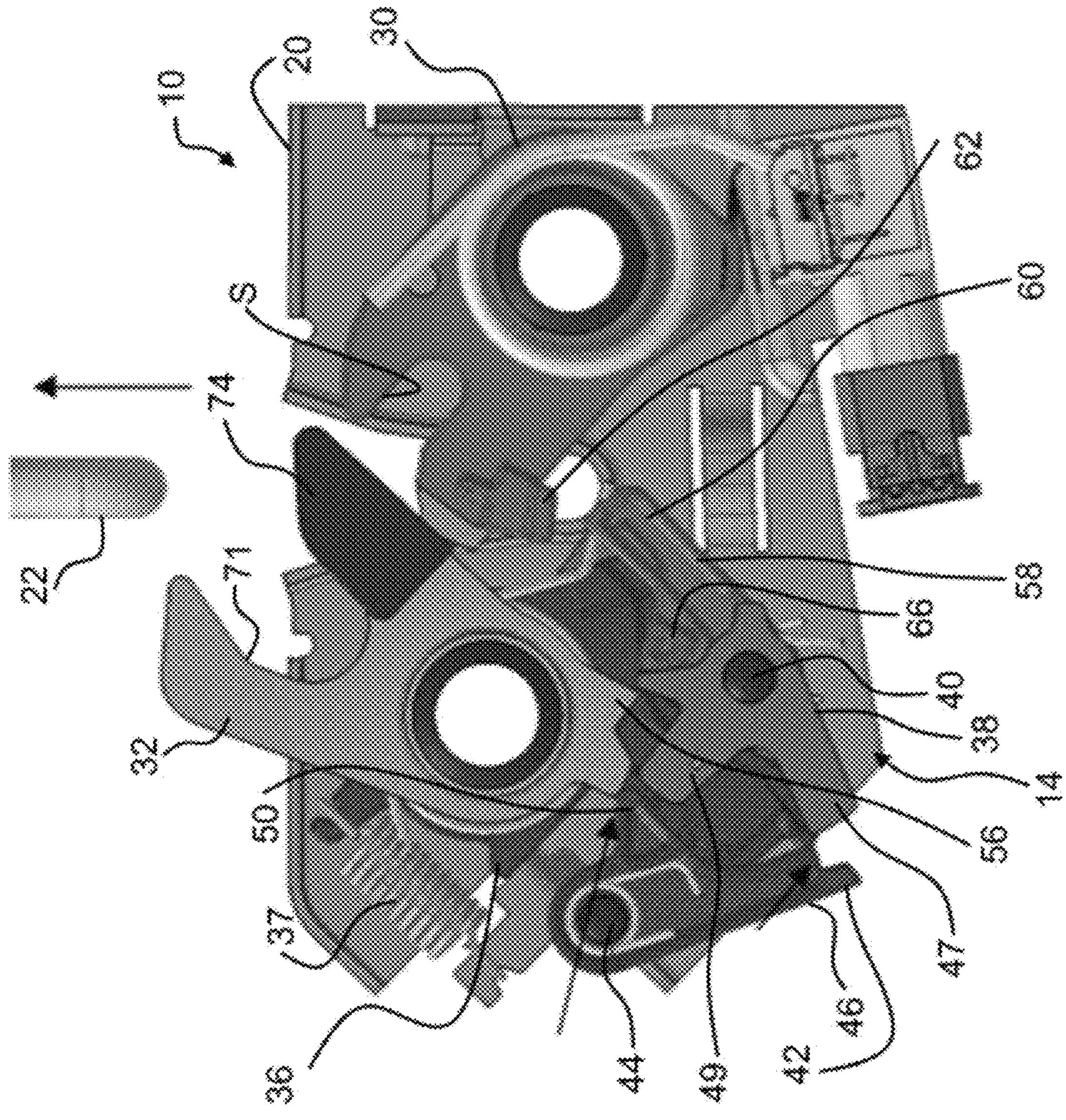
FIG. 11 illustrated the striker being lifted outwardly from the latch assembly and the safety hook being moved to its fully open position.
Figure 12:
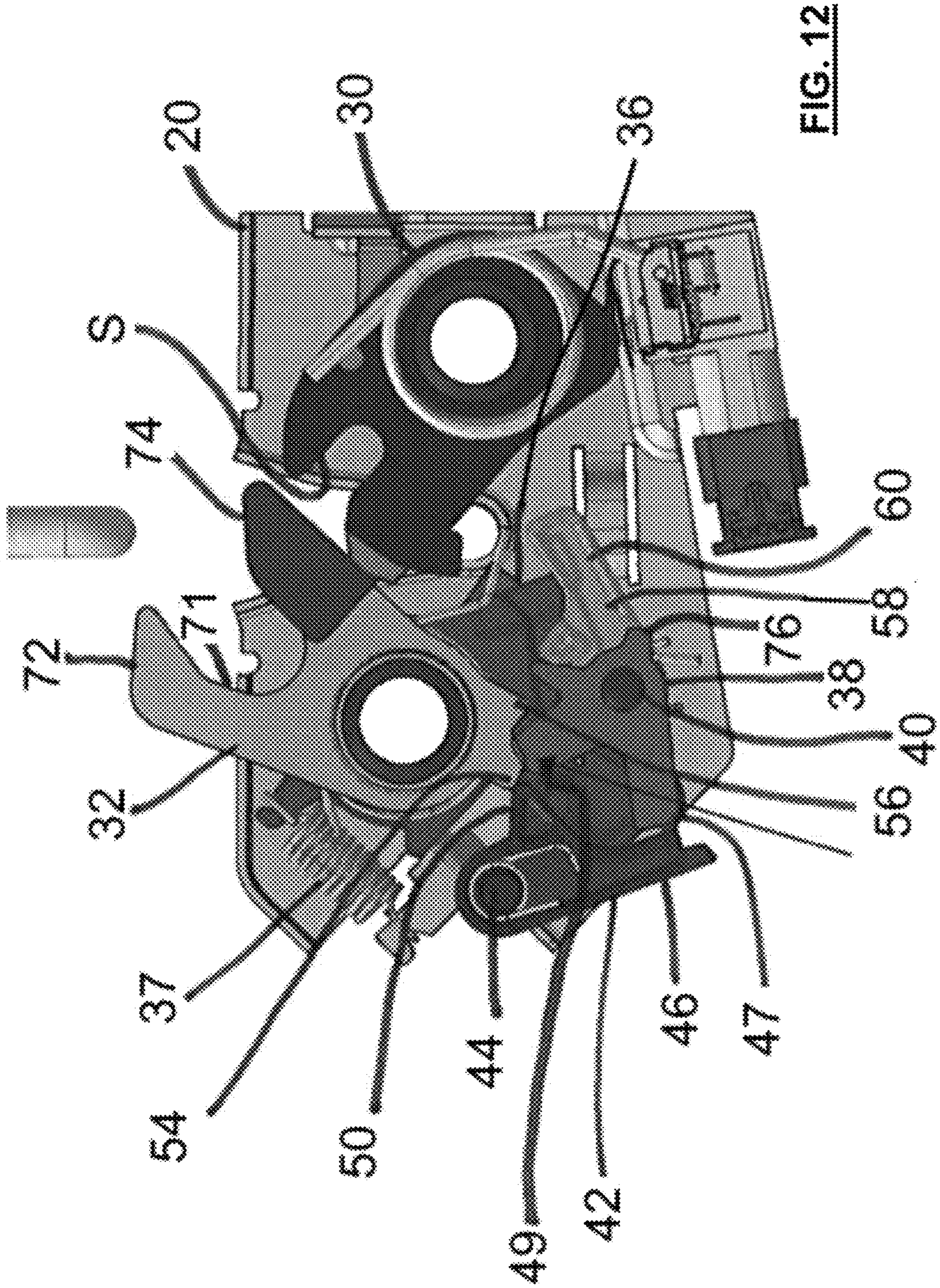
FIG. 12 is a view similar to FIG. 11 showing the safety hook being retained in its fully open position by the safety hook pawl.

The ratchet assembly 12 is further shown, by way of example and without limitation, as having a secondary ratchet, also referred to as safety hook 32, pivotably connected to the housing 20. Safety hook 24 is movable between a closed position (FIG. 2), a secondary striker capture position, also referred to as secondary closed position (FIGS. 4-7), a release position (FIG. 10), and an open position (FIGS. 11 and 12). Ratchet assembly 12 is moveable in response to selective movement of the pawl assembly 14. The pivotal movement of the primary ratchet 30 may take place about a pin 31 that can be mounted to the housing 20 and pivotal movement of the safety hook 32 may take place about a pin 33 that can be mounted to the housing 20. In the primary and secondary striker capture positions, respective primary ratchet 30 and safety hook 32 prevent the withdrawal of the striker 22 that is mounted to the vehicle hood 13 and/or some other closure panel having latch 10. When in the primary closed position, the primary ratchet 30 holds the striker 22 relatively deeper within a slot, commonly referred to fishmouth 34 of the housing 20, and locked within slot S of primary ratchet 30, wherein the hood 13 is in a fully closed state, as compared to when ratchet assembly 12, and in particular, the safety hook 32, is in the secondary striker capture position, wherein the hood 13 is in a partially closed state, but prevented from being moved to the fully open position by safety hook 32 absent a further actuation of release member 24. Thus, in the primary closed position the ratchet assembly 12 holds the striker 22 at a first depth in the fishmouth, and in the secondary closed position the ratchet 12 holds the striker 22 at a second depth in the fishmouth of the housing 20, wherein the first depth is greater than the second depth. Accordingly, ratchet assembly 12 has a primary striker capture position for retaining the striker 22 in a fully closed state, a secondary striker capture position for retaining the striker 22 in a partially closed state, a release position for releasing the striker 22, and an open position upon removing the striker 22 from the ratchet assembly 12. In each positon, the ratchet assembly 12 may be returned to the primary striker capture position by closing the hood 13.

The pawl assembly 14 is configured for movement between a latched position whereat the pawl assembly 14 releasably locks the ratchet assembly 12 in the primary striker capture position and the secondary striker capture position, and an unlatched position whereat the pawl assembly 14 releases the ratchet assembly 12 to the release position. The hold-open device 16 prevents the pawl assembly 14 from moving from the unlatched position back to latched position while the ratchet assembly 12 is in the release position.

Figure 7:
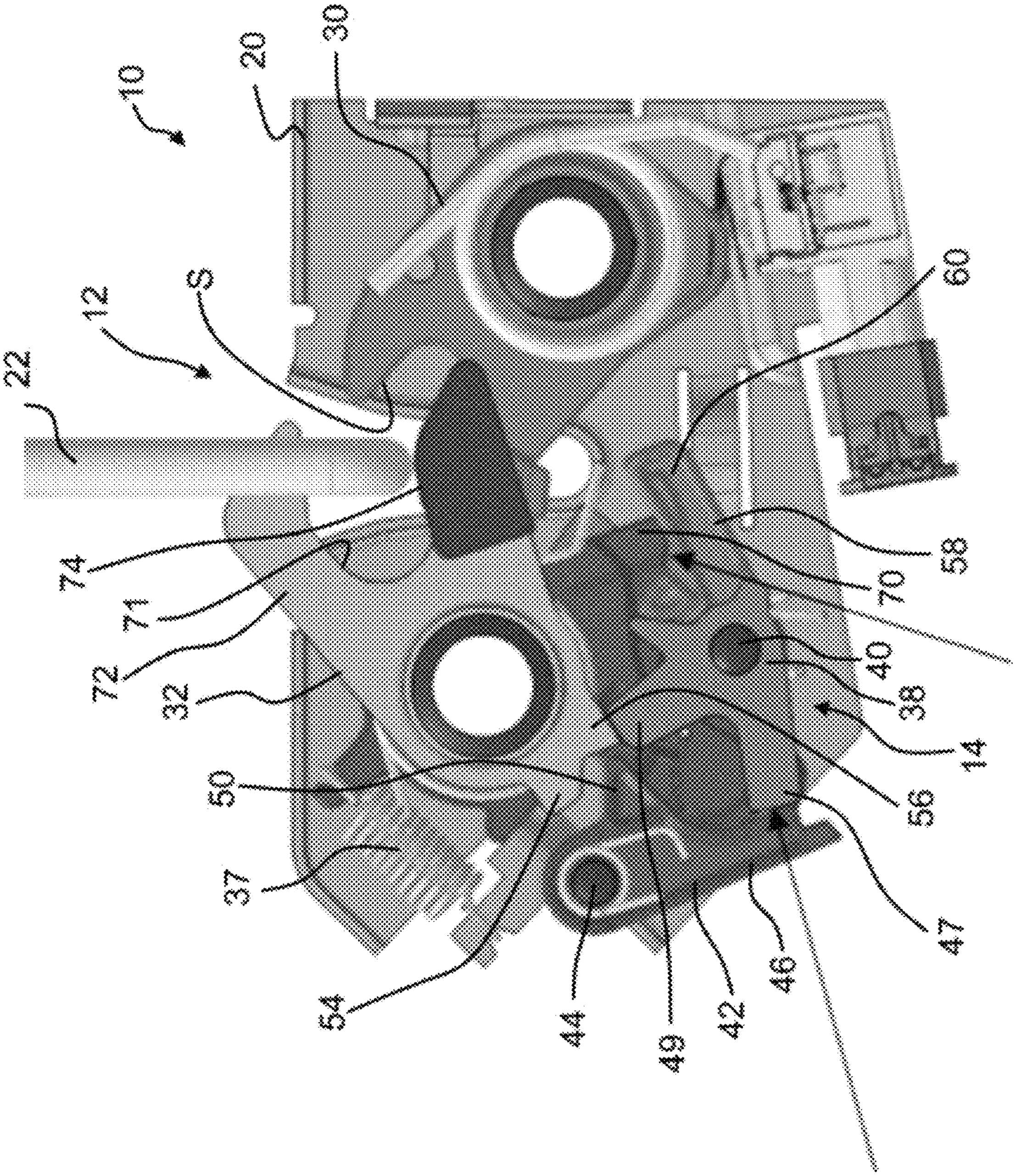
FIG. 7 is a view similar to FIG. 5 showing the coupling lever being engaged by the primary pawl.
Figure 8:
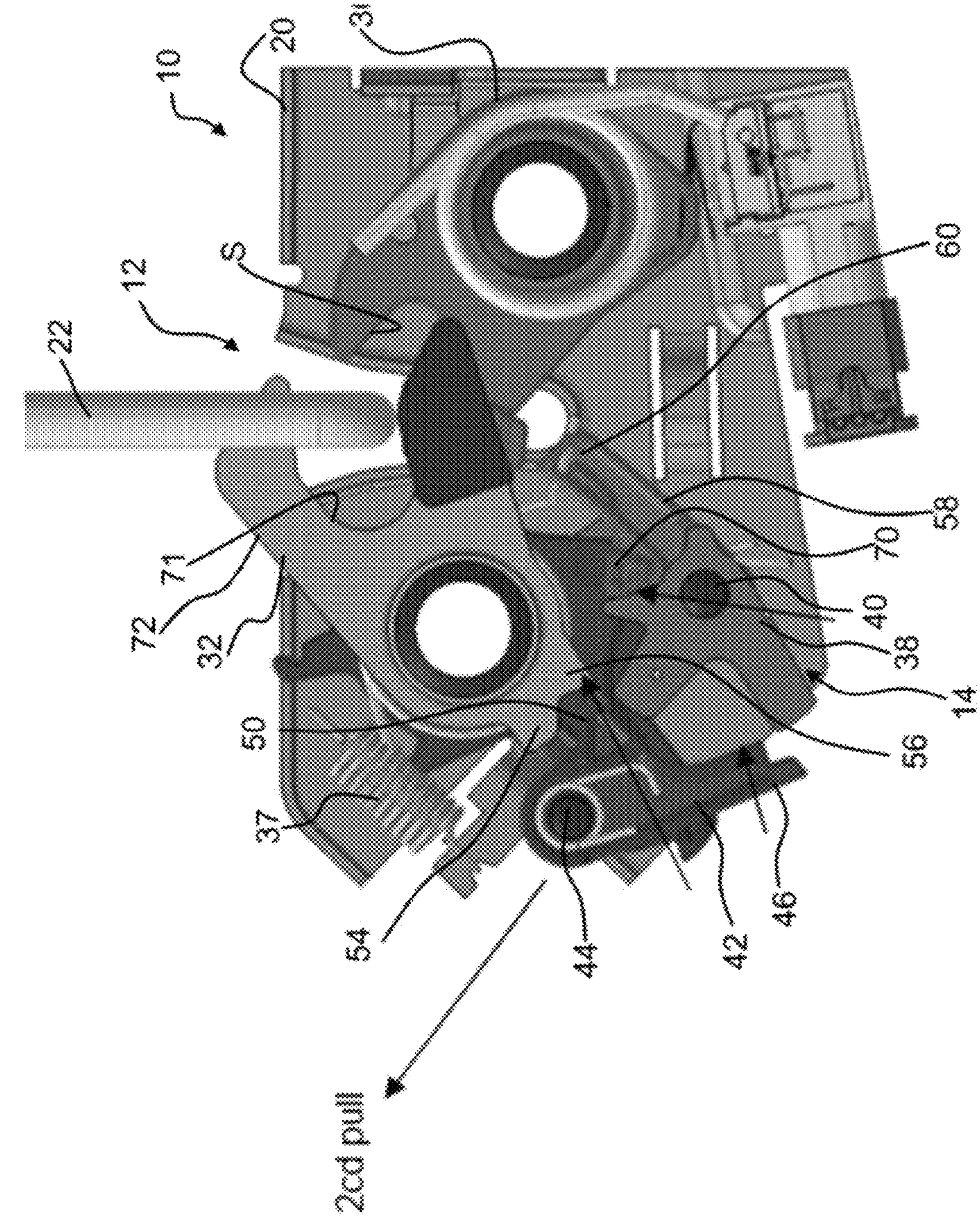
FIG. 8 is a view similar to FIG. 7 showing the double pull latch assembly during a second actuation of a primary pawl.
Figure 9:
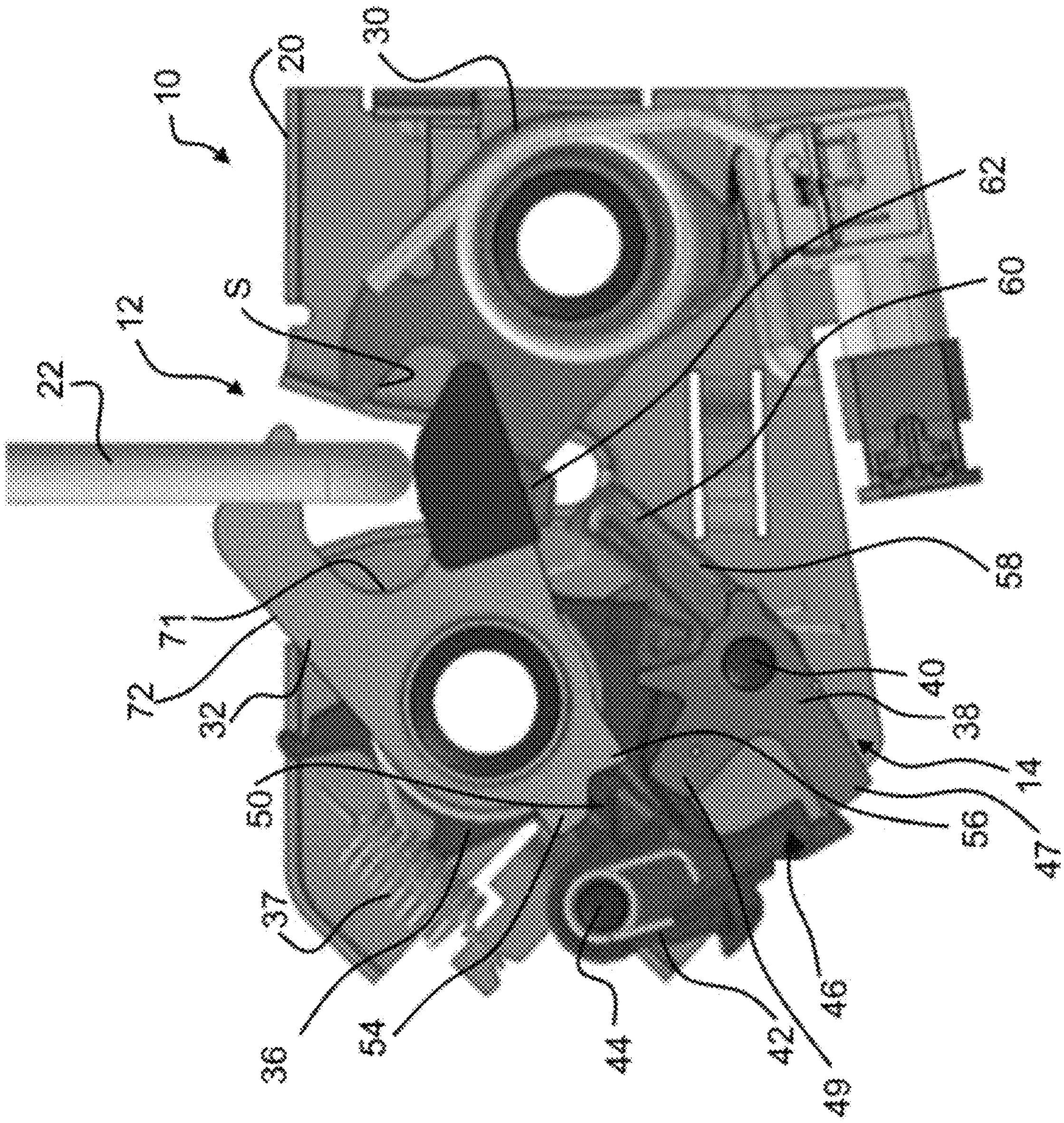
FIG. 9 is a view similar to FIG. 8 showing the safety hook pawl being rotated via movement of the primary pawl during the second actuation.

The pawl assembly 14 includes a primary pawl 36 configured for operable communication with the release member 24. The primary pawl 36 can be mounted in the housing 20 for movement between a rest position and an actuated position in response to actuation of the release member 24, wherein the primary pawl 36 is shown biased toward the rest position (counter clockwise as indicated by arrow 37' in FIG. 2) by a primary pawl biasing member 37. The primary pawl 36, as discussed further, can be moved to a first rest position, also referred to as ratchet locking position (FIG. 2), and a second rest position, also referred to as coupling lever retaining position (FIG. 7). The primary pawl 36 can further be moved to a first actuated position, also referred to as ratchet releasing position (FIGS. 3-5), and a second actuated position, also referred to as coupling lever and/or safety hook pawl releasing position (FIGS. 8 and 9). Primary pawl 36 is shown supported within housing 20 for pivotal movement, and in the exemplary embodiment, is supported by pin 33 for pivoting movement about an axis of pin 33.

The pawl assembly 14 includes a secondary pawl, also referred to as safety hook pawl 38, configured for operable communication with the release member 24, with primary pawl 36 functioning as an intermediate connection between release member 24 and secondary pawl 38, as discussed further below. Safety hook pawl 38 is mounted in the housing 20 for movement between a home position (FIG. 2), a secondary locking position, whereat the safety hook 32 is releasably maintained in the secondary striker capture position (FIG. 7) by a second leg 49 of safety hook pawl 38 to prevent the striker 22 from being removed from latch assembly 10, a secondary unlocking position (FIG. 10), whereat the safety hook 32 is in the release position, and an open position (FIG. 12), whereat the safety hook pawl 38 releasably maintains the safety hook 32 in its open position. Safety hook pawl 38 is biased from the home position toward the secondary locking position by a safety hook pawl biasing member 38'. Safety hook pawl 38 is shown supported within housing 20 for pivotal movement, and in the exemplary embodiment, is supported by a pin 40 for pivoting movement about an axis of pin 40.

Latch assembly 10 further includes a safety lever, also referred to as hold-open device 42, supported within housing 20 for pivotal movement, and in the exemplary embodiment, is supported by a pin 44 for pivoting movement about an axis of pin 44. Hold-open device 42 has a hold-open first projection 46 extending radially outwardly from pin 44 for engagement with a first leg 47 of the safety hook pawl 38 under a bias imparted by a hold-open biasing member 48 in the direction of arrow 48' to hold the safety hook pawl 38 in the secondary unlocking position, wherein hold-open first projection 46 is configured to releasably hold the secondary pawl 38 in the secondary unlocking position. Hold-open device 42 has a hold-open second projection 50, shown as extending generally transversely to hold-open first projection 46, configured for engagement with the secondary ratchet 32 in a notch 52 (FIG. 2) of secondary ratchet 32, with notch 52 being flanked by respective first and second secondary ratchet projections 54, 56. Hold-open second projection 50 interacts with first and second secondary ratchet projections 54, 56 to facilitate movement of the hold-open first projection 46 out from engagement with the secondary pawl 38 as secondary ratchet 32 moves from the release position toward one of the open position and the closed position. In particular, hold-open first projection 46 moves out of engagement with the secondary pawl 38 when secondary ratchet 32 moves from the release position toward the open position (FIG. 11), via first secondary ratchet projection 54 urging hold-open second projection 50 and hold-open device 42 to rotate clockwise against the bias of hold-open biasing member 48, thereby allowing secondary pawl 38 to move under the bias of secondary pawl biasing member 38' to the secondary unlocking position. Further, hold-open first projection 46 moves out of engagement with the secondary pawl 38 when secondary ratchet 32 moves from the release position toward the close position (FIG. 13), via second secondary ratchet projection 56 urging hold-open second projection 50 and hold-open device 42 to rotate clockwise against the bias of hold-open biasing member 48, thereby allowing secondary pawl 38 to move under the bias of secondary pawl biasing member 38' to the home position.

Latch assembly 10 further includes a coupling lever 58 supported for pivoting movement relative to secondary pawl 38, shown as being support for pivotal movement about an axis of pin 40. Coupling lever 58 has a coupling lever leg 60 arranged in abutment with a projection 62 of the primary ratchet 30 while the primary ratchet 30 is in its primary striker capture position whereat the primary ratchet 30 holds the coupling lever 58 against a rotational bias imparted by a coupling lever biasing member 64 (FIG. 2). Coupling lever 58 has a lug 66 extending laterally outwardly relative to leg 58, such that lug 66 is arranged in abutment with a projection 68 of the safety hook pawl 38 while the safety hook pawl 38 is in the secondary locking position, whereat the primary pawl 36 has a drive lug 70 (FIGS. 7 and 8) arranged in abutment with the coupling lever 58, wherein while performing a second actuation of the release member 24, the drive lug 70 of primary pawl 36 engages and imparts a bias on the coupling lever 58 to move the safety hook pawl 38, as a result of being driven the coupling lever 58, to the secondary unlocking position (FIG. 10).

While the safety hook 32 is in the release position, and while removing the striker 22 from the latch assembly 10, the striker 22, which is received in a slot 71 delineated by an upper hook, also referred to as first hook 72, and a lower hook, also referred to a second hook 74, of the safety hook 32, moves the safety hook 32 about pin 33 via engagement with the first hook 72. As the safety hook 32 pivots toward its open position, the first projection 54 imparts a bias on the second projection 50 of the hold-open device 42, thereby causing the first projection 46 of the hold-open device 42 to move out of engagement from the first leg 47 of the safety hook pawl 38 to allow the safety hook pawl 38 to move to its open position and the safety hook 32 to move under the bias of secondary pawl biasing member 38' to its open position, whereat the second leg 49 of the safety hook pawl 38 engages the safety hook first projection 54, thus, holding the safety hook 32 in its open position (FIG. 12).

In FIGS. 13-18, a closing sequence of returning striker 22 to the latched state, with primary ratchet 30 moved to its primary striker capture position is shown.

Figure 13:
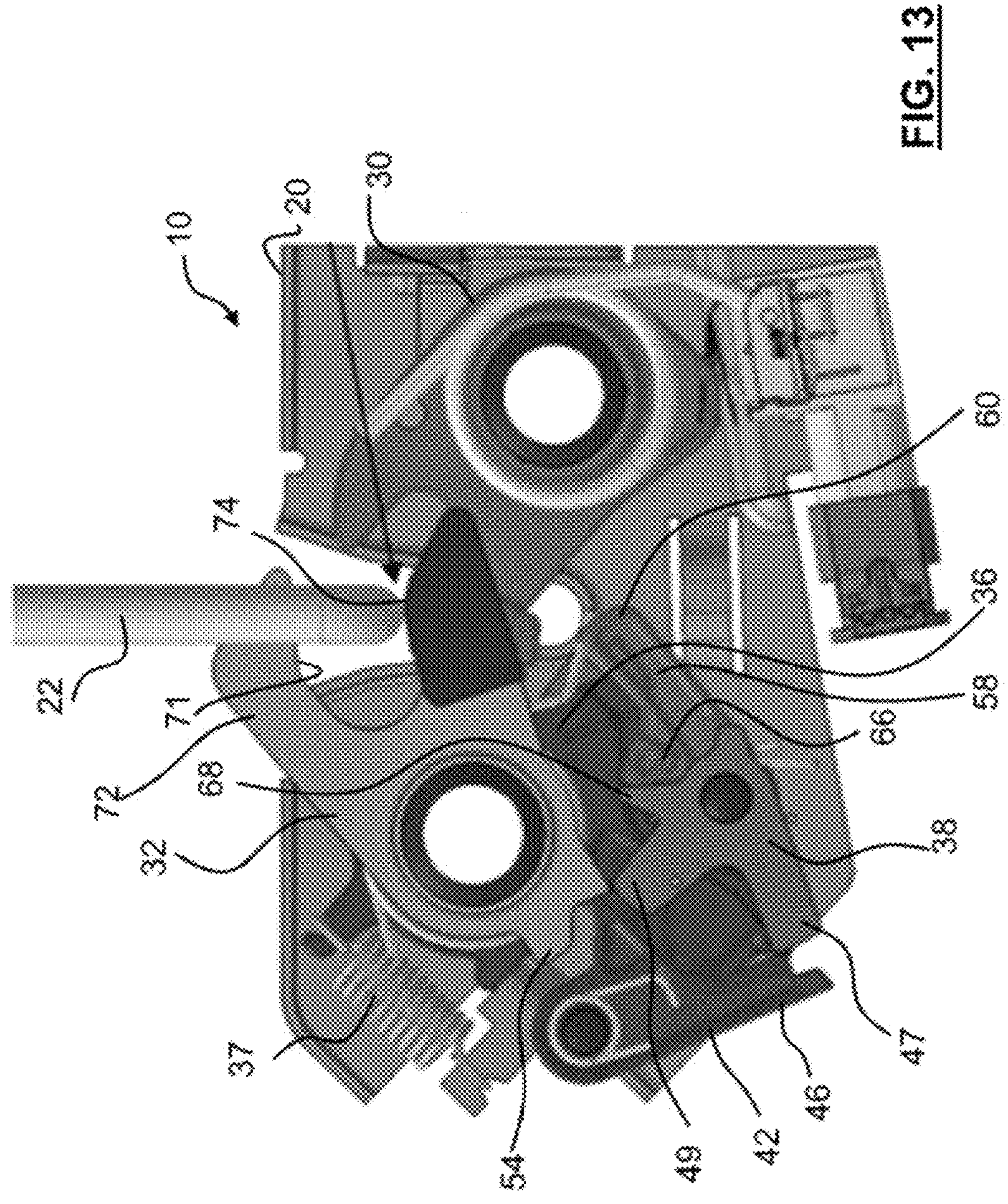
FIG. 13 illustrates the striker being returned into the latch assembly with the striker engaging a hook of the safety hook to cause initial rotation of the safety hook toward its closed position.
Figure 14:
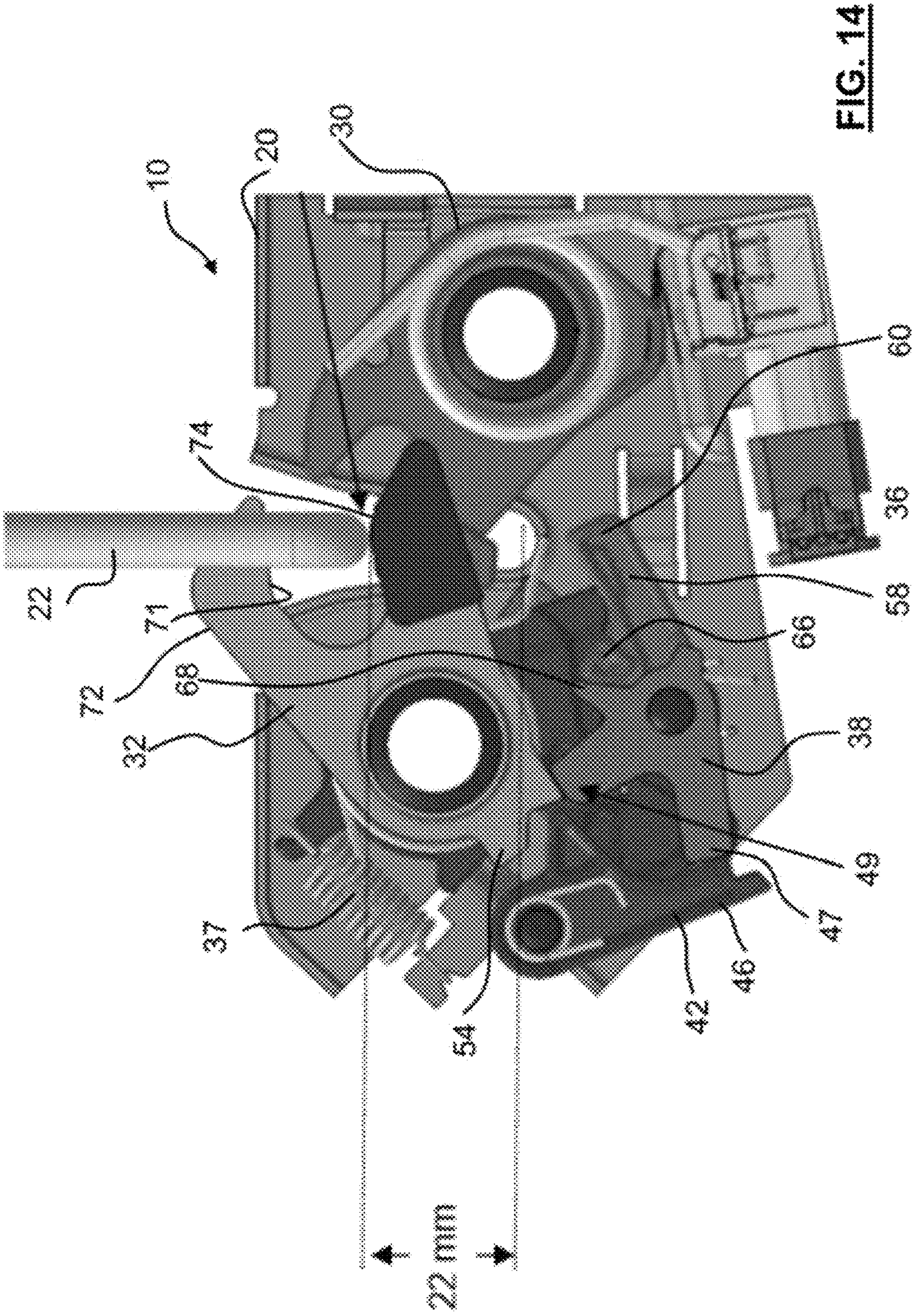
FIG. 14 is a view similar to FIG. 13 showing the safety hook returned to the secondary striker capture position.
Figure 15:
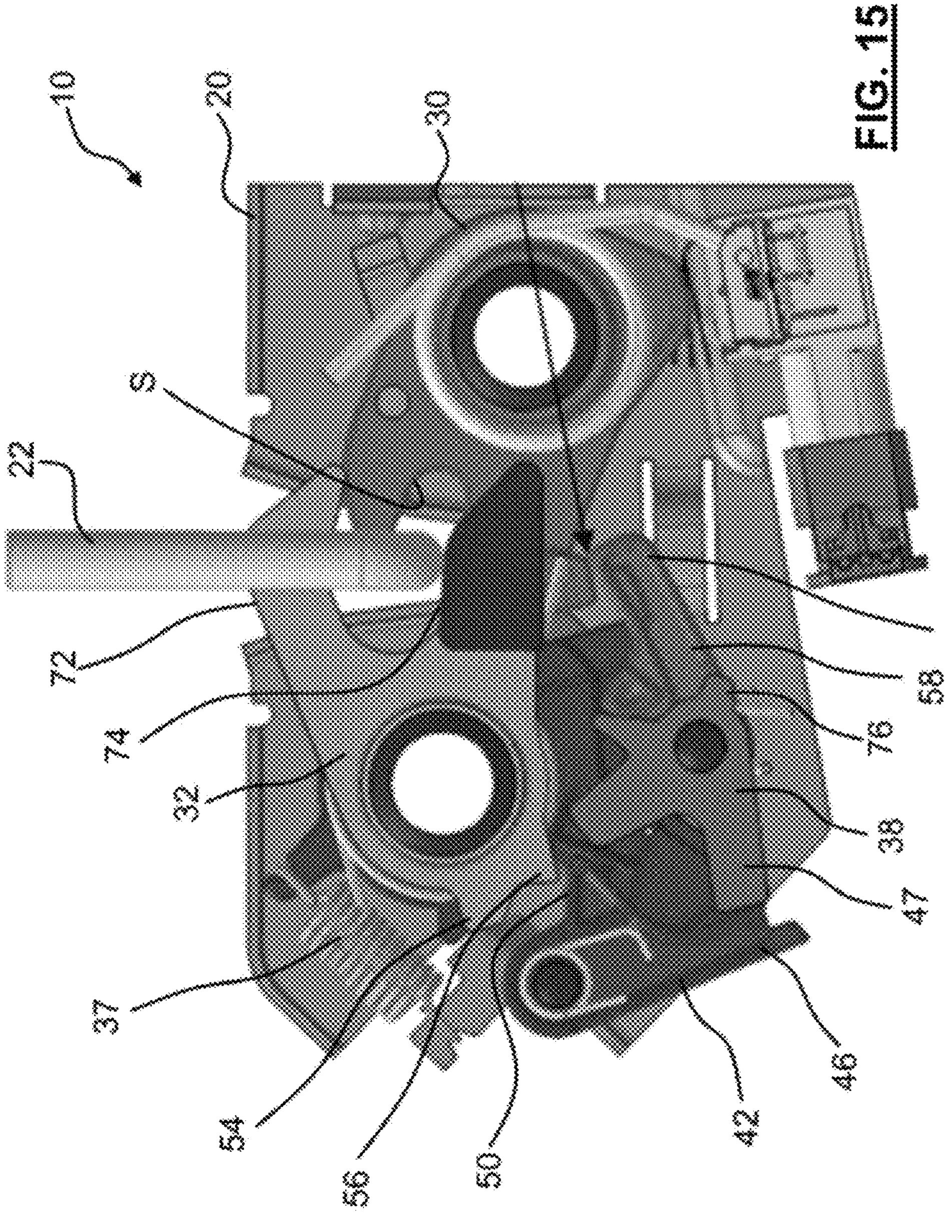
FIG. 15 is a view similar to FIG. 14 illustrating continued closing of the latch assembly with the ratchet being brought into engagement with the coupling lever.
Figure 16:
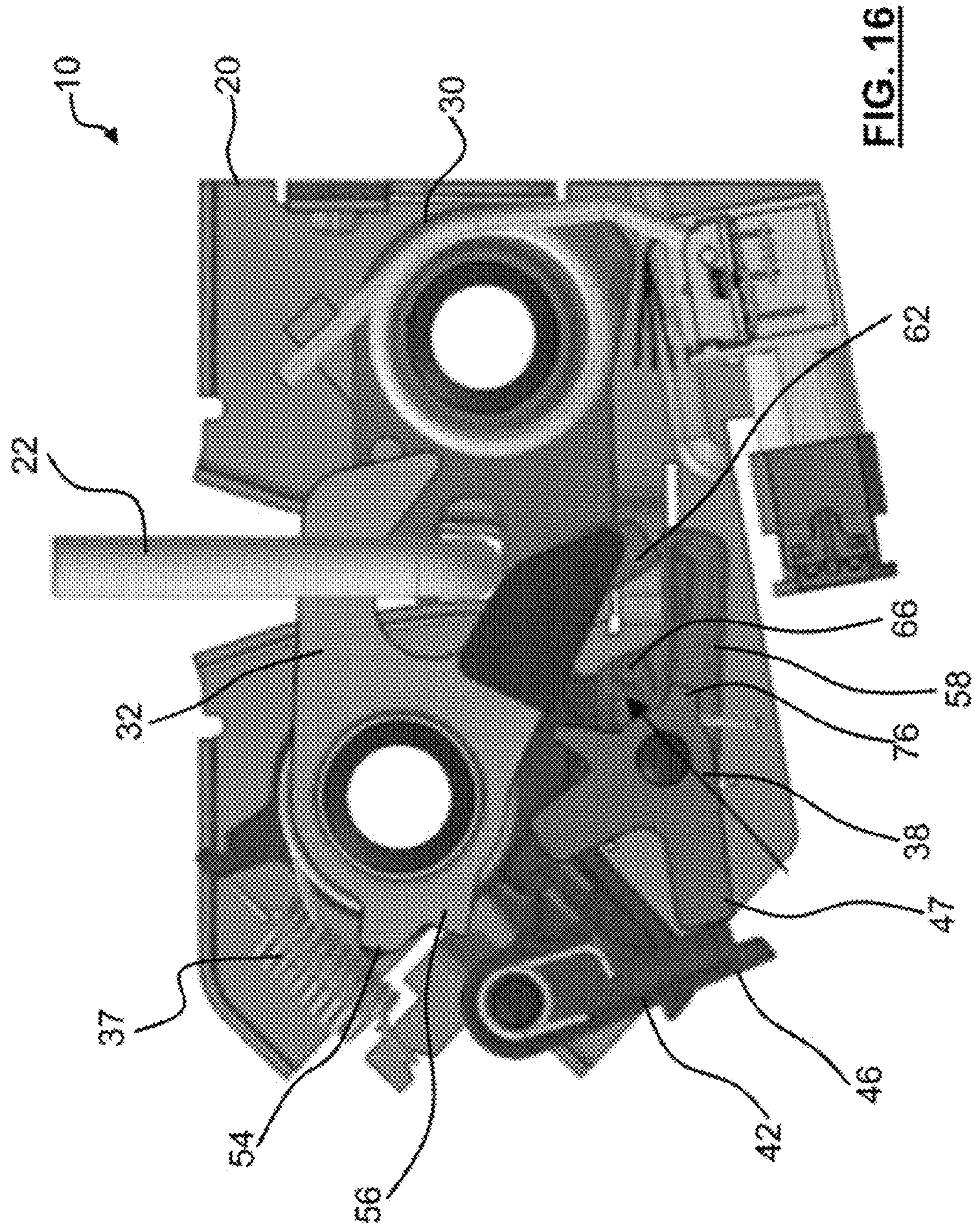
FIG. 16 is a view similar to FIG. 15 illustrating continued closing of the latch assembly with the coupling lever shown disengaged from the safety hook pawl and the ratchet in an over-travel position.
Figure 17:
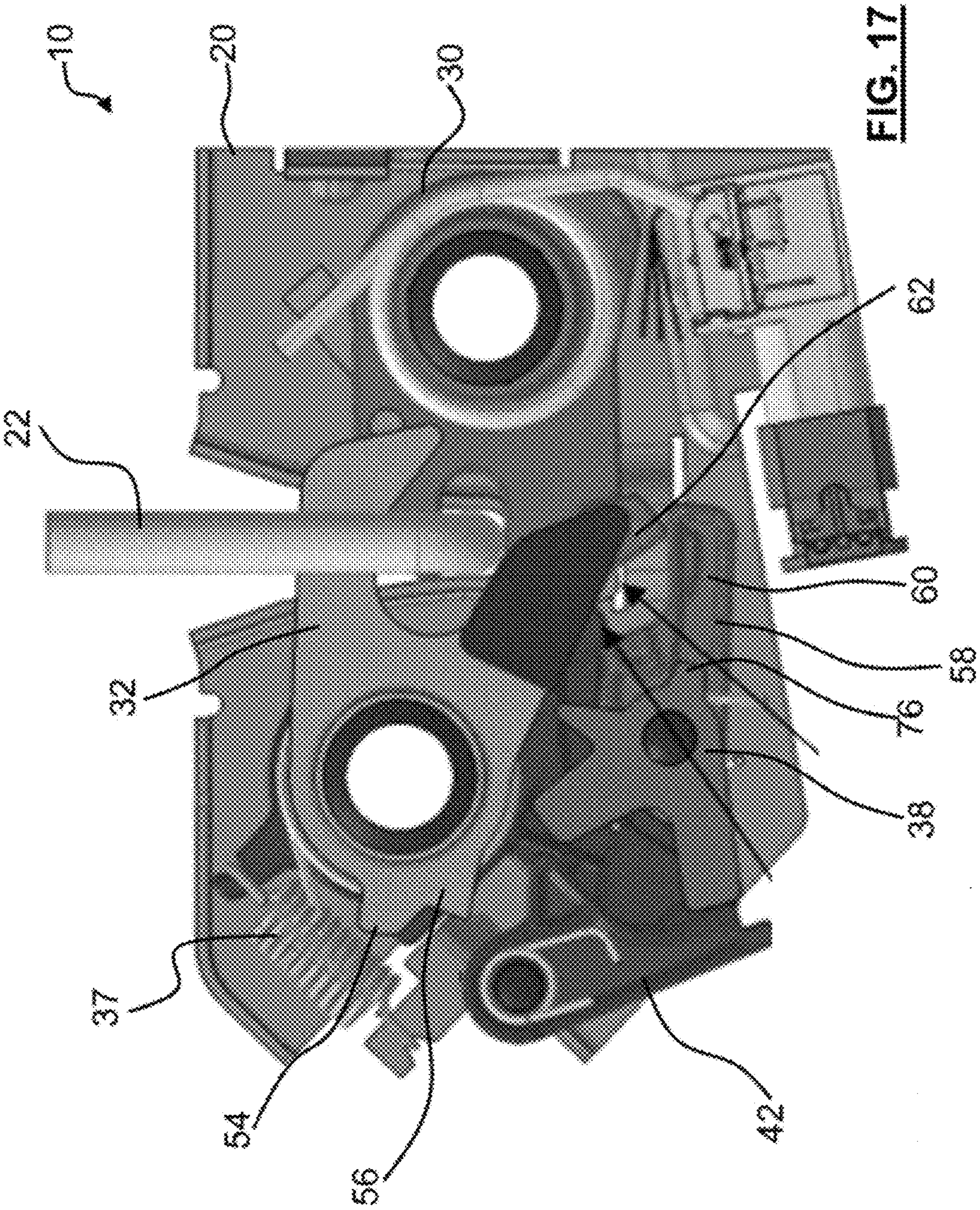
FIG. 17 is a view similar to FIG. 16 showing the primary pawl returned into engagement with the ratchet.
Figure 18:
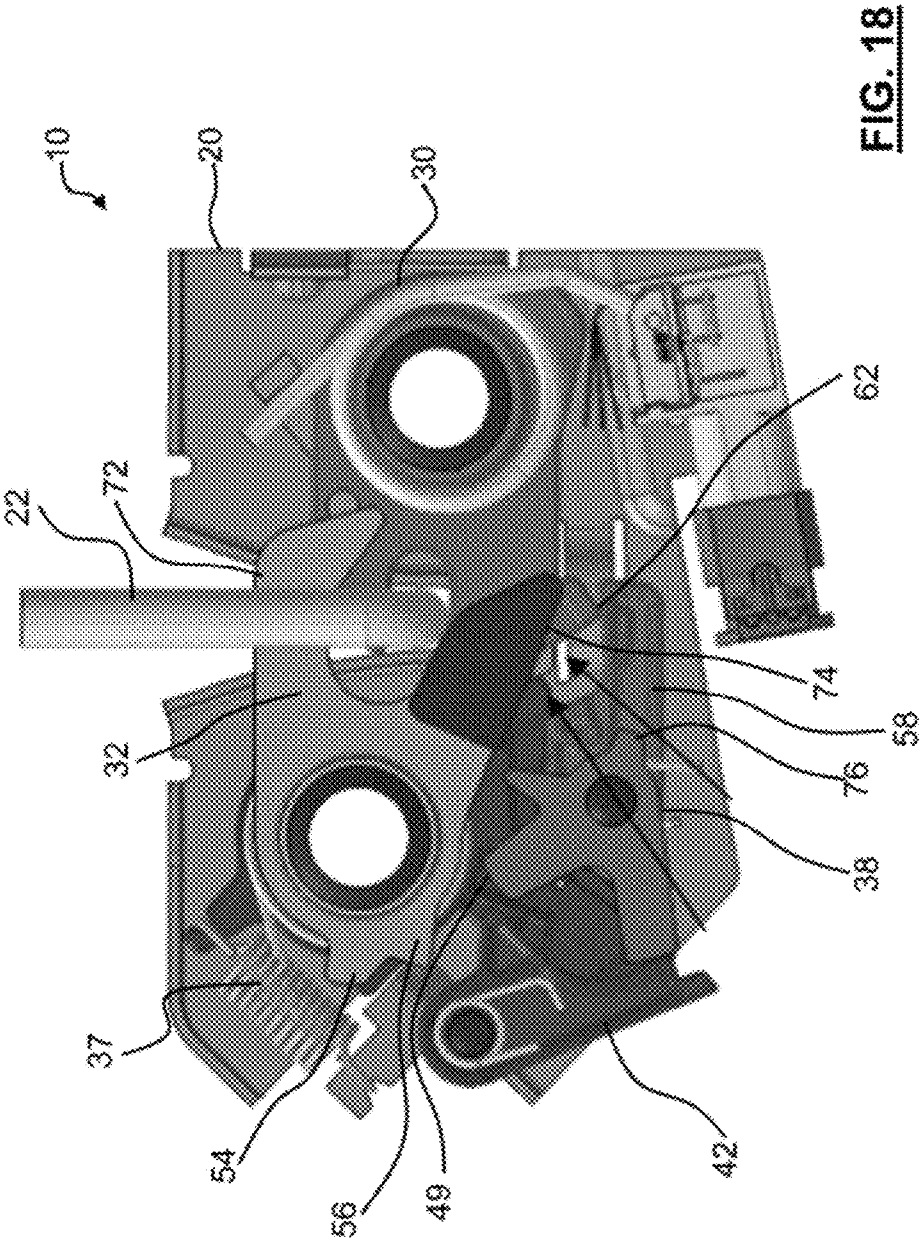
FIG. 18 is a view similar to FIG. 17 illustrating continued closing of the latch assembly with the ratchet returned to striker capture position.

FIG. 13 illustrates the striker 22 having engaged the second hook 74 of safety hook 32, thereby causing safety hook 32 to pivot about an axis of pin 33 with striker 22 entering slot 71 of safety hook 32. During pivoting movement of safety hook 32, striker 22 does not contact primary ratchet 30, but rather, safety hook 32 engages an outwardly extending portion projection 62, thereby causing primary ratchet to pivot about pin 31 in a counterclockwise direction against the bias imparted by primary ratchet biasing member 35. During initial rotation of safety hook 32, the second secondary ratchet projection 56 engages and imparts a bias on the second leg 49 of secondary pawl 38 and causes secondary pawl 38 to rotate against the bias of secondary pawl biasing member 38' until secondary ratchet projection 56 bypasses second leg 49 and projection 62 of primary ratchet 30 engages coupling lever leg 60. As primary ratchet 30 continues to pivot toward its primary striker capture position under the urging of safety hook 32, projection 62 of primary ratchet 30 urges coupling lever leg 60 to move clockwise against the bias of coupling lever biasing member 64 to bring the lug 66 of the coupling lever 58 into engagement with a tab 76 of the safety hook pawl 38 (FIG. 16), whereat primary ratchet 30 is permitted to travel to an over-travel position slightly beyond its primary striker capture position, such as by 1-2 mm, by way of example and without limitation (FIG. 17), and then return under bias to the primary striker capture position (FIG. 18).

Figure 19:
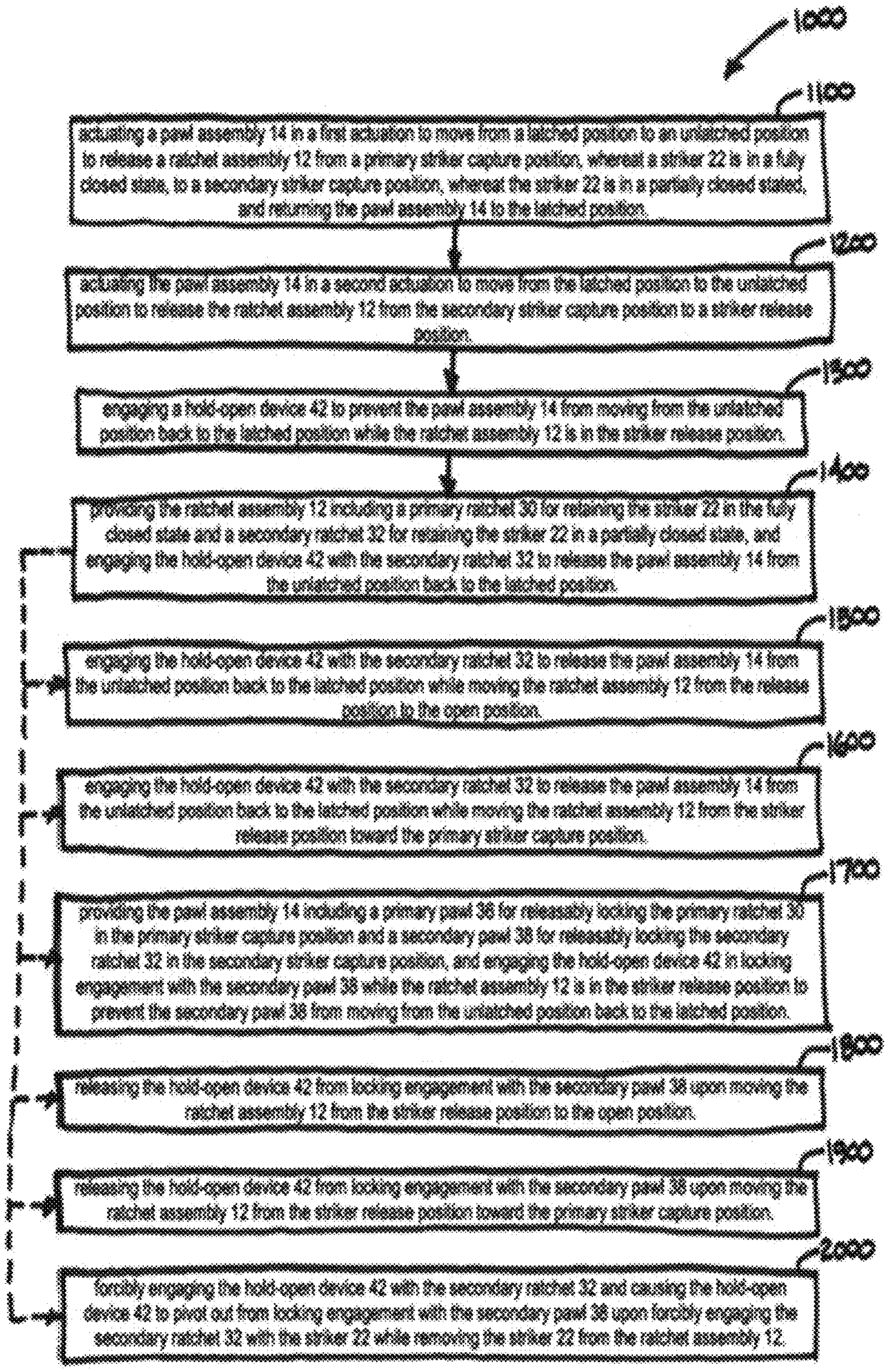
FIG. 19 is a flow diagram illustrating a method of operating a double pull latch assembly in accordance with another aspect of the disclosure.

In accordance with another aspect of the disclosure, as illustrated in FIG. 19, a method 1000 of operating a double pull latch assembly is provided. The method 1000 includes a step 1100 of actuating a pawl assembly 14 in a first actuation to move from a latched position to an unlatched position to release a ratchet assembly 12 from a primary striker capture position, whereat a striker 22 is in a fully closed state, to a secondary striker capture position, whereat the striker 22 is in a partially closed stated, and returning the pawl assembly 14 to the latched position. Next, a step 1200 of actuating the pawl assembly 14 in a second actuation to move from the latched position to the unlatched position to release the ratchet assembly 12 from the secondary striker capture position to a striker release position. Then, a step 1300 of engaging a hold-open device 42 to prevent the pawl assembly 14 from moving from the unlatched position back to the latched position while the ratchet assembly 12 is in the striker release position.

The method 1000 can further include a step 1400 of providing the ratchet assembly 12 including a primary ratchet 30 for retaining the striker 22 in the fully closed state and a secondary ratchet 32 for retaining the striker 22 in a partially closed state, and engaging the hold-open device 42 with the secondary ratchet 32 to release the pawl assembly 14 from the unlatched position back to the latched position.

The method 1000 can further include a step 1500 of engaging the hold-open device 42 with the secondary ratchet 32 to release the pawl assembly 14 from the unlatched position back to the latched position while moving the ratchet assembly 12 from the release position to the open position.

The method 1000 can further include a step 1600 of engaging the hold-open device 42 with the secondary ratchet 32 to release the pawl assembly 14 from the unlatched position back to the latched position while moving the ratchet assembly 12 from the striker release position toward the primary striker capture position.

The method 1000 can further include a step 1700 of providing the pawl assembly 14 including a primary pawl 36 for releasably locking the primary ratchet 30 in the primary striker capture position and a secondary pawl 38 for releasably locking the secondary ratchet 32 in the secondary striker capture position, and engaging the hold-open device 42 in locking engagement with the secondary pawl 38 while the ratchet assembly 12 is in the striker release position to prevent the secondary pawl 38 from moving from the unlatched position back to the latched position.

The method 1000 can further include a step 1800 of releasing the hold-open device 42 from locking engagement with the secondary pawl 38 upon moving the ratchet assembly 12 from the striker release position to the open position.

The method 1000 can further include a step 1900 of releasing the hold-open device 42 from locking engagement with the secondary pawl 38 upon moving the ratchet assembly 12 from the striker release position toward the primary striker capture position.

The method 1000 can further include a step 2000 of forcibly engaging the hold-open device 42 with the secondary ratchet 32 and causing the hold-open device 42 to pivot out from locking engagement with the secondary pawl 38 upon forcibly engaging the secondary ratchet 32 with the striker 22 while removing the striker 22 from the ratchet assembly 12.

Figure 20:
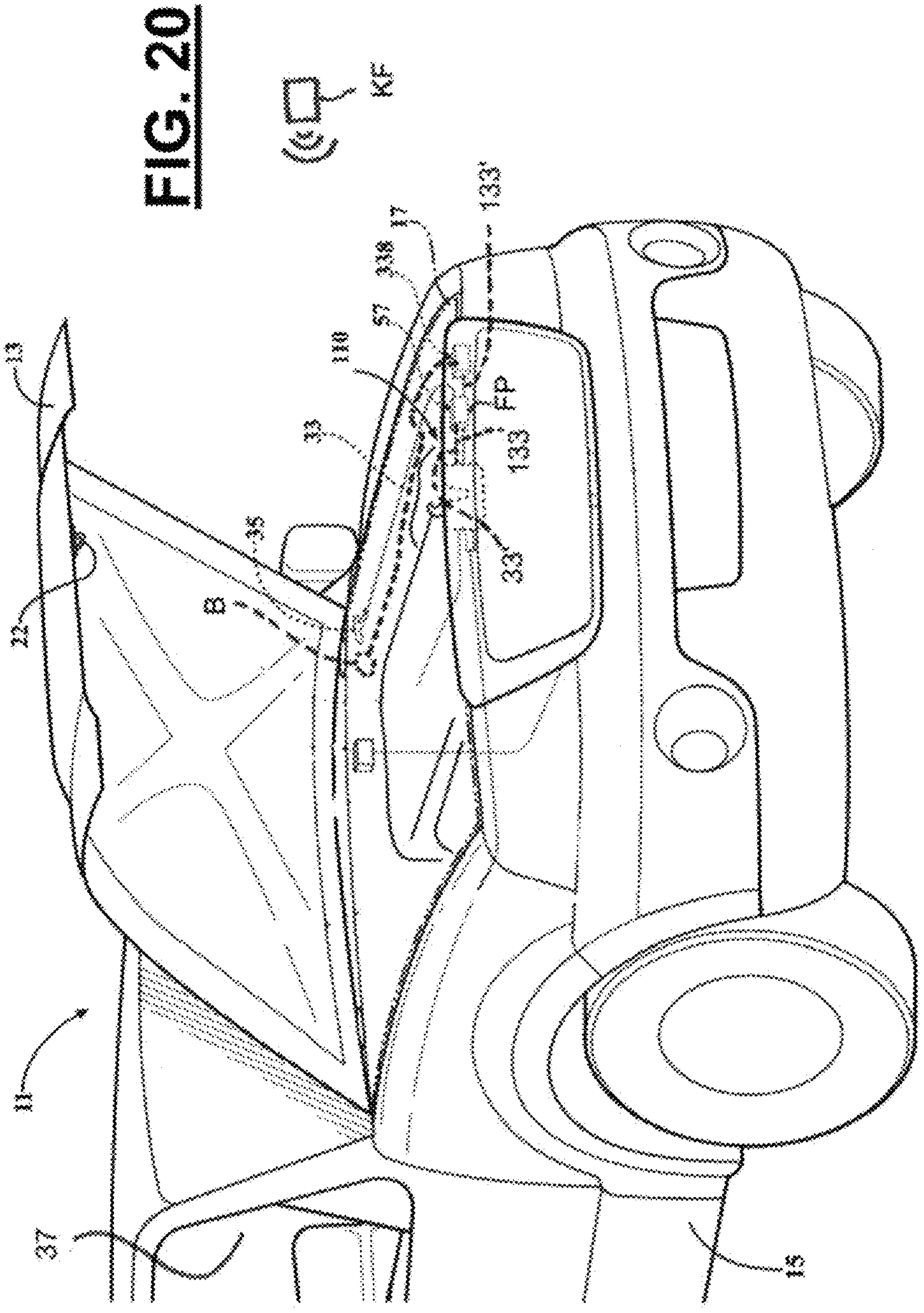
FIG. 20 is a front perspective view of a vehicle including a double pull latch system for front hood in accordance with another aspect of the disclosure.

In accordance with a further aspect, reference is made to FIG. 20, which shows a motor vehicle 11 that has a front hood 13, to which there is a striker 22 attached. Front hood 13 may enclose a front trunk 17, also referred to as frunk 17, for storage in a compartment provided in the front of the vehicle where an engine typically would occupy but has been provided at another location in the vehicle. The striker 22 is capturable by a double pull closure panel latch assembly, which can also be referred to as a double pull hood latch assembly if used in a vehicle hood application, and is generally referred to hereafter simply as latch assembly or latch 110, which is mounted on a body 15 of the motor vehicle 11. The front hood 13 can be opened to allow access to the stowage space, or frunk 17, with an engine of the vehicle being located elsewhere, such as in the rear of the vehicle, by way of example and without limitation.

Referring to FIGS. 21A-28B, a latch assembly, also referred to as latch 110, constructed in accordance with one aspect of the disclosure for incorporation into motor vehicle 11 is shown. Latch 110 includes a ratchet 112, a pawl assembly, shown as including a primary pawl 114, a secondary pawl 116 and a coupling link, also referred to as coupling lever 118, by way of example and without limitation. It is to be recognized that pawl assembly could include a single pawl configured for double actuation, if desired. The ratchet 112 is movable between a primary latched or closed position (FIGS. 21A-22B, 25A-26B), a secondary latched or closed position (FIGS. 23A-23B) and an open position in response to selective movement of the primary and secondary pawls 114, 116. The pivotal movement of the ratchet 112 may take place about a pin 125 that can be mounted to a housing (not shown). In the primary and secondary closed positions, the ratchet 112 prevents the withdrawal of the striker 22, which is mounted to the vehicle hood 13 and/or some other closure panel having latch 110, from a ratchet slot 23 of ratchet 112. When in the primary closed position, the hood 13 is in a fully closed state, as compared to when ratchet 112 is in the secondary closed position (FIGS. 23A and 23B), wherein the hood 13 is in a partially closed state, but prevented from being moved to the fully open position by striker 22 remaining captured by a hook-shaped finger 25 of ratchet 112 forming a lead-in portion of ratchet slot 23.

Primary pawl 114 has a primary locking surface 126 configured for selective engagement with a primary lock surface 142 of ratchet 112 while primary pawl 114 is in a home position. Primary pawl 114 is biased toward the ratchet 112 to its home position and the primary locking position via any suitable biasing member, such as a spring member, shown schematically in FIG. 21B at arrow 132. As such, spring member 132 is intended to bias primary pawl 114 into engagement with ratchet 112 to allow ratchet 112 to be releasably maintained in the desired primary or second locking position, and to allow ratchet 112 to be returned to the primary locking position upon returning the hood 13 to it fully closed state. Accordingly, proper operation and functionality of latch 110, and ratchet 112 thereof, requires primary pawl 114 to be free to return under the bias of spring member 132 to its home position into engagement with ratchet 112.

Figure 21B:
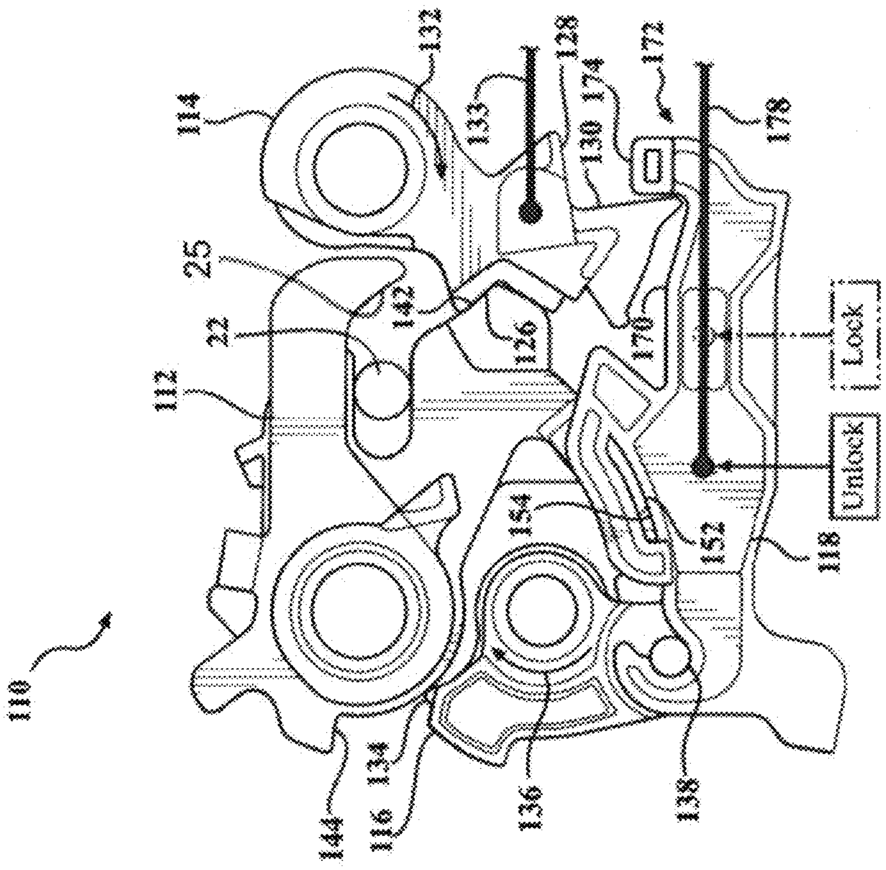
FIGS. 21A and 21B are opposite side views of a double pull latch assembly associated with the vehicle shown in FIG. 20 shown in a fully latched position and constructed according to one aspect of the present disclosure.
Figure 21A:
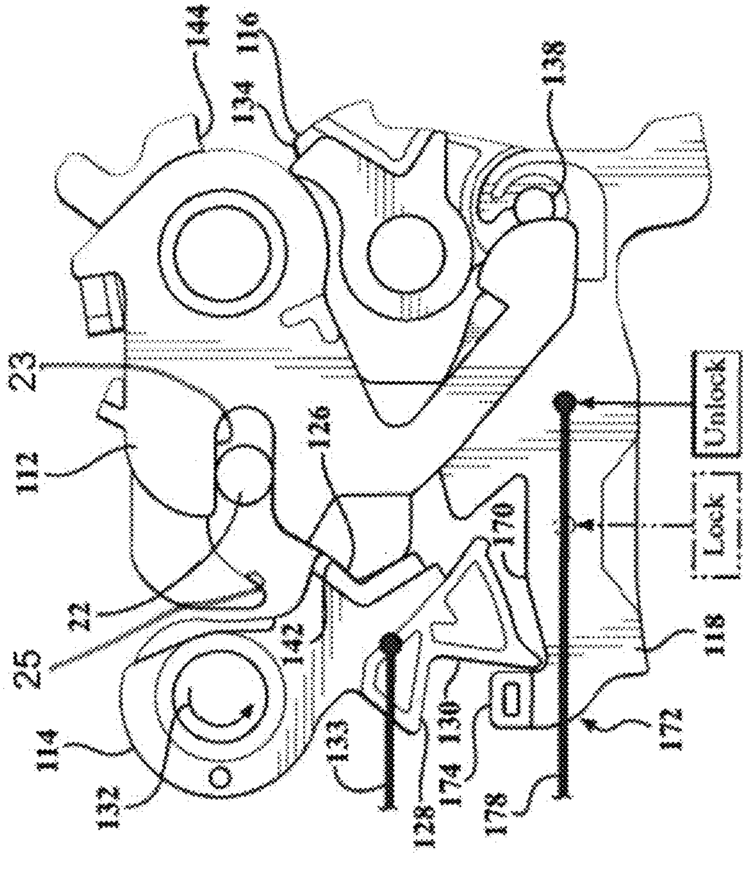
Figure 22B:
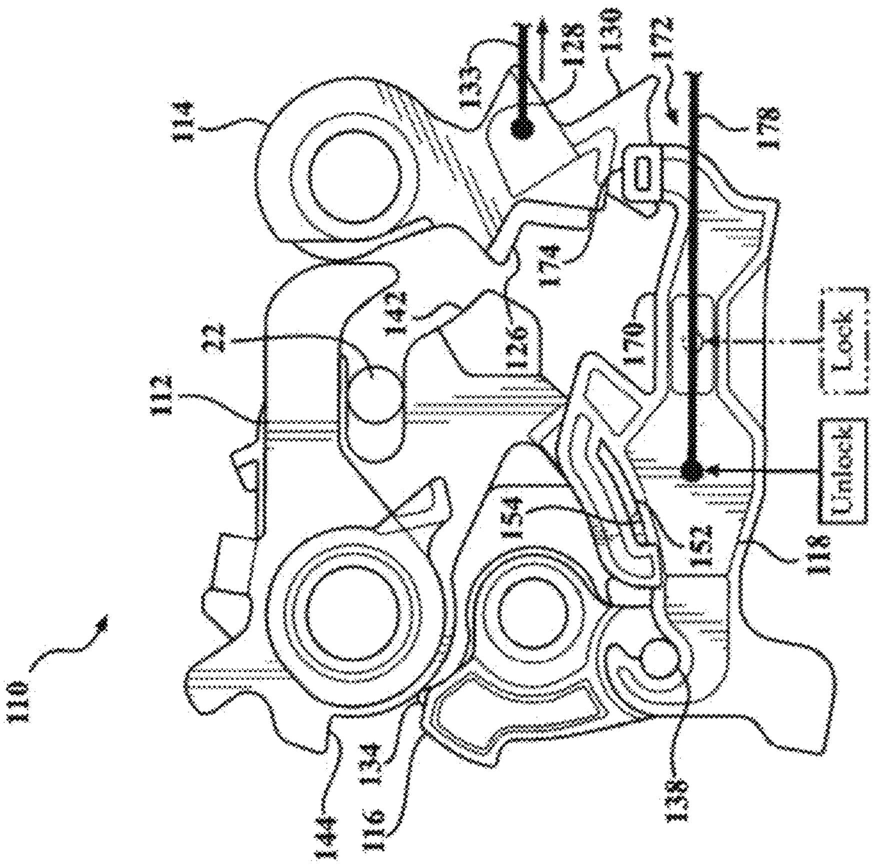
FIGS. 22A and 22B are views similar to FIGS. 21A and 21B with the double pull latch assembly shown during a first actuation of a primary pawl.
Figure 22A:
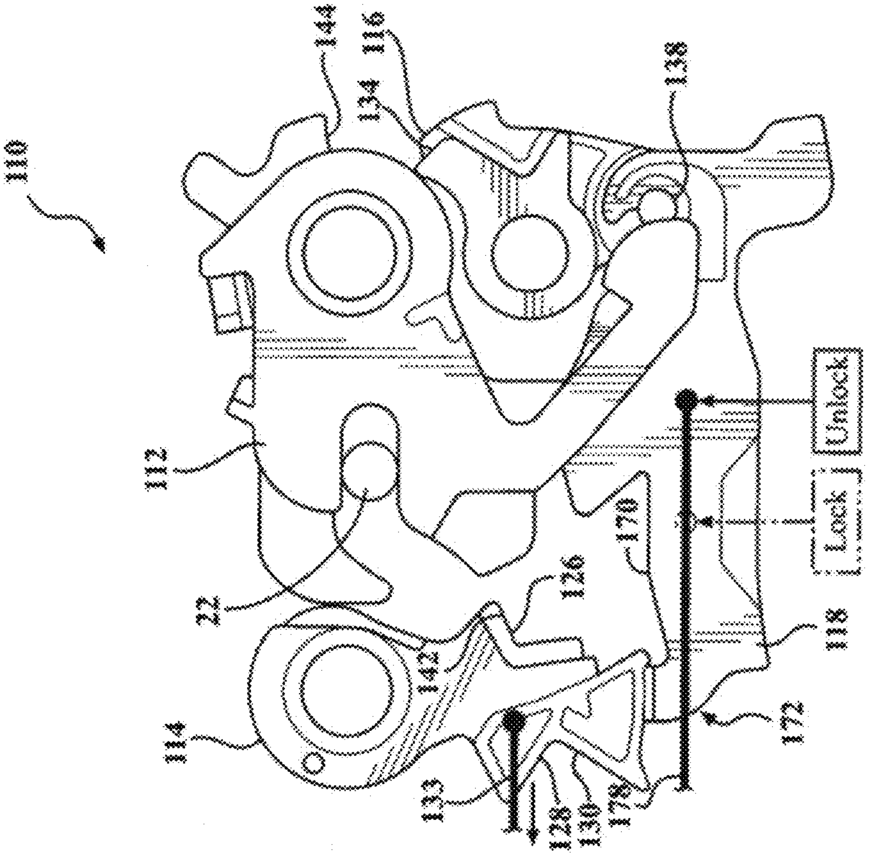

Secondary pawl 116 has a secondary locking surface 134 biased into abutment with ratchet 112 via any suitable biasing member, such as a spring member, shown schematically in FIG. 21B at arrow 136, by way of example and without limitation. Primary pawl 114 and secondary pawl 116 form a pawl mechanism or assembly mounted in the housing that is operable in a primary locking state, a secondary locking state and an unlocking state. The pawl assembly or mechanism is configured in the primary locking state to hold the ratchet 112 in the primary closed position, also referred to as primary striker capture position, and in the secondary locking state to hold the ratchet 112 in a secondary closed position, also referred to as secondary striker capture position, and in the unlocking state to release the ratchet 112 from the primary closed position to the second closed position and from secondary closed position to the open position.

Figure 23B:
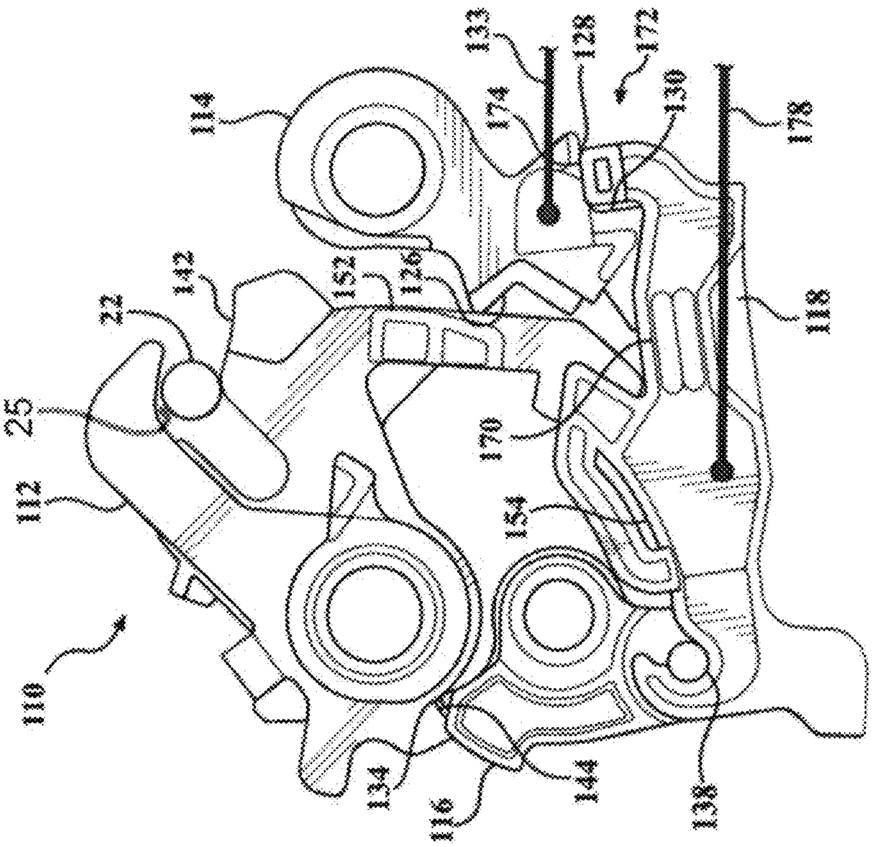
FIGS. 23A and 23B are views similar to FIGS. 22A and 22B with the double pull latch assembly shown after completion of the first actuation.
Figure 23A:
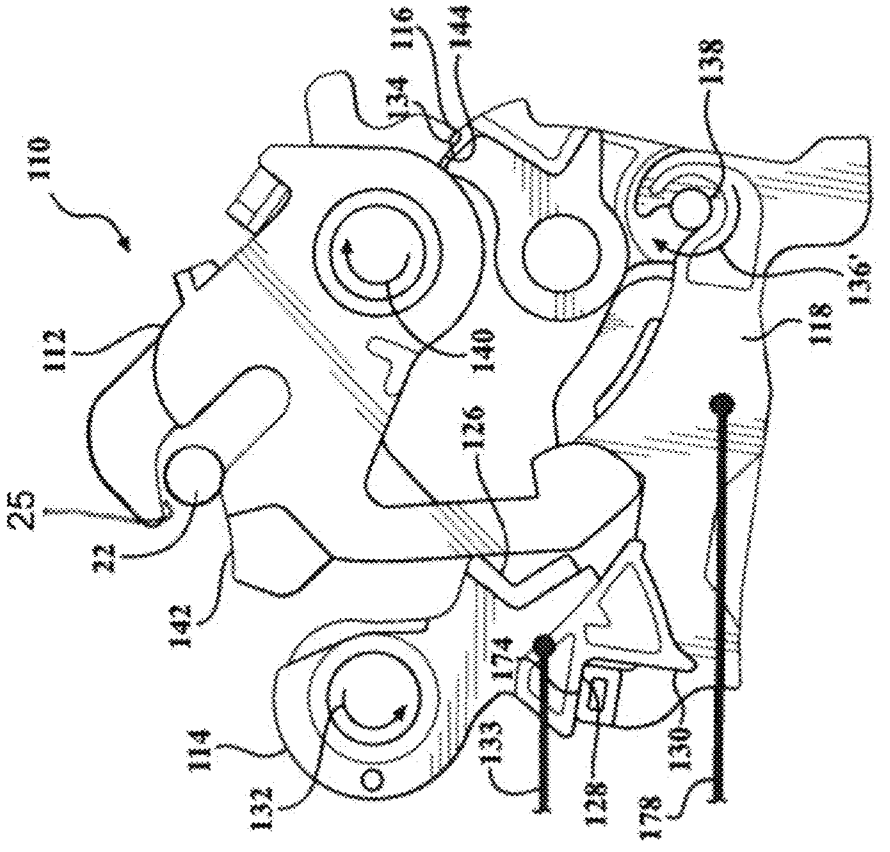

The coupling lever 118 is pivotably mounted to the secondary pawl 116 via pin 138 for movement between a disengaged position, also referred to as home position (FIGS. 21A-22B) and a connected position, also referred to as an engaged position (FIGS. 23A-24B). The coupling lever 118 is biased toward the engaged position by any suitable biasing member, and is shown as being biased schematically in the direction of arrow 136' (FIG. 23A). Coupling lever 118 extends along a generally straight portion 170 from pin 138 to a generally hook-shaped portion 172 that terminates at a free end 174. Coupling lever 118 is an illustrative example of a coupling mechanism between primary pawl 114 and secondary pawl 116.

Figure 25B:
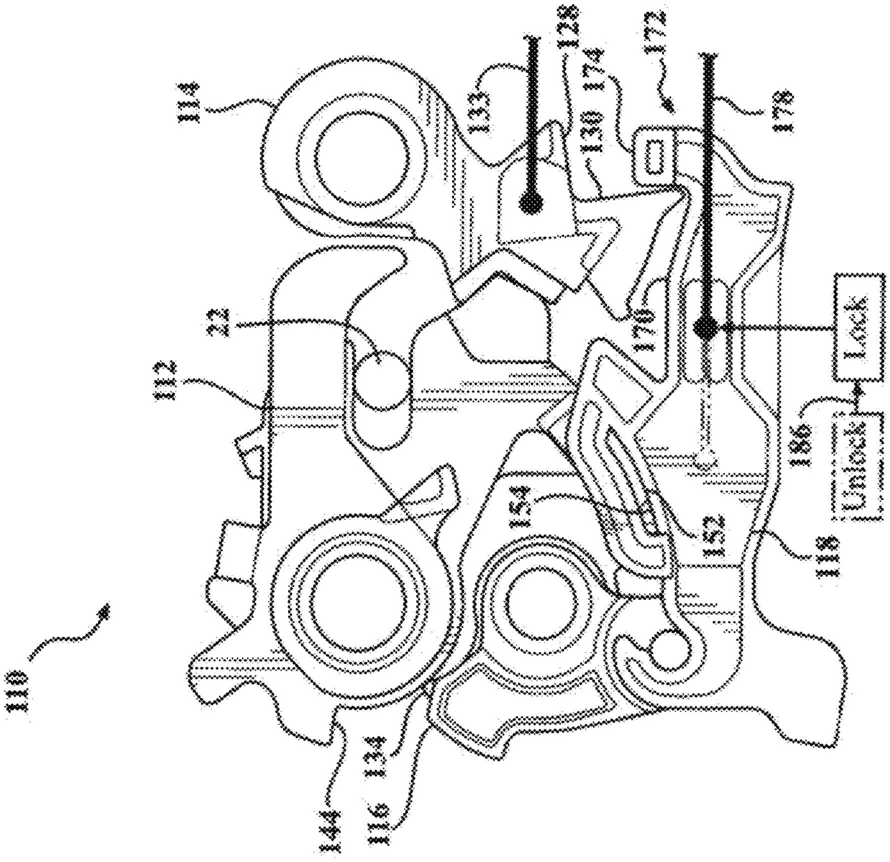
FIGS. 25A and 25B are views similar to FIGS. 21A and 21B with the double pull latch assembly shown while the vehicle is in a predetermined condition causing an actuator to move a coupling lever to a disengaged position.
Figure 25A:
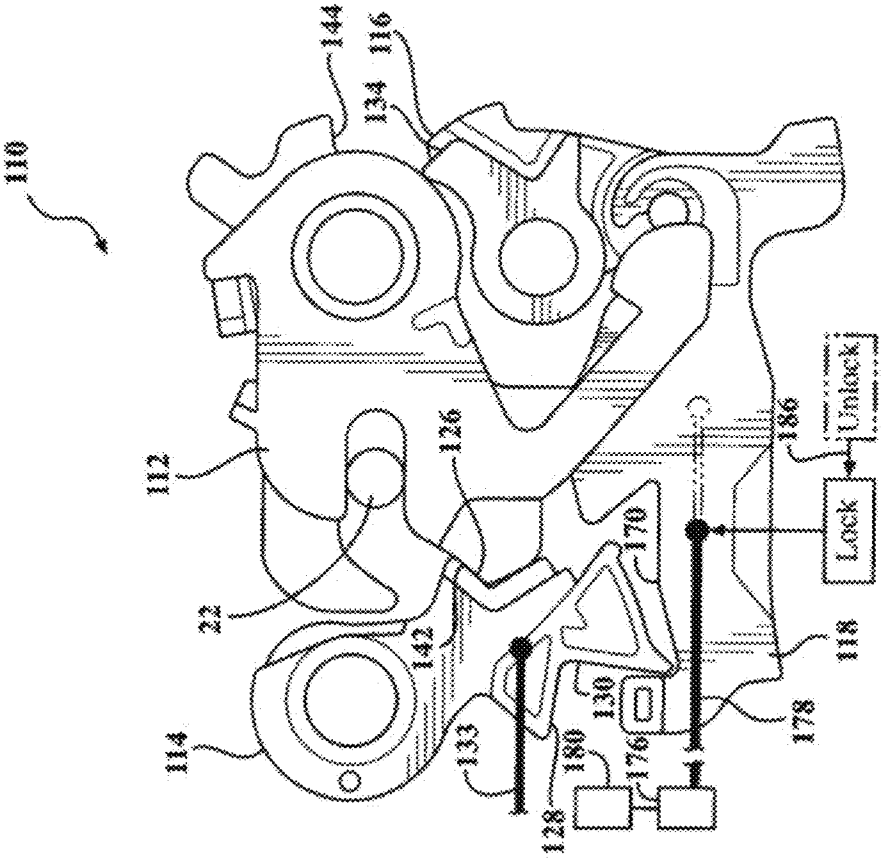
Figure 26B:
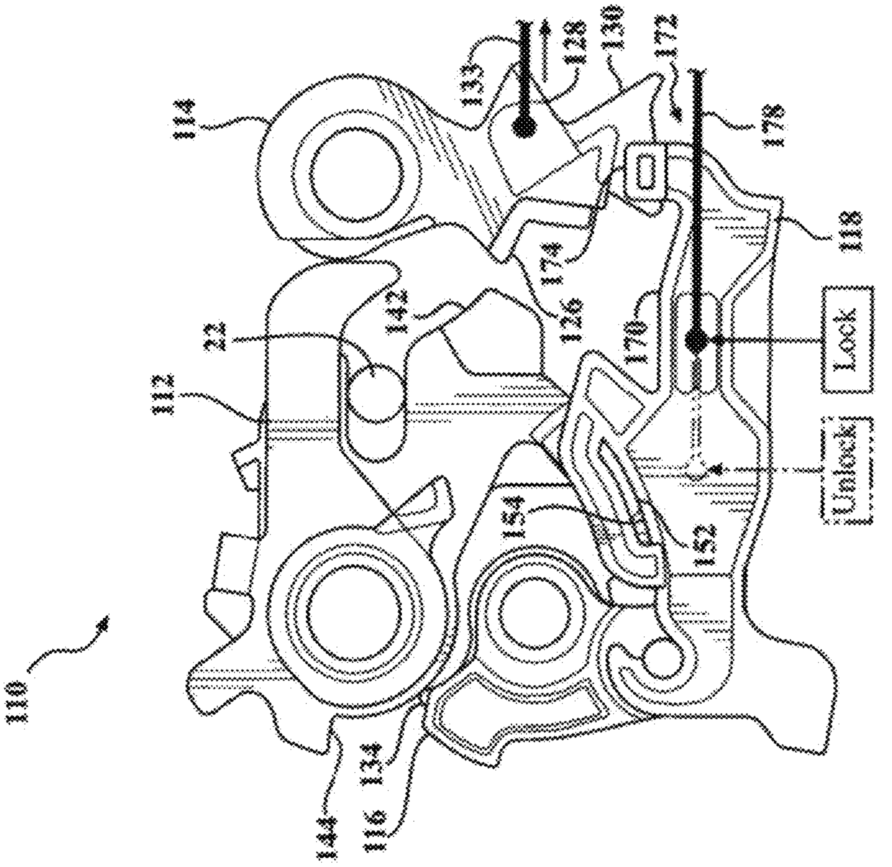
FIGS. 26A and 26B are views similar to FIGS. 25A and 25B with the double pull latch assembly shown during a first actuation of primary pawl with the coupling lever moved to the disengaged position.
Figure 26A:
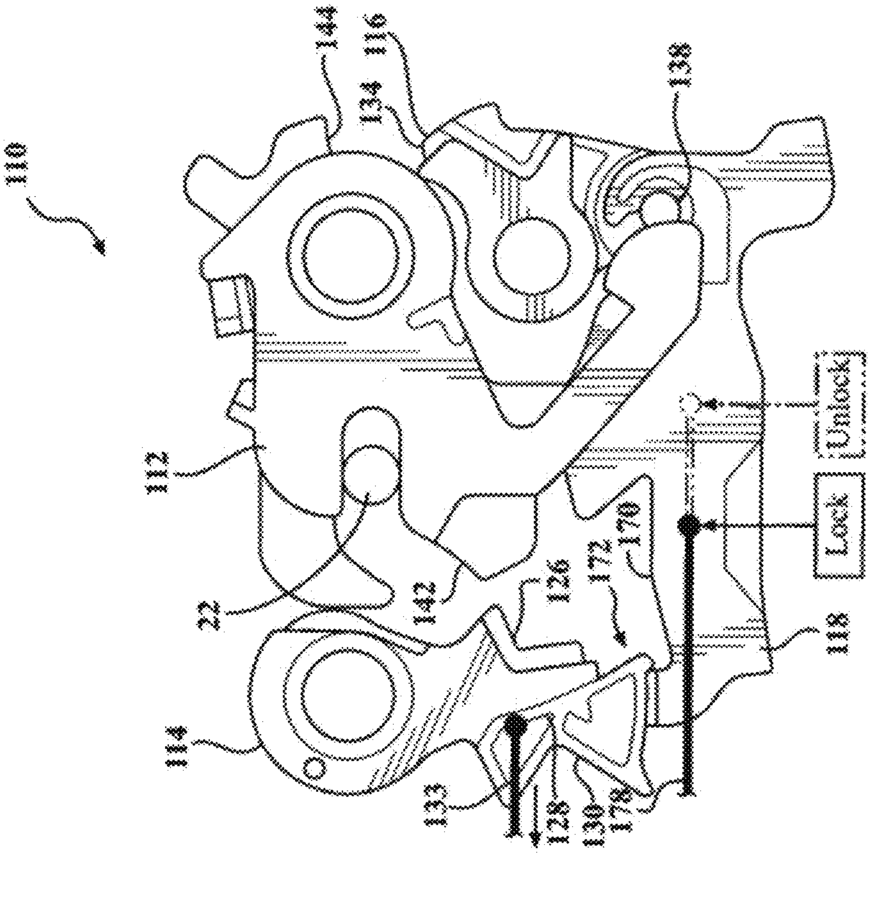
Figure 27B:
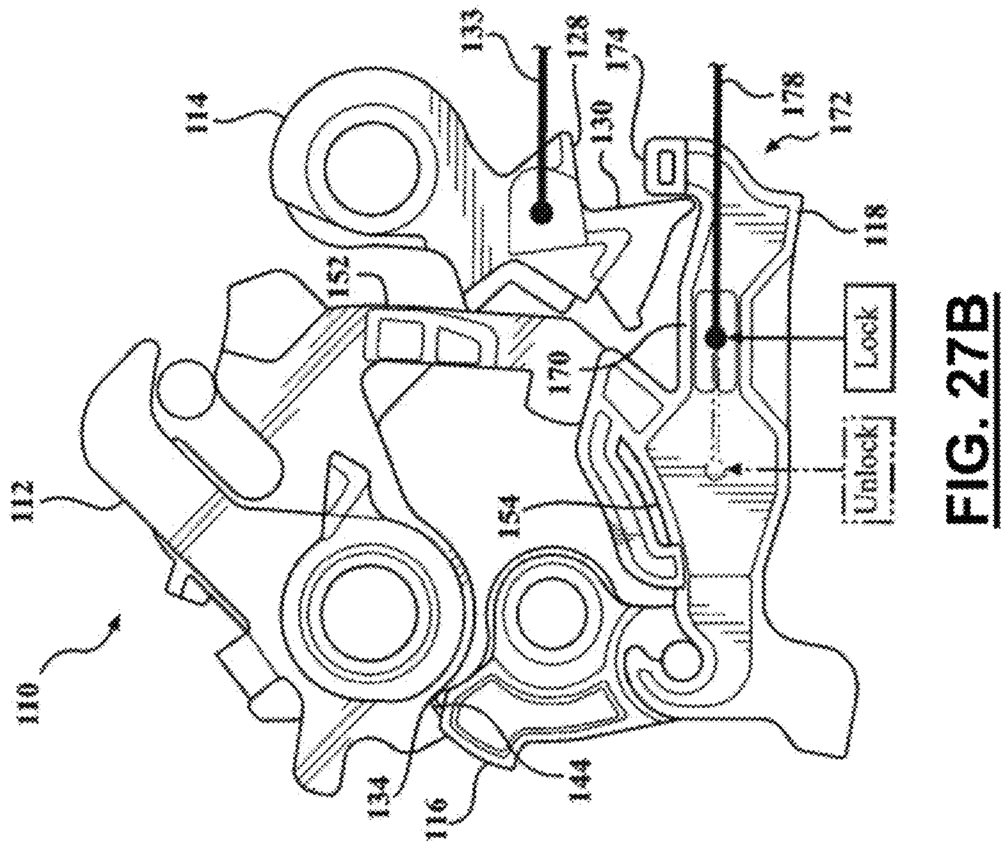
FIGS. 27A and 27B are views similar to FIGS. 26A and 26B with the double pull latch assembly shown after completion of the first actuation of the primary pawl and with a ratchet in the second closed position.
Figure 27A:
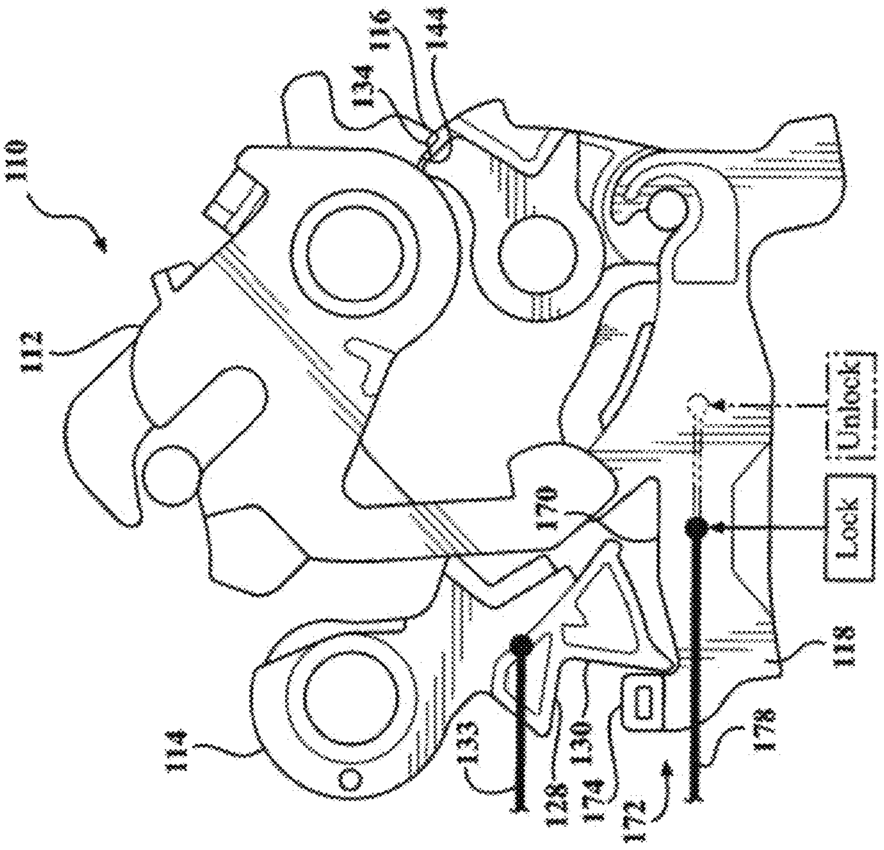
Figure 28B:
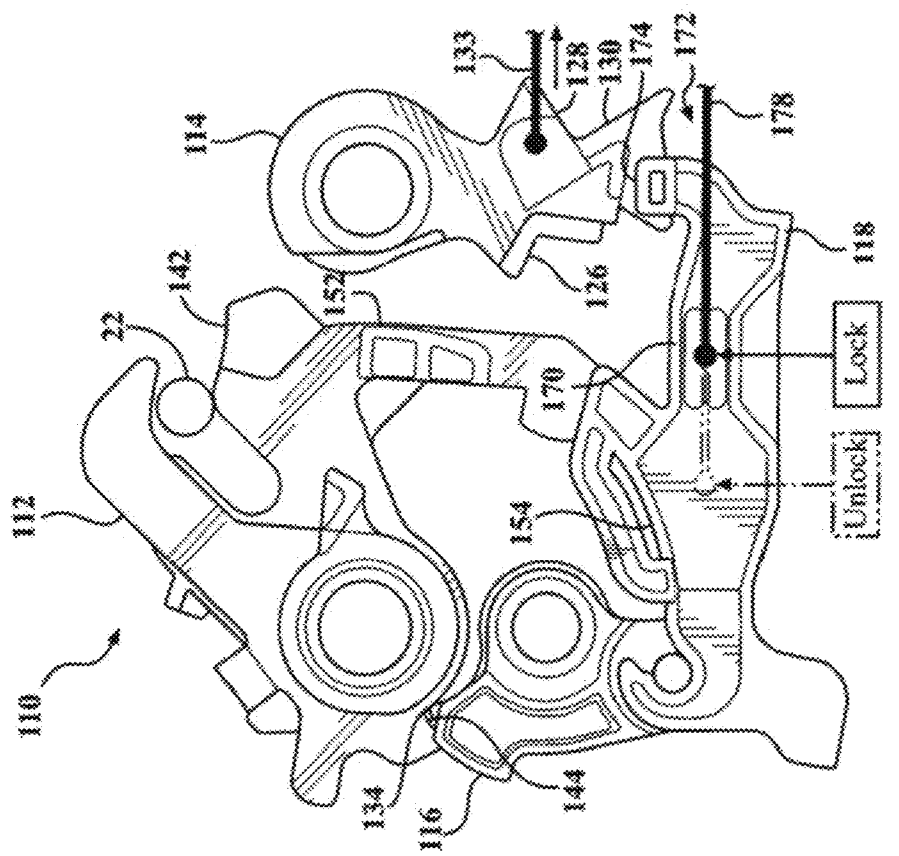
FIGS. 28A and 28B are views similar to FIGS. 27A and 27B illustrating how a second actuation of the primary pawl does not cause the release of a secondary pawl due to the coupling lever being moved to the disengaged position.
Figure 28A:
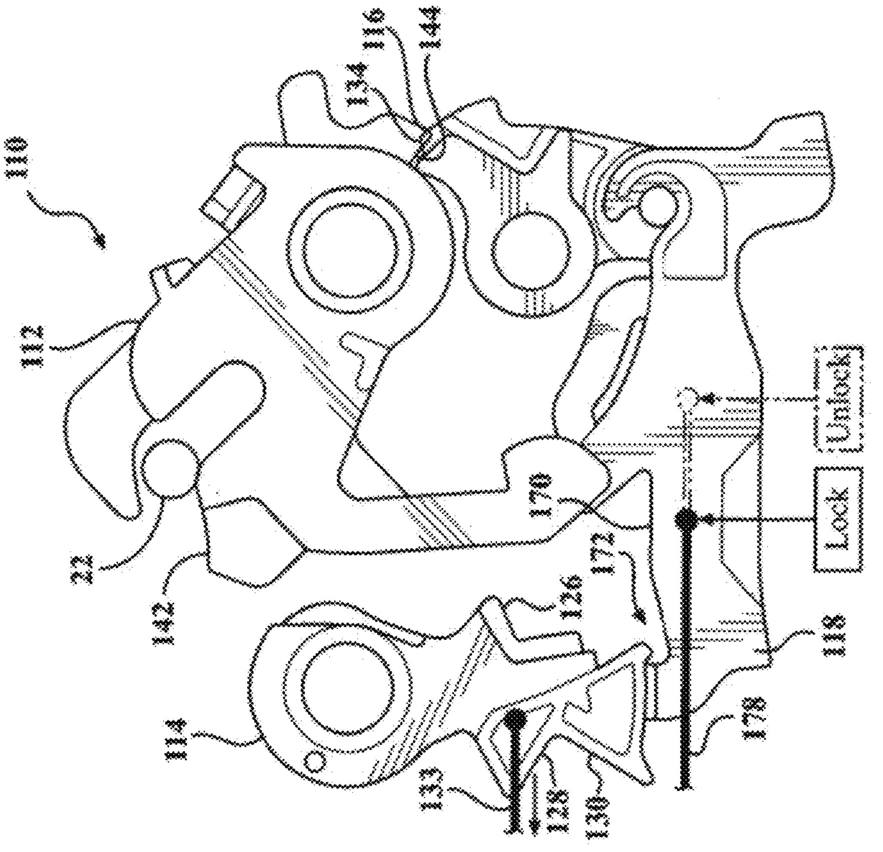

As shown schematically in FIG. 25A, an actuator 176 is operably coupled to the coupling lever 118, such as via a rod or cable 178, by way of example and without limitation. The actuator 176 is configured for communication with a sensor 180 to selectively maintain the coupling lever 118 in the home position, regardless of the position of the ratchet 112, in response to a predetermined state of the vehicle 11. It is to be recognized that the sensor 180 is configured to detect the desired predetermined state of the vehicle 11 whereupon movement of the coupling lever 118 from the engaged position to the disengaged position is desired, and vice versa. The sensor 180 may be in operable communication with the vehicle control/computer system indicating the state of various vehicle operating parameters, such as throttle position, brake pedal position, key inserted, or key/on off positions, speed, engine operation, parking brake engaged, and the like, by way of example and without limitation. As another example, the sensor 180 may be in operable communication with multiple vehicle systems and capable of making a determination as to the motive operation of the motor vehicle 11. Accordingly, the sensor 180 can signal the actuator 176 to move the coupling lever 118 to the disengaged position upon recognition of the predetermined state of the vehicle. In one example, a predetermined state may be associated with the speed of the vehicle, such that upon the motor vehicle 11 reaching or exceeding the predetermined speed, the sensor 180 signals the actuator 176 to move the coupling lever 118 to the disengaged position, thereby prevent the latch 110 from being fully unlatched. In another example, a predetermined state may be associated with the state of an engine of the vehicle, such that if the engine is on, the sensor 180 signals the actuator 176 to move the coupling lever 118 to the disengaged position. It is to be recognized that the actuator 176 will return the coupling lever 118 to the engaged position upon the sensor 180 detecting the predetermined state no longer exists, such as the vehicle 11 slowing below a predetermined speed or the engine being turned off, by way of example and without limitation.

Figure 24B:
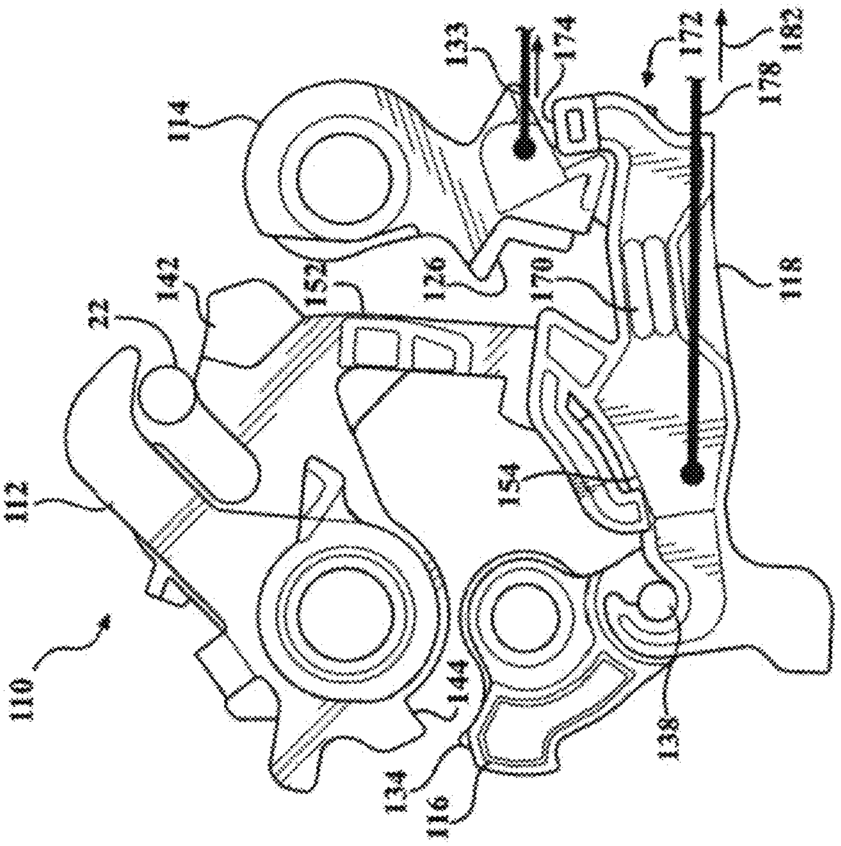
FIGS. 24A and 24B are views similar to FIGS. 22A and 22B with the double pull latch assembly shown after a second actuation of a primary pawl with the double pull latch assembly shown in a fully open position.
Figure 24A:
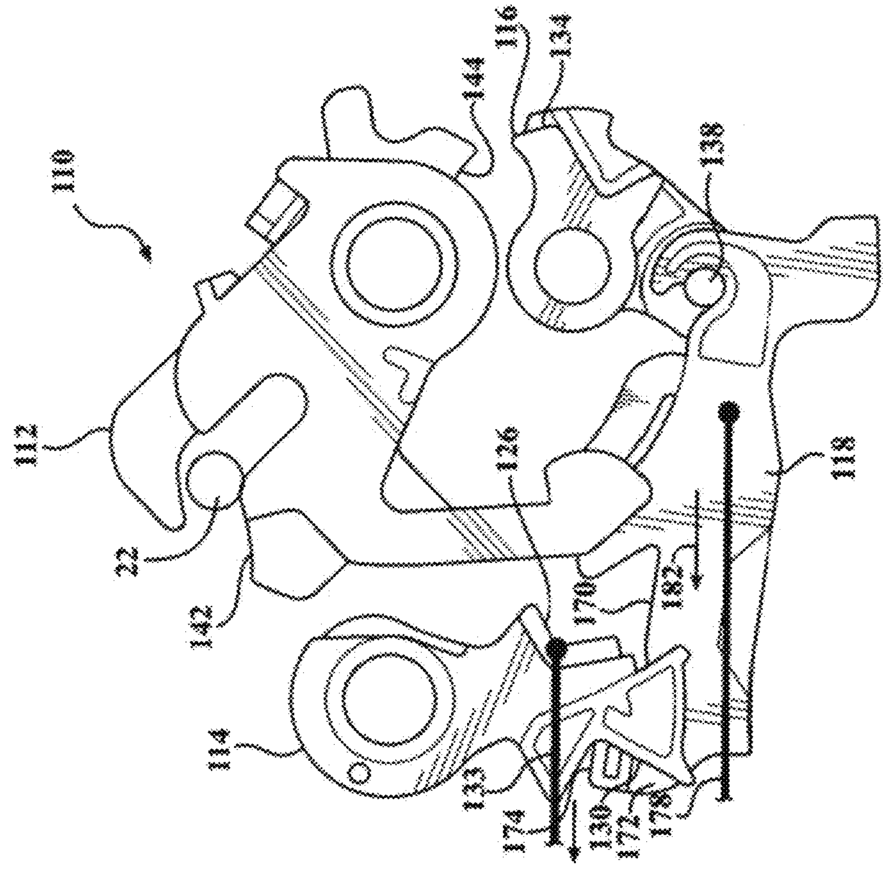

In use, in a normal release condition, with the coupling lever 118 in the disengaged position and the ratchet 112 in the primary closed position (FIGS. 21A, 21B), movement of the primary pawl 114 from the primary locking position or state to the primary unlocking position or state (FIGS. 22A-22B) in response to a first actuation of at least one, and shown as a pair of connection members, also referred to as release members, referred to as first release member 133' and second release member 133 via a first actuation of a powered actuator, such as an electric motor 338 via an electronic actuation member, such as a button B from inside the vehicle interior cabin, also referred to as passenger compartment 37, or a key fob KF, by way of example and without limitation, causes the ratchet 112 to move from the primary closed position to the secondary closed position. During movement of the ratchet 112 to the secondary closed position or state, a holding surface 152 of ratchet 112 slides along shoulder 154 of coupling lever 118 and ultimately moves out of contact with shoulder 154, whereupon the coupling lever 118 is automatically biased by biasing member 136' to move from the disengaged position to the engaged position. Upon the primary locking surface 126 of primary pawl 114 moving out from engagement from primary locking surface 142 of ratchet 112, a biasing member 140 (FIG. 23A) biases ratchet 112 to the secondary closed position, whereat secondary locking surface 134 of secondary pawl 116 engages secondary locking surface 144 of ratchet 112 to releasably maintain the ratchet 112 in the secondary closed position, with secondary pawl 116 being in a secondary locking position. Upon performing the first actuation of electric motor 338, electric motor 338 normally allows primary pawl 114 to be biased by biasing member 132 (FIGS. 21A, 23A) to return to its home, primary locking position whereupon a second stop surface 128 of primary pawl 114 confronts and abuts free end 174 of coupling lever 118, thereby holding the coupling lever 118 in the engaged position (FIGS. 23A, 23B). Then, when desired to fully release latch 110, a repeated, second actuation of the electric motor 338 and primary pawl 114 is performed via the electronic actuation member B, KF causing movement of the primary pawl 114 to the primary unlocking position in response to a second actuation of the release member, whereupon a drive surface 130 of primary pawl 114 engages the hook-shaped portion 172 of the coupling lever 118 immediately adjacent free end 174 and moves the coupling lever 118 in translation generally along a direction indicated by arrow 182 (FIGS. 24A, 24B). With coupling lever 118 moved in the direction of arrow 182, the secondary pawl 116 is caused to pivot out from the secondary locking position to the secondary unlocking position, whereupon secondary locking surfaces 134, 144 move out of engagement from one another, whereupon ratchet 112 is caused to move under the bias of biasing member 140 from the secondary closed position to the open position. At this time, hood 13 may be moved to a fully open position. Thus, it is to be recognized that absent primary pawl 114 being able to return to its to its home primary locking position after the first actuation of electric motor 338, a second actuation causing secondary pawl 116 to pivot out from the secondary locking position to the secondary unlocking position is not possible, and thus, ratchet 112 would be unable to be moved to its open position. The above release of latch 110 is performed in normal course of use, and in a normal mode of operation of the latch 110 without a predetermined condition having been met, and with electric motor 338 operating under power and without interruption of power.

Figure 29:
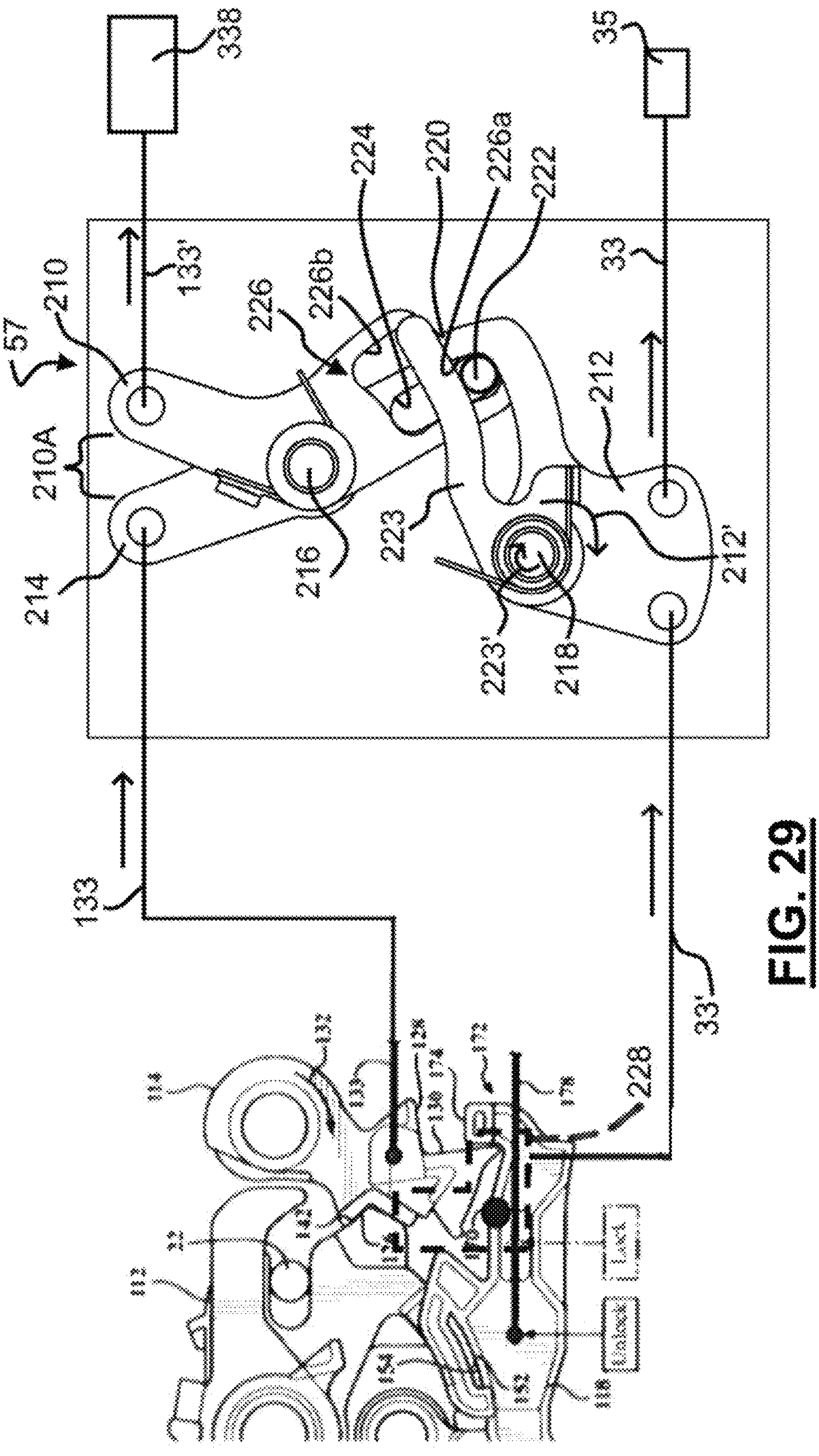
FIG. 29 is a schematic plan view of a disengagement mechanism of the double pull latch system in accordance with one aspect of the disclosure shown in a rest position and in operable communication with a latch assembly.

In FIG. 29, a schematic plan view of a latch release system 210' is shown, wherein latch release system 210' includes latch assembly 110 and a latch actuation mechanism, also referred to as disengagement mechanism 57 of the double pull latch system in accordance with one aspect of the disclosure shown in a rest position. Disengagement mechanism 57 includes a primary release lever 210 coupled to electric motor 338 via first release member 133'. Primary release lever 210 is moveable from a rest, also referred to as home position (FIG. 29), to an actuated position (FIGS. 30-35) via selective actuation of power actuator 338 that is normally energizable to move the primary pawl 114 and secondary pawl 116 between the locking positions, including respective primary and secondary locking positions, and a released position, also referred to as rest or unlocking position, to allow ratchet 112 to move to its open position. Disengagement mechanism 57 also includes a secondary release lever 212 configured to selectively override the primary release lever 210 if for any reason the primary release lever 210 remains captive in its actuated position, such as while the primary release lever 210 is stuck due to excessive friction and/or while power actuator 338 is without power and unable to facilitate return of the primary release lever 210 to its rest position, by way of example and without limitation, to allow the primary pawl 114 to return to its home position so that latch 110 retains its ability to be actuated in its double pull capacity, when desired.

Figure 30:
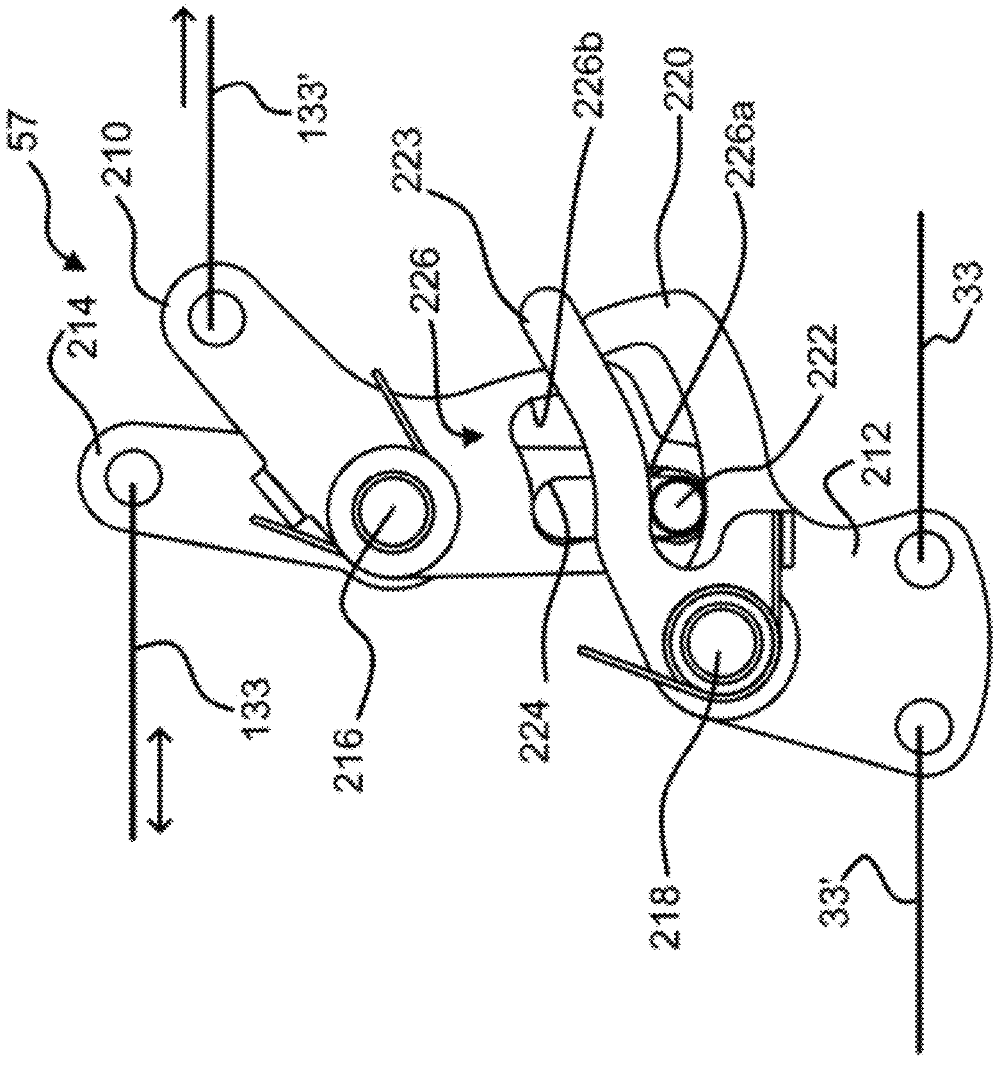
FIG. 30 is a view similar to FIG. 29 showing a primary release lever of the disengagement mechanism moved to an actuated position.

FIG. 30 shows primary release lever 210 of the disengagement mechanism 57 moved in a first pull actuation to an actuated position via selective powered actuation of power actuator 338. As primary release lever 210 is pulled via release member 133' first from its home, rest position to the actuated position, a pawl release lever 214 of the disengagement mechanism 57 is moved from a home, also referred to as rest position (FIG. 29), to an actuated position (FIG. 30) via being coupled to primary release lever 210 and driven thereby, shown as being coupled for conjoint movement with primary release lever at pin 216. Together, the primary release lever 210 and the pawl release lever 214 form a primary release lever assembly 210A. During clockwise pivotal movement of primary release lever 210 about pin 216 to the actuated position, due to the nature of the connection between primary release lever 210 and pawl release lever 214, no relative movement occurs between primary release lever 210 and pawl release lever 214, but rather, they move in fixed relation with one another about pin 216. Accordingly, pawl release lever 214 pivots clockwise about pin 216 with primary release lever 210 to the actuated position during the first actuation. Pawl release lever 214 is coupled to primary pawl 114 via second release member 133, and thus, pivotal movement of pawl release lever 214 to the actuated position causes primary pawl 114 to be moved to its primary unlocking position, thereby causing ratchet 112 to move to its secondary closed position.

Figure 31:
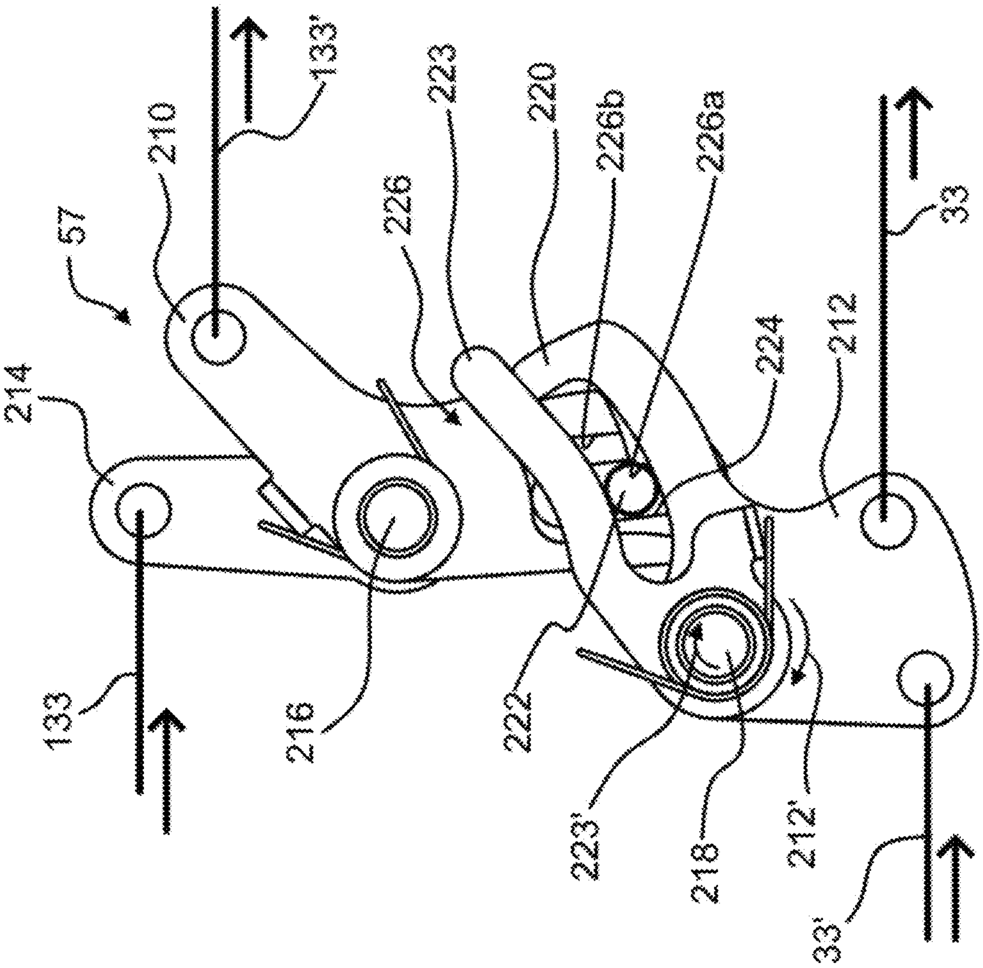
FIG. 31 is a view similar to FIG. 30 showing a secondary release lever of the disengagement mechanism moved toward an actuated position while the primary release lever remains in its actuated position.
Figure 32:
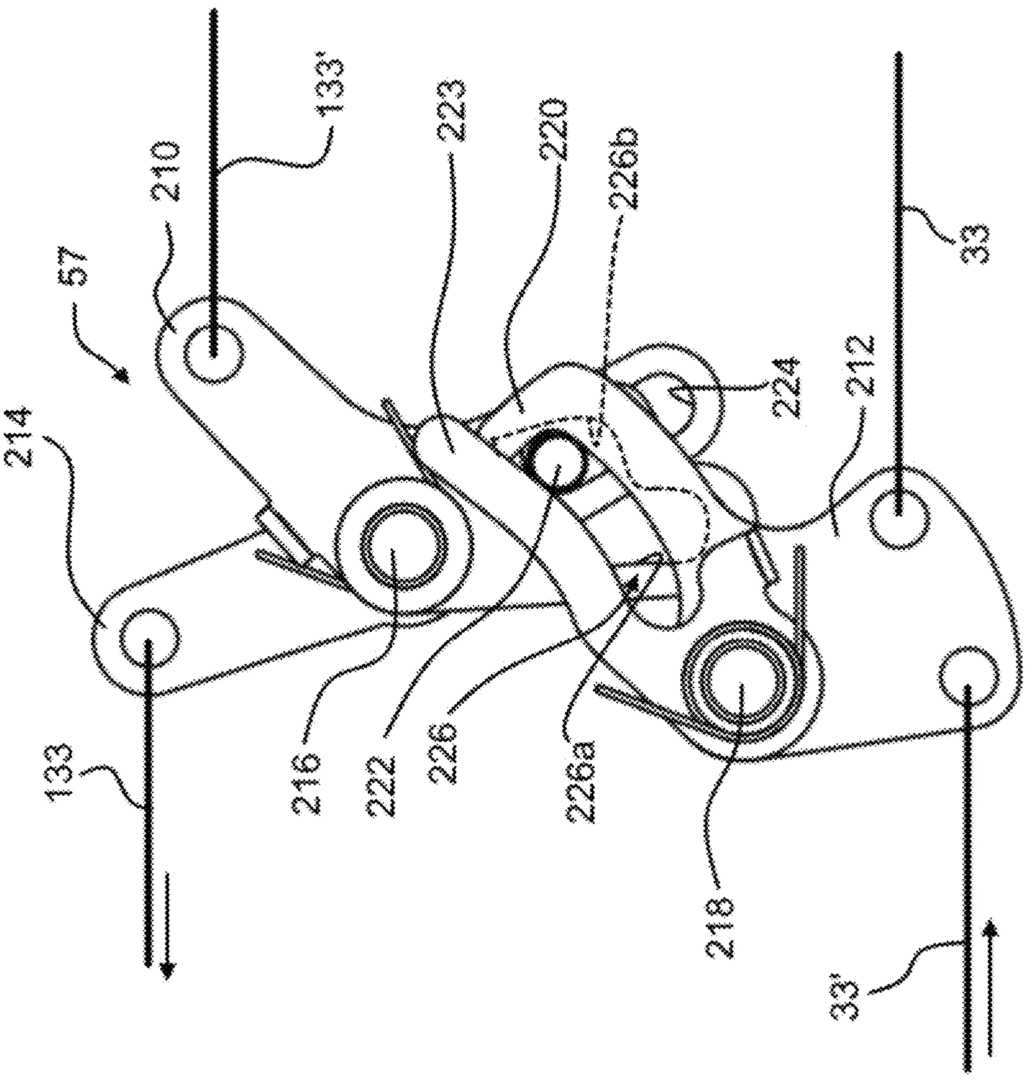
FIG. 32 is a view similar to FIG. 31 with the secondary release lever moved fully to the actuated position and showing a pawl release lever returned to a disengaged position.

FIG. 31 shows primary release lever 210 moved to and stuck in its actuated position, such as due to loss of power to actuator 338, thereby resulting in primary release lever 210 being held in its actuated position by actuator 338. As such, with primary release lever 210 unable to return to its home position, primary pawl 114 is prevented from returning to its primary unlocking position, thus, preventing further actuation of latch 110 to move ratchet 112 to its open position. Accordingly, ratchet 112 remains in its secondary closed position, and hood 13 is unable to be opened. In accordance with an aspect of the disclosure, in order to overcome the inability to move ratchet 112 to its open position and open hood 13, further shown is secondary release lever 212 moved from a home position toward an actuated position against a bias imparted by a spring member indicated by arrow 212', such as via manual actuation of a mechanical release mechanism 35 located within the passenger compartment 37, by way of example and without limitation. Mechanical release mechanism 35 is shown in FIG. 20 as a handle 35 connected to secondary release lever 212 by a rod or cable 33, by way of example and without limitation. It is to be recognized that mechanical release mechanism 35 could be located anywhere in the vehicle, inside or outside, as desired. The mechanical release mechanism 35 is intended for use only when primary release lever 210 and pawl release lever 214 malfunction or otherwise are unable to be located in their home positions when intended. It is further contemplated that mechanical release mechanism 35 be covered or otherwise shield against use, until truly desired to be accessed, thereby requiring a cover or shield to first be opened to provide access to the mechanical release mechanism 35. Accordingly, accidental actuation of mechanical release mechanism 35 can be avoided.

Figure 33:
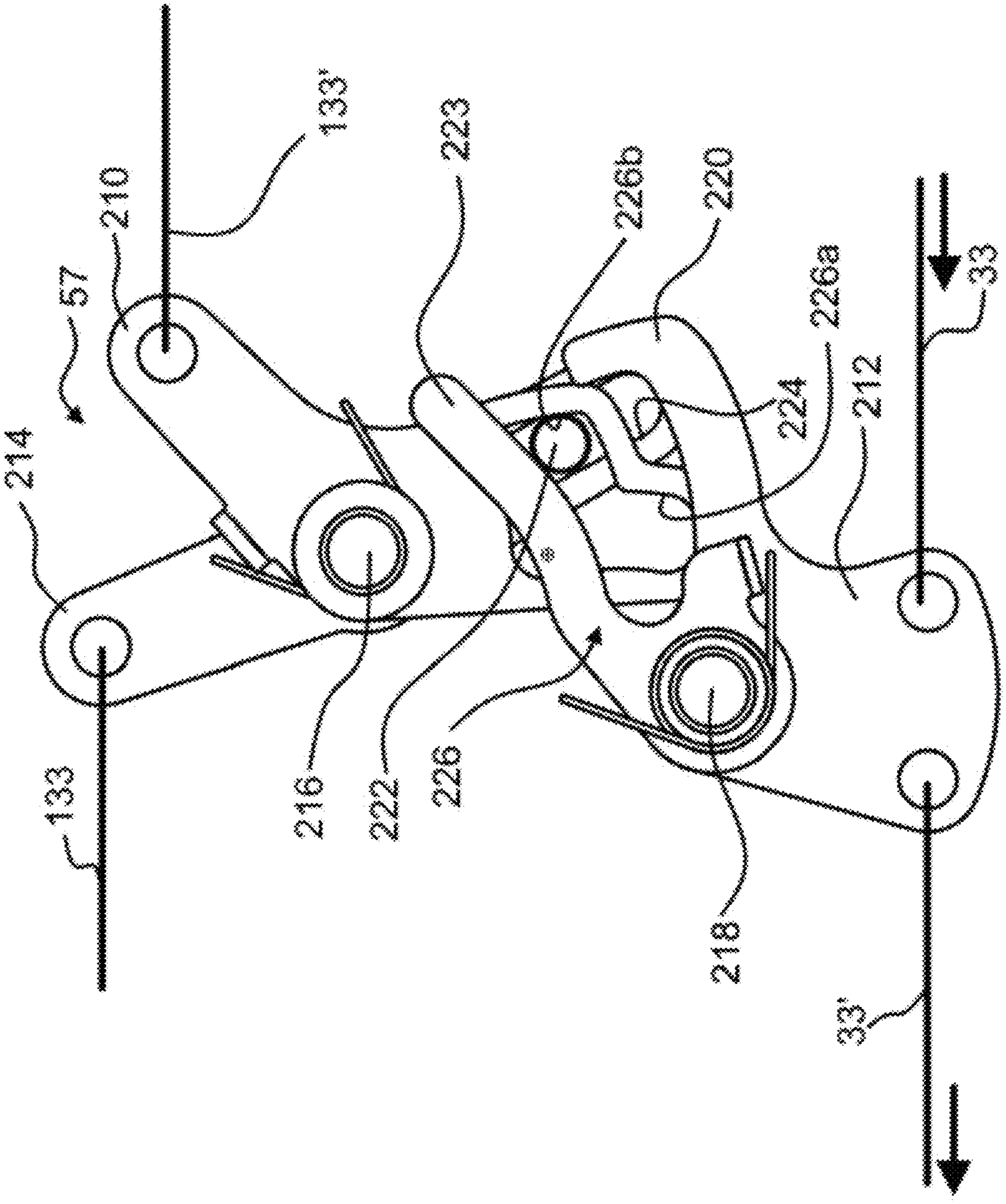
FIG. 33 is a view similar to FIG. 32 showing the secondary release lever returned to a rest position after a first pull.

During selective and intended actuation of mechanical release lever 35, secondary release lever 212 is caused to pivot under the pulling force of cable 33 counterclockwise about a pin 218 against the bias of spring member 212'. An arm 220 of secondary lever 212, extending radially outwardly from pin 218, moves a floating pin 222 against a bias imparted by a preload lever 223 (biased on preload lever 223 is in a clockwise direction to maintain preload lever 223 in constant engagement with floating pin 222, wherein bias can be imparted via a spring member indicated by arrow 223') through an elongate slot 224 of pawl release lever 214 and through a slot 226 of primary release lever 210. During movement of floating pin 222 through slots 224, 226, floating pin 222 initiates upward movement (as viewed in FIG. 31) from a lowermost region of slot 224 toward an uppermost region of slot 224, toward pin 216, and through a fixed connection portion **226*a* of slot 226 against the bias imparted by preload lever 223, thereby causing preload lever 223 to pivot counterclockwise against the bias of spring member 223'. As pin 222 continues to move upward through slot 224 and through the fixed connection portion 226*a*, pin 222 enters into a lost motion portion 226*b* of slot 226, wherein lost motion portion 226*b* extends in oblique or transverse relation to slot 224 and to fixed connection portion 226*a* of slot 226. In the illustrative embodiment, slot 226 of primary release lever 210 is shown as being a generally L-shaped, with fixed connection portion 226*a* extending radially from pin 216 and lost motion portion 226*b* extending generally transversely to fixed connection portion 226*a*. In contrast, elongate slot 224 is shown as being straight and generally uniform in width, extending from the uppermost region proximate pin 216 radially outwardly from pin 216 to the lowermost region. As floating pin 222 traverses elongate slot 224 and fixed connection portion 226*a* of slot 226, the elongate slot 224 and fixed connection portion 226*a* of slot 226 remain aligned with one another in mirrored relation, with elongate slot 224 and fixed connection portion 226*a* having the same shape and dimensional width W (FIG. 29), with the width W being generally the same as a diameter of floating pin 222 to provide the fixed connection between primary release lever 210 and pawl release lever 214 in normal powered use (it is to be understood that a slightly loose fit exists between floating pin 222 and slots 224, 226, thereby allowing floating pin 222 to traverse therethrough with minimal friction, though the fit between floating pin 222 and elongate slot 224 and fixed connection portion 226*a* minimizes the amount of play between primary release lever 210 and pawl release lever 214 during normal powered use). Then, as secondary release lever 212 continues to rotate counterclockwise, floating pin 222 moves outwardly from fixed connection portion 226*a* (one leg of L-shaped slot 226) into lost motion portion 226*b* (another leg of L-shaped slot 226) (FIG. 32), thereby resulting in the lost motion connection between pawl release lever 214 and primary release lever 210. At this moment, with floating pin 222 being free to move relative to primary release lever 210, pawl release lever 214 is permitted to pivot about pin 216 to return to its home position, whereat pawl release lever 214 is now in a disengaged position and relation relative to primary release lever 210, which remains stuck in its actuated position. Accordingly, pawl release lever 214 is able to pivot about pin 216 relative to primary release lever 210, with primary release lever 210 remaining stationary, thereby allowing primary pawl 114 to return to the primary unlocking position for optional second pull actuation, if and when desired. As shown in FIG. 33, upon the pawl release lever 214 pivoting to the disengaged position, fixed connection portion 226*a* of slot 226 and slot 224 of pawl release lever 214 are no longer aligned with one another, but rather, are staggered in offset, misaligned relation from one another. In FIG. 33, the secondary release lever 212 is shown returned to the rest position under the bias of spring member 212' after the first pull of secondary release lever 212 via mechanical actuator, referred to above as mechanical release lever 35. At this time, primary release lever assembly 210A is bypassed by secondary release lever 212, and power release actuator 338 is effectively decoupled from pawl assembly 214, 216**.

Figure 34:
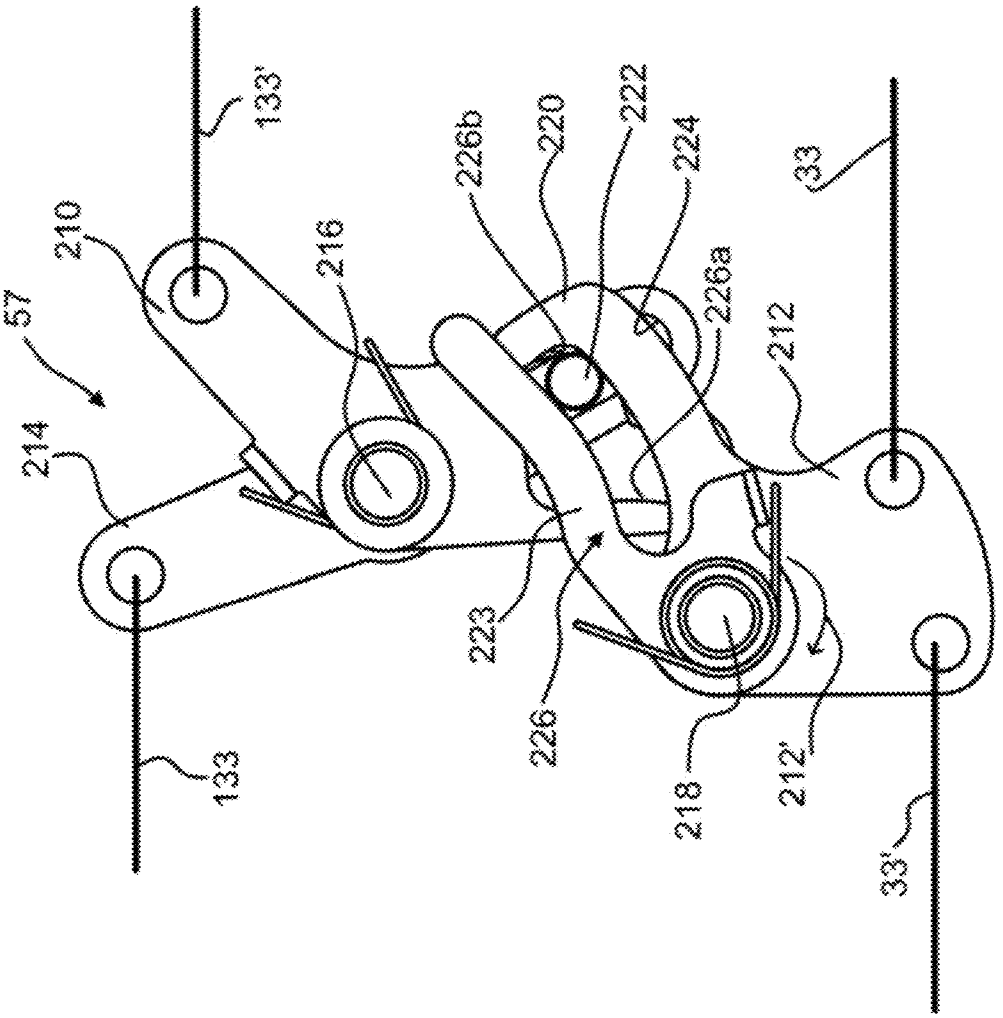
FIG. 34 is a view similar to FIG. 31 showing the secondary release lever moved to an actuated position in a second pull while the primary release lever remains in its actuated position.

FIG. 34 shows the secondary release lever 212 moved to its actuated position in a second action, also referred to as second pull. During the second pull, as shown in comparing FIG. 33 with FIG. 34, the primary release lever 210 remains stuck in its actuated position and the pawl release lever 214 remains in its home position, which is permitted by the lost motion established by floating pin 222 remaining in lost motion portion **226*b* of slot 226, and secondary pawl 216 is moved from its secondary locking position to its secondary unlocking position, thereby allowing ratchet 112 to be moved to its open position, also referred to as striker release position, and thus, hood 13 can be opened. In more detail, secondary release lever 212 is operably connected to at least one of primary pawl 114 and secondary pawl 116 via a connection member, thus providing the desired movement of secondary pawl 216 to its secondary unlocking position upon performing the second pull of secondary release lever 212. The operable connection can be establish as desired, with one aspect illustrated showing a second connection member, such as a rod or cable 33', connecting secondary release lever 212 to a latch service lever 228 (FIG. 29), which is operable to cause movement of secondary pawl 216 to its secondary unlocking position upon performing the second pull of secondary release lever 212. Accordingly, the connection member 133 connecting the pawl release lever 214 to the pawl 114 is separate from the connection member 33' connecting the secondary release lever 212 operably to the pawl 114. In one embodiment, latch service lever 228 is operable to pivot primary pawl 114 to its primary unlocking position, which in turn causes secondary pawl 116 to move to its secondary unlocking position, such as shown in FIGS. 24A and 24B. Accordingly, at this time, latch 110 is in its fully released position, thus allowing hood 13** to be opened.

Figure 35:
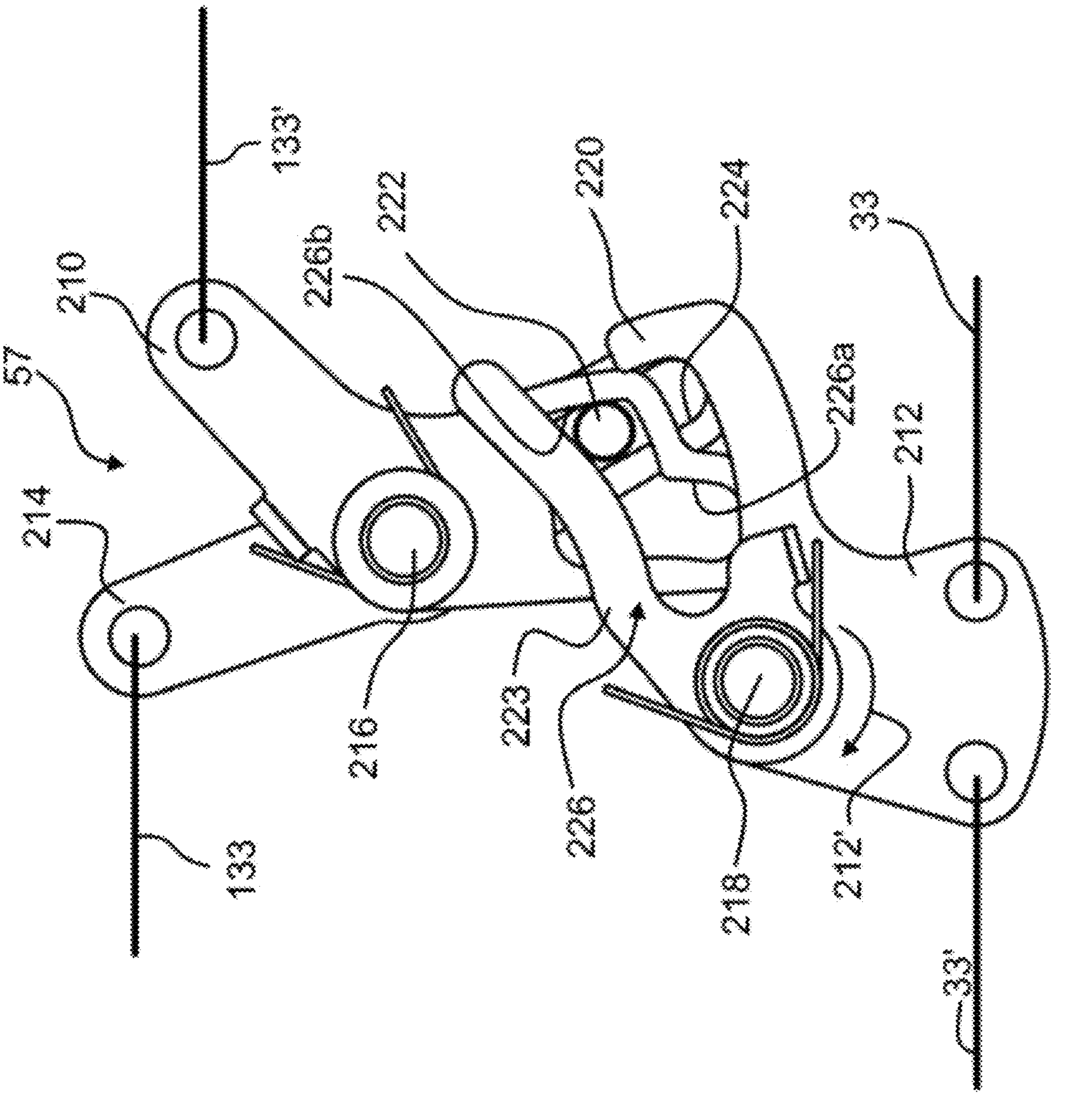
FIG. 35 is a view similar to FIG. 33 showing the second release lever returned to a rest position after the second pull.

In FIG. 35, a view similar to FIG. 33 is shown, illustrating the second release lever 214 returned to its home position under the bias of spring member 212' after performing the second pull of secondary release lever 212 via handle 35.

Figure 36:
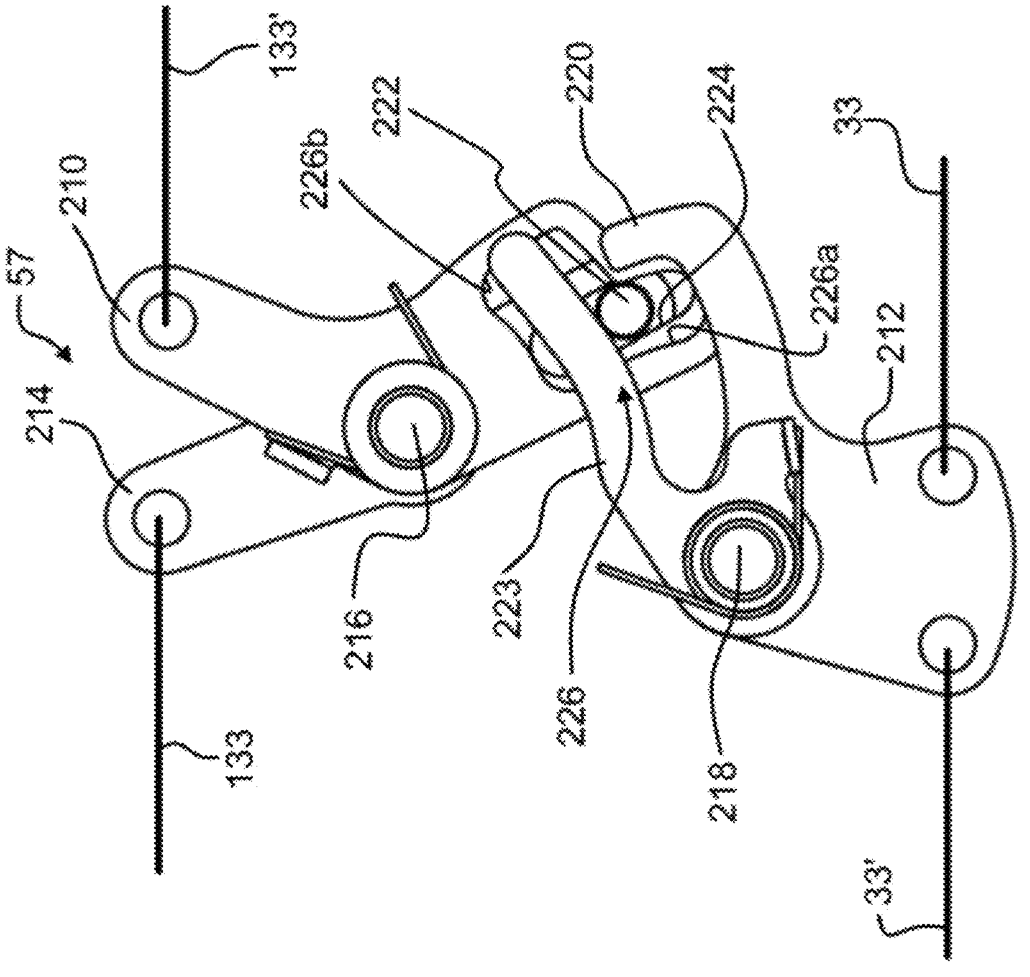
FIG. 36 is a view similar to FIG. 35 with power restored to an actuator to return the primary release lever to its home position.

In FIG. 36, a view similar to FIG. 35 is shown, illustrating an initial return of primary release lever 210 toward its home position under a bias of a spring member, illustrated by arrow 210', upon power being restored to the actuator 338. Accordingly, latch 110 is automatically returned to its normal power operating state, with all internal components of latch 110 being returned to their respective normal operating positions upon restoration of power to actuator 338.

Figure 37:
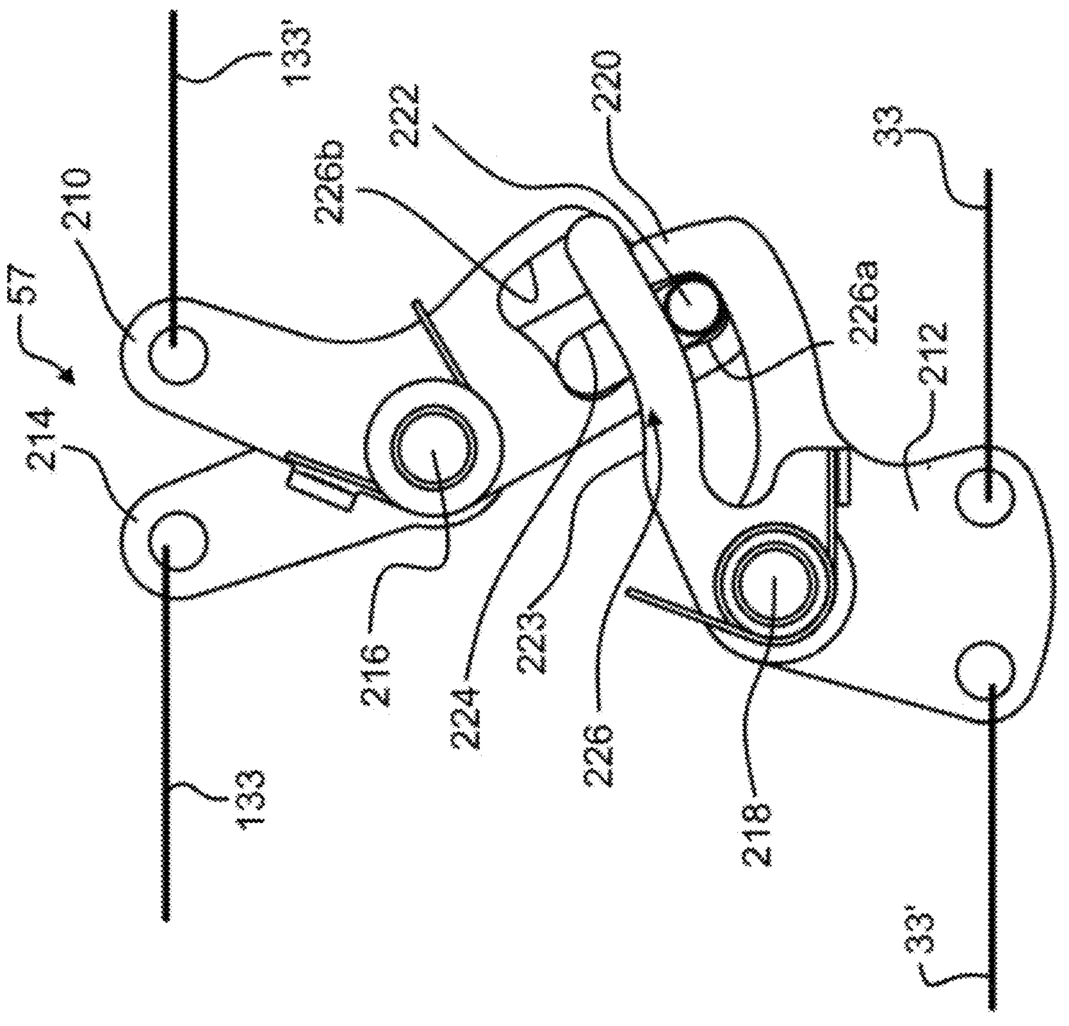
FIG. 37 is a view showing the disengagement mechanism returned to its rest position.

In FIG. 37, primary release lever 210 is shown returned to its home position under the bias of a spring member and floating pin is shown returned to a lowermost region of elongate slot 224 and in fixed connection portion 226*a* of slot 226, thereby bringing primary release lever 210 and pawl release lever 214 into releasably fixed relation with one another for continued use under normal power actuation via actuator 338.

Figure 38:
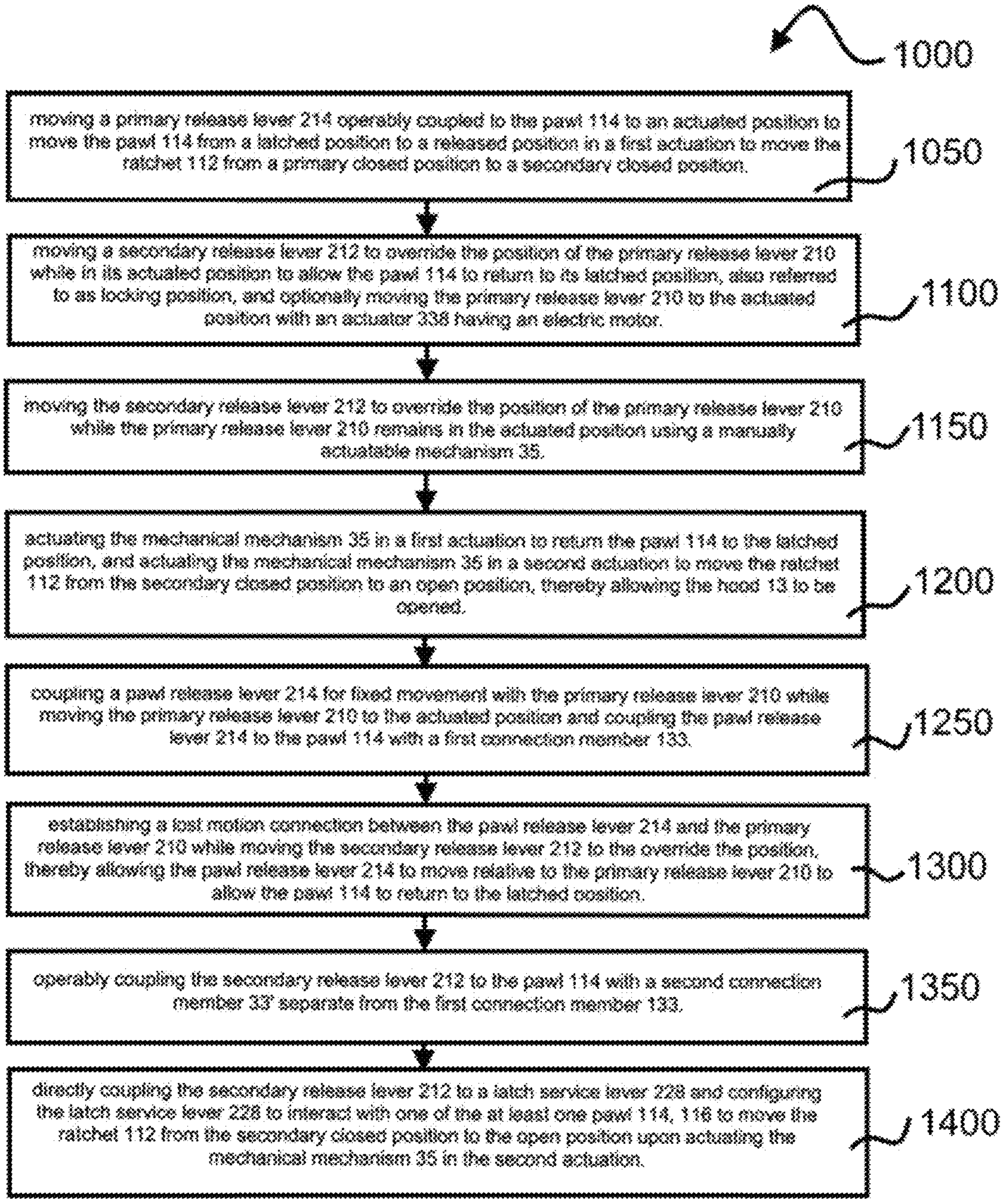
FIG. 38 is a flow diagram illustrating a method of actuation of a power operated double pull latch assembly in the event of power interruption to an actuator of the power operated double pull latch assembly in accordance with another aspect of the disclosure.

In FIG. 38, a method 1000 of actuating a double pull latch 110 having a ratchet 112 and at least one pawl 114, 116 in accordance with another aspect of the disclosure is illustrated. The method includes: a step 1050 of moving a primary release lever 214 operably coupled to the pawl 114 to an actuated position to move the pawl 114 from a latched position to a released position in a first actuation to move the ratchet 112 from a primary closed position to a secondary closed position. Then, a step 1100 of moving a secondary release lever 212 to override the position of the primary release lever 210 while in its actuated position to allow the pawl 114 to return to its latched position, also referred to as locking position.

The method 1000 can further include moving the primary release lever 210 to the actuated position with an actuator 338 having an electric motor.

The method 1000 further includes a step 1150 of moving the secondary release lever 212 to override the position of the primary release lever 210 while the primary release lever 210 remains in the actuated position using a manually actuatable mechanism 35.

The method 1000 further includes a step 1200 of actuating the mechanical mechanism 35 in a first actuation to return the pawl 114 to the latched position, and actuating the mechanical mechanism 35 in a second actuation to move the ratchet 112 from the secondary closed position to an open position, thereby allowing the hood 13 to be opened.

The method 1000 can further include a step 1250 of coupling a pawl release lever 214 for fixed movement with the primary release lever 210 while moving the primary release lever 210 to the actuated position and coupling the pawl release lever 214 to the pawl 114 with a first connection member 133.

The method 1000 can further include a step 1300 of establishing a lost motion connection between the pawl release lever 214 and the primary release lever 210 while moving the secondary release lever 212 to the override the position, thereby allowing the pawl release lever 214 to move relative to the primary release lever 210 to allow the pawl 114 to return to the latched position.

The method 1000 can further include a step 1350 of operably coupling the secondary release lever 212 to the pawl 114 with a second connection member 33' separate from the first connection member 133.

The method 1000 can further include a step 1400 of directly coupling the secondary release lever 212 to a latch service lever 228 and configuring the latch service lever 228 to interact with one of the at least one pawl 114, 116 to move the ratchet 112 from the secondary closed position to the open position upon actuating the mechanical mechanism 35 in the second actuation.

Figures 39A, 39B, 39C:
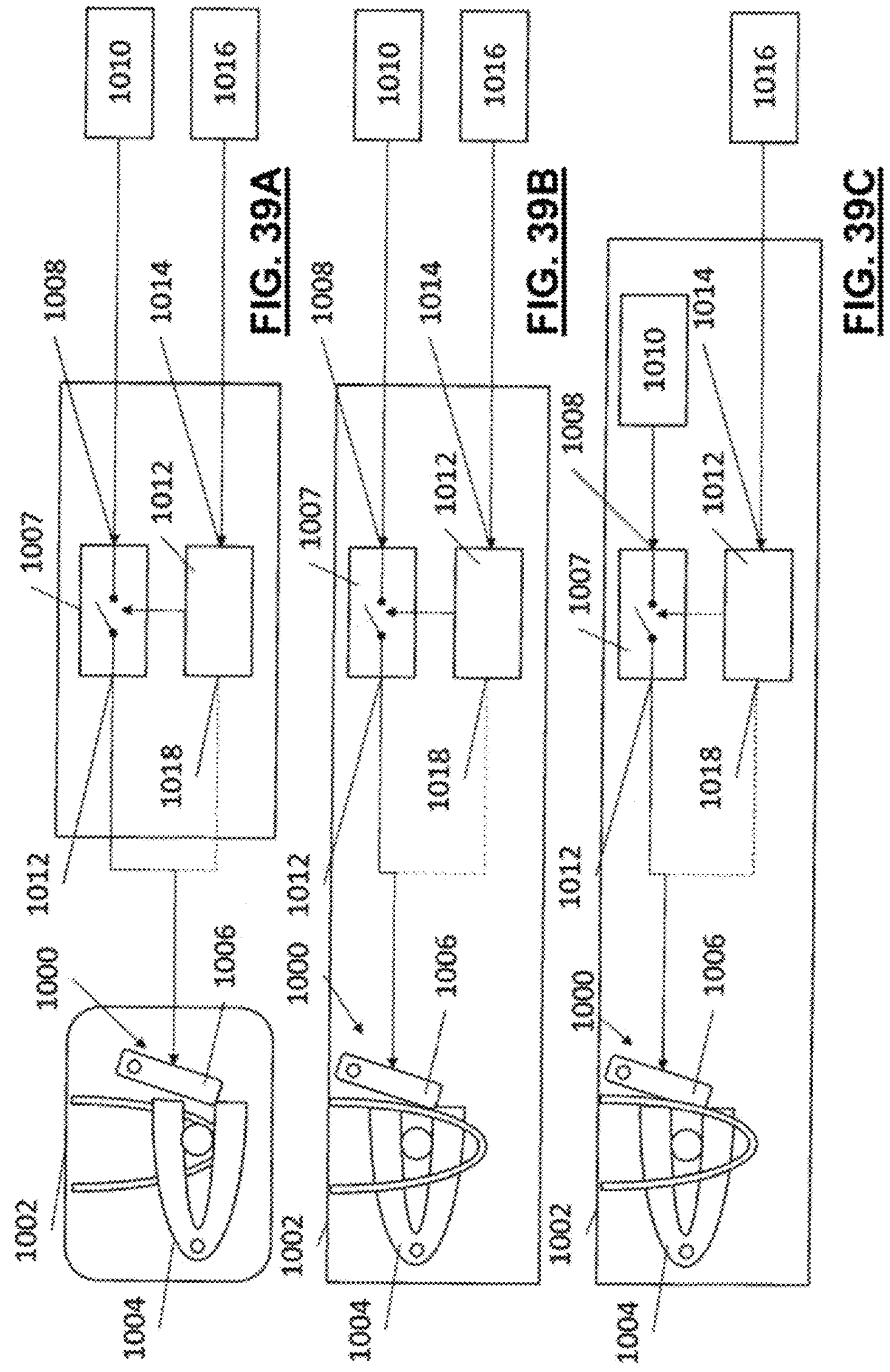
FIGS. 39A to 39C are various system block diagrams illustrating a latch release device coupled to a latch, in accordance with aspects of the disclosure.

Now referring to FIGS. 39A to 39C, there is shown a latch release device 1000 for a latch 1002 having a ratchet 1004 and a pawl 1006. The device 1000 may be provided as a standalone device to the latch 1002, for example as a remote device having its own separate housing and mounting connections to the vehicle. Latch 1002 may be a double pull type latch. In a configuration, the device 1000 be integrated with the latch 1002 (see FIGS. 39B and 39C), or provided as a part of an actuator device. The device 1000 includes a first coupling configuration 1007 having a first input 1008 operably connected to a first actuator 1010 and a first output 1012 operably connected to the pawl 1006, wherein the first coupling configuration 1007 has a coupled state wherein an actuation of the first actuator 1010 is transmitted to the pawl 1006 by the first coupling configuration 1007 and has a decoupled state wherein an actuation of the first actuator 1010 is not transmitted to the pawl 1006 by first coupling configuration 1007. Device 1000 further includes a second coupling configuration 1012 having a second input 1014 operably connected to a second actuator 1016 and a second output 1018 operably connected to the pawl 1006, wherein the second coupling configuration 1012 is configured to transition the first coupling configuration 1007 from the coupled state to the decoupled state in response to an actuation of the second actuator 1016. First coupling configuration 1007 may include a lever assembly, such as described herein above with reference to levers 210 and 214, but other configurations such as a decouplable linkage system may be provided. First actuator 1010 may be a powered motor based actuator as illustratively shown herein above, but may also be in another possible configuration a manually user actuatable mechanism. First output 1012 may be operably connected to the pawl 1006 by a bowden cable, linkage, or metal rod for example. First input 1008 may be operably connected to the first actuator 1010 via a bowden cable, linkage or metal rod. Second coupling configuration 1012 may include a lever assembly, such as described herein above with reference to levers 212, but other configurations such as a cam assembly may be provided. Second input 1014 may be operably connected to a second actuator 1016, such as a manually user actuatable handle assembly, or another powered actuator, via a bowden cable, linage or a rod. Second output 1018 may be operably connected to the pawl 1006 via a bowden cable or metal rod or a linkage. Second output 1018 may in one possible configuration not be provided such that actuation of second actuator 1016 is only for decoupling first actuator 1010 from the pawl 1006. Actuation of second input 1014 may always result in actuation of output 1014, for providing a backup release chain from the second actuator 1016 to the pawl 1006.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch assembly for a hood of a vehicle, comprising:

a housing;

a ratchet mounted in the housing for movement between a striker capture position for retaining a striker fixed to the hood and a ratchet open position for releasing the striker, wherein the ratchet is biased toward the ratchet open position;

a primary pawl configured for operable communication with a release member and being mounted in the housing for movement between a rest position and an actuated position in response to actuation of the release member, the primary pawl being biased toward the rest position;

a safety hook mounted in the housing for movement between a closed position, a secondary striker capture position whereat the striker is releasably prevented from being removed from the latch assembly by the safety hook, a release position in overlying relation with the striker for engagement with the striker while removing the striker from the latch assembly, and a safety hook open position whereat the striker is removed from the latch assembly;

a safety hook pawl mounted in the housing for movement between a home position, a secondary locking position whereat the safety hook is releasably maintained in the secondary striker capture position, a secondary unlocking position whereat the safety hook is in the release position, and a safety hook pawl open position whereat the safety hook pawl releasably maintains the safety hook in the safety hook open position, the safety hook pawl being biased from the safety hook pawl home position toward the secondary locking position by a safety hook pawl biasing member; and a hold-open device having a first projection configured for engagement with the safety hook pawl to releasably hold the safety hook pawl in the secondary unlocking position and having a second projection configured for engagement with the safety hook to facilitate movement of the first projection of the hold-open device out from engagement with the safety hook pawl as the safety hook moves from the released position toward one of the safety hook open position and the closed position, wherein while the ratchet is in the striker capture position, and while performing a first actuation of the release member, the primary pawl moves from the rest position to the actuated position and the ratchet moves from the striker capture position to the ratchet open position, and the safety hook pawl moves from the home position to the secondary locking position to releasably maintain the safety hook in the secondary striker capture position, wherein while the safety hook is in the secondary striker capture position, and while performing a second actuation of the release member, the primary pawl moves from the rest position to the actuated position and causes the safety hook pawl to move against a bias of the safety hook pawl biasing member to the secondary unlocking position.

2. The latch assembly of claim 1, further including a coupling lever having a leg arranged in abutment with the ratchet while the ratchet is in its striker capture position whereat the ratchet holds the coupling lever against a rotational bias.

3. The latch assembly of claim 2, wherein the coupling lever has a lug arranged in abutment with the safety hook pawl while the safety hook pawl is in the secondary locking position, whereat the primary pawl is arranged in abutment with the coupling lever.

4. The latch assembly of claim 3, wherein while performing the second actuation of the release member, the primary pawl imparts a bias on the coupling lever to move the safety hook pawl to the secondary unlocking position.

5. The latch assembly of claim 4, wherein upon performing the second actuation of the release member, the first projection of the hold-open device engages a first leg of the safety hook pawl to hold the safety hook pawl in the secondary unlocking position.

6. The latch assembly of claim 5, wherein while the safety hook is in the release position, and while removing the striker from the latch assembly, the striker engages a first hook of the safety hook and moves the safety hook, whereupon a safety hook first projection of the safety hook imparts a bias on the second projection of the hold-open device, thereby causing the first projection of the hold-open device to move out of engagement from the first leg of the safety hook pawl to allow the safety hook pawl to move to its safety hook pawl open position and the safety hook to move to its safety hook open position, whereat a second leg of the safety hook pawl engages the safety hook first projection.

7. The latch assembly of claim 6, wherein the safety hook has a safety hook second projection that imparts a bias on the second leg of the safety hook pawl while engaging a second hook of the safety hook with the striker upon returning the striker into the latch assembly.

8. The latch assembly of claim 3, wherein the ratchet engages the coupling lever to move the lug of the coupling lever into engagement with a tab of the safety hook pawl and move the safety hook pawl to its home position.

9. A latch assembly, comprising:

a ratchet assembly having a primary striker capture position for retaining a striker in a fully closed state, a secondary striker capture position for retaining the striker in a partially closed state, a release position for releasing the striker, and an open position upon removing the striker from the ratchet assembly;

a pawl assembly for movement between a latched position whereat the pawl assembly releasably locks the ratchet assembly in the primary striker capture position and the secondary striker capture position and an unlatched position whereat the pawl assembly releases the ratchet assembly for movement toward the release position;

a hold-open device for preventing the pawl assembly from moving from the unlatched position back to latched position while the ratchet assembly is in the release position;

a primary ratchet for retaining the striker in the fully closed state and a secondary ratchet for retaining the striker in the partially closed state;

a primary pawl configured to releasably lock the primary ratchet in the primary striker capture position and a secondary pawl configured to releasably lock the secondary ratchet in the secondary striker capture position; and wherein the hold-open device is configured for locking engagement with the secondary pawl while the secondary ratchet is in the release position to prevent the secondary pawl from moving from the unlatched position to latched position.

10. The latch assembly of claim 9, wherein the hold-open device is configured to move out from locking engagement with the secondary pawl via engagement with the secondary ratchet upon moving the secondary ratchet toward either of the primary striker capture position and the open position.

11. A method of operating a double pull latch assembly, comprising:

actuating a pawl assembly in a first actuation to move from a latched position to an unlatched position to release a ratchet assembly from a primary striker capture position, whereat a striker is in a fully closed state, to a secondary striker capture position, whereat the striker is in a partially closed stated, and returning the pawl assembly to the latched position;

actuating the pawl assembly in a second actuation to move from the latched position to the unlatched position to release the ratchet assembly from the secondary striker capture position to a striker release position;

engaging a hold-open device to prevent the pawl assembly from moving from the unlatched position back to the latched position while the ratchet assembly is in the striker release position;

providing the ratchet assembly including a primary ratchet for retaining the striker in the fully closed state and a secondary ratchet for retaining the striker in a partially closed state, and engaging the hold-open device with the secondary ratchet to release the pawl assembly from the unlatched position back to the latched position; and engaging the hold-open device with the secondary ratchet to release the pawl assembly from the unlatched position back to the latched position while moving the ratchet assembly from the release position to the open position.

12. The method of claim 11, further including engaging the hold-open device with the secondary ratchet to release the pawl assembly from the unlatched position back to the latched position while moving the ratchet assembly from the striker release position toward the primary striker capture position.

13. A method of operating a double pull latch assembly, comprising:

actuating a pawl assembly in a first actuation to move from a latched position to an unlatched position to release a ratchet assembly from a primary striker capture position, whereat a striker is in a fully closed state, to a secondary striker capture position, whereat the striker is in a partially closed stated, and returning the pawl assembly to the latched position;

actuating the pawl assembly in a second actuation to move from the latched position to the unlatched position to release the ratchet assembly from the secondary striker capture position to a striker release position;

engaging a hold-open device to prevent the pawl assembly from moving from the unlatched position back to the latched position while the ratchet assembly is in the striker release position;

providing the ratchet assembly including a primary ratchet for retaining the striker in the fully closed state and a secondary ratchet for retaining the striker in a partially closed state, and engaging the hold-open device with the secondary ratchet to release the pawl assembly from the unlatched position back to the latched position; and providing the pawl assembly including a primary pawl for releasably locking the primary ratchet in the primary striker capture position and a secondary pawl for releasably locking the secondary ratchet in the secondary striker capture position, and engaging the hold-open device in locking engagement with the secondary pawl while the ratchet assembly is in the striker release position to prevent the secondary pawl from moving from the unlatched position back to the latched position.

14. The method of claim 13, further including releasing the hold-open device from locking engagement with the secondary pawl upon moving the ratchet assembly from the striker release position to the open position and upon moving the ratchet assembly from the striker release position toward the primary striker capture position.

15. The latch assembly of claim 1, wherein the hold-open device is configured for engagement with the safety hook pawl to releasably hold the safety hook pawl in the secondary unlocking position while the safety hook is in the secondary striker capture position.

16. The latch assembly of claim 15, wherein the hold-open device is configured to move the safety hook pawl from the secondary unlocking position to the safety hook pawl open position while moving the safety hook from the release position to the safety hook open position.

* * * * *